United States Patent
Delfeld

(10) Patent No.: US 10,951,454 B2
(45) Date of Patent: Mar. 16, 2021

(54) PRECODING IN WIRELESS SYSTEMS USING ORTHOGONAL TIME FREQUENCY SPACE MULTIPLEXING

(71) Applicant: Cohere Technologies, Inc., Santa Clara, CA (US)

(72) Inventor: James Delfeld, Santa Clara, CA (US)

(73) Assignee: Cohere Technologies, Inc., Santa Clara, CA (US)

(*) Notice: Subject to any disclaimer, the term of this patent is extended or adjusted under 35 U.S.C. 154(b) by 0 days.

(21) Appl. No.: 16/859,135

(22) Filed: Apr. 27, 2020

(65) Prior Publication Data
US 2020/0259697 A1  Aug. 13, 2020

Related U.S. Application Data

(63) Continuation of application No. PCT/US2018/058787, filed on Nov. 1, 2018.
(Continued)

(51) Int. Cl.
*H04L 23/02* (2006.01)
*H04L 27/34* (2006.01)
(Continued)

(52) U.S. Cl.
CPC ........... *H04L 27/34* (2013.01); *H04B 7/0421* (2013.01); *H04B 7/0456* (2013.01)

(58) Field of Classification Search
CPC ....... H04L 27/38; H04L 27/34; H04L 5/0023; H04L 27/2663; H04B 7/0421;
(Continued)

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| CN | 1235720 A | 11/1999 |
| CN | 101682316 A | 3/2010 |

(Continued)

OTHER PUBLICATIONS

Office Action for U.S. Appl. No. 13/117,119, dated Aug. 5, 2013, 5 pages.
(Continued)

*Primary Examiner* — Khai Tran
(74) *Attorney, Agent, or Firm* — Perkins Coie LLP

(57) ABSTRACT

Device, methods and systems for recoding in wireless systems using orthogonal time frequency space multiplexing are described. An exemplary method for transmitting wireless signals includes mapping data to generate a quadrature amplitude modulation (QAM) signal in a delay Doppler domain, determining a perturbation signal to minimize expected interference and noise, perturbing the QAM signal with the perturbation signal, thereby producing a perturbed signal, generating a pre-coded signal by pre-coding, using a linear pre-coder, the perturbed signal, and transmitting the pre-coded signal using an orthogonal time frequency space modulation signal scheme.

20 Claims, 74 Drawing Sheets

Related U.S. Application Data

(60) Provisional application No. 62/580,047, filed on Nov. 1, 2017, provisional application No. 62/587,289, filed on Nov. 16, 2017.

(51) Int. Cl.
  *H04B 7/0417* (2017.01)
  *H04B 7/0456* (2017.01)

(58) Field of Classification Search
  CPC .. H04B 7/0456; H04B 7/0413; H04B 1/1027; H04W 74/0033
  USPC ................................ 375/261, 160, 130, 267
  See application file for complete search history.

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combos et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Marione et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Riu et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |

(56) References Cited

U.S. PATENT DOCUMENTS

| | | | |
|---|---|---|---|
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2020/0145273 A1* | 5/2020 | Rakib | H04L 27/26 |
| 2020/0287672 A1* | 9/2020 | Namboodiri | H04L 5/0023 |

FOREIGN PATENT DOCUMENTS

| | | |
|---|---|---|
| CN | 101939935 A | 1/2011 |
| EP | 1432168 A1 | 6/2004 |
| JP | 2011127910 A | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

Notice of Allowance for U.S. Appl. No. 13/117,119, dated Feb. 28, 2014, 13 pages.
Banelli, P. et al., "Modulation Formats and Waveforms for 5G Networks: Who Will Be the Heir of OFDM?," IEEE Signal Processing Magazine, vol. 81, pp. 80-93, Nov. 2014.
El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.
Rusek, F. et al., "Scaling Up MIMO, Opportunities and Challenges with Very Large Arrays," IEEE Signal Processing Magazine, pp. 40-60 (2013).
Vodafone, "Cellular Internet of Things: Architectural Aspects," RP-150869, 3GPP RAN#68, Malmo, Sweden (Jun. 9, 2015), 19 pages.
Supplementary European Search Report for European Application No. 11787483.4, dated Sep. 9, 2014, 6 pages.
International Search Report and Written Opinion for International Application No. PCT/US2011/038302, dated Nov. 15, 2011, 8 pages.
International Preliminary Report on Patentability for International Application No. PCT/US2011/038302, dated Dec. 4, 2012, 7 pages.
Office Action for U.S. Appl. No. 13/117,124, dated Feb. 22, 2013, 7 pages.
Notice of Allowance for U.S. Appl. No. 13/117,124, dated Aug. 8, 2013, 10 pages.
Office Action for U.S. Appl. No. 14/605,957, dated Jun. 22, 2017, 6 pages.
Supplementary European Search Report for European Application No. 13809004.8, dated Apr. 14, 2016, 8 pages.
Communication Pursuant to Article 94(3) EPC for European Application No. 13809004.8, dated Feb. 17, 2017, 5 pages.
Notice of Allowance for U.S. Appl. No. 13/927,087, dated Feb. 25, 2015, 9 pages.
Office Action for U.S. Appl. No. 13/927,087, dated Nov. 12, 2014, 14 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.

(56) References Cited

OTHER PUBLICATIONS com/Investor/ATT_Annual/2014/att_introduces_new_concepts_for_telecom_network.html>, 5 pages.
CATT, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-5-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
International Search Report and Written Opinion for International Application No. PCT/US2017/025797, dated Jun. 21, 2017, 6 pages.
International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.

\* cited by examiner

US 10,951,454 B2

PRECODING IN WIRELESS SYSTEMS USING ORTHOGONAL TIME FREQUENCY SPACE MULTIPLEXING

CROSS-REFERENCES TO RELATED APPLICATIONS

This patent document is a continuation of International Application No. PCT/US2018/058787 entitled "PRECODING IN WIRELESS SYSTEMS USING ORTHOGONAL TIME FREQUENCY SPACE MULTIPLEXING" filed on 1 Nov. 2018, which claims priority to and benefits of U.S. Provisional Application No. 62/580,047 entitled "PRECODING IN ORTHOGONAL TIME FREQUENCY SPACE MULTIPLEXING" filed on 1 Nov. 2017, and U.S. Provisional Application No. 62/587,289 entitled "PRECODING IN ORTHOGONAL TIME FREQUENCY SPACE MULTIPLEXING" filed on 16 Nov. 2017. The entire contents of the aforementioned patent applications are incorporated by reference as part of the disclosure of this patent document.

TECHNICAL FIELD

The present document relates to wireless communication, and more particularly, to using precoding in wireless communications.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses techniques that can be used to precode wireless signals.

In one example aspect, a method for transmitting wireless signals is disclosed. The method includes mapping data to generate a quadrature amplitude modulation (QAM) signal in a delay Doppler domain, determining a perturbation signal to minimize expected interference and noise, perturbing the QAM signal with the perturbation signal, thereby producing a perturbed signal, generating a pre-coded signal by pre-coding, using a linear pre-coder, the perturbed signal, and transmitting the pre-coded signal using an orthogonal time frequency space modulation signal scheme.

In another example aspect, a wireless communication method is disclosed. The method includes generating a quadrature amplitude modulation (QAM) signal in the 2D delay-Doppler domain by modulating data bits, using an error metric along with the QAM signal to generate a perturbation signal, adding the perturbation signal to the QAM signal to generate a perturbed QAM signal, transforming the perturbed QAM signal into the 2D time frequency domain by using a 2D Fourier transform from the 2D delay Doppler domain to the 2D time frequency domain, filtering the 2D transformed signal using an optimal precoding filter to generate a precoded signal, and transmitting the precoded signal over a communication medium.

In yet another example aspect, a method of receiving wireless signals is disclosed. The method includes receiving a quadrature amplitude modulation (QAM) signal in the time-frequency domain, applying an orthogonal transformation to convert the received QAM signal into delay-Doppler domain, determining a closest lattice point corresponding to the QAM constellation point of the QAM signal in the delay-Doppler domain, removing perturbation in the received QAM signal by subtracting the closest lattice point from the QAM constellation point, and demodulating the un-perturbed QAM signal to obtain data.

In another example aspect, a wireless communication apparatus that implements the above-described methods is disclosed.

In yet another example aspect, the method may be embodied as processor-executable code and may be stored on a computer-readable program medium.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document, including the appendices, to improve readability of the description and do not in any way limit the discussion to the respective sections only. The terms "hub" and user equipment/device are used to refer to the transmitting side apparatus and the receiving side apparatus of a transmission, and each may take the form of a base station, a relay node, an access point, a small-cell access point, user equipment, and so on.

Multiple Access

Figure 1:
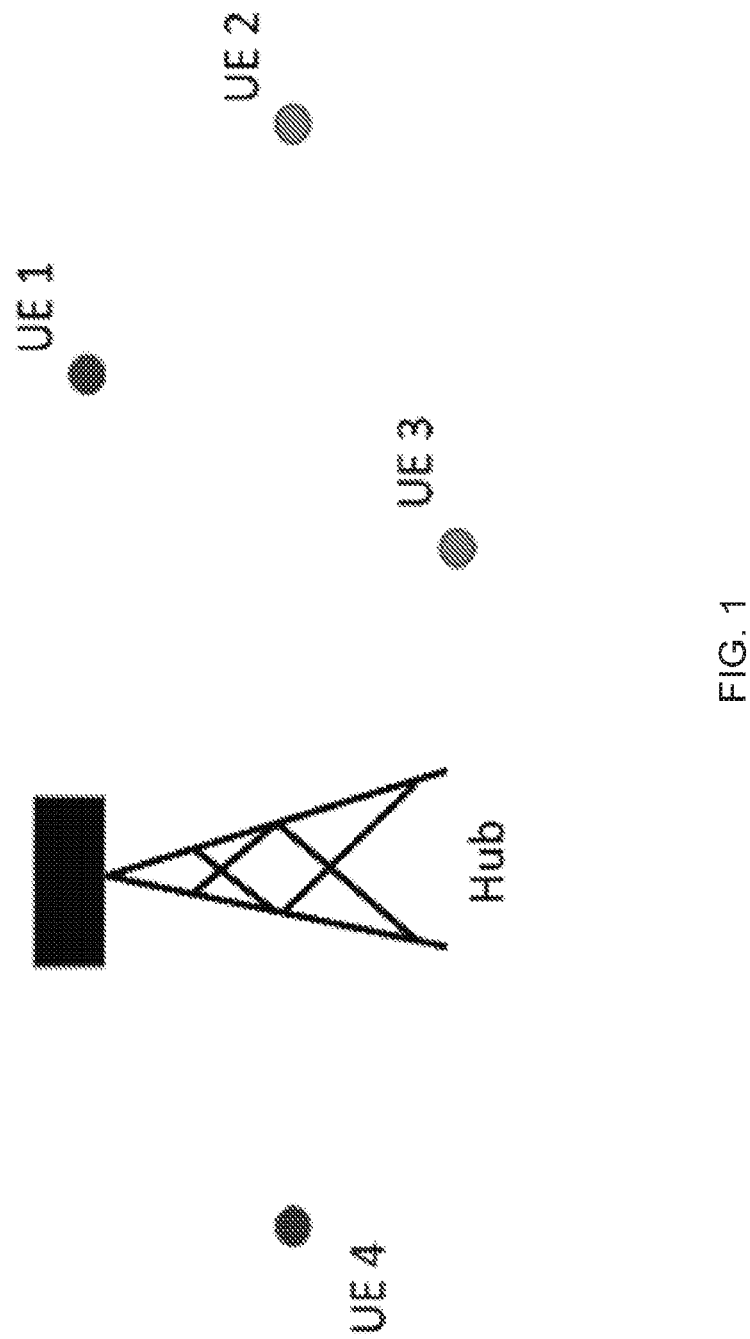
FIG. 1 depicts an example network configuration in which a hub services for user equipment (UE).

FIG. 1 depicts a typical example scenario in wireless communication is a hub transmitting data over a fixed time and bandwidth to several user devices (UEs). For example: a tower transmitting data to several cell phones, or a Wi-Fi router transmitting data to several devices. Such scenarios are called multiple access scenarios.

Orthogonal Multiple Access

Figure 2:
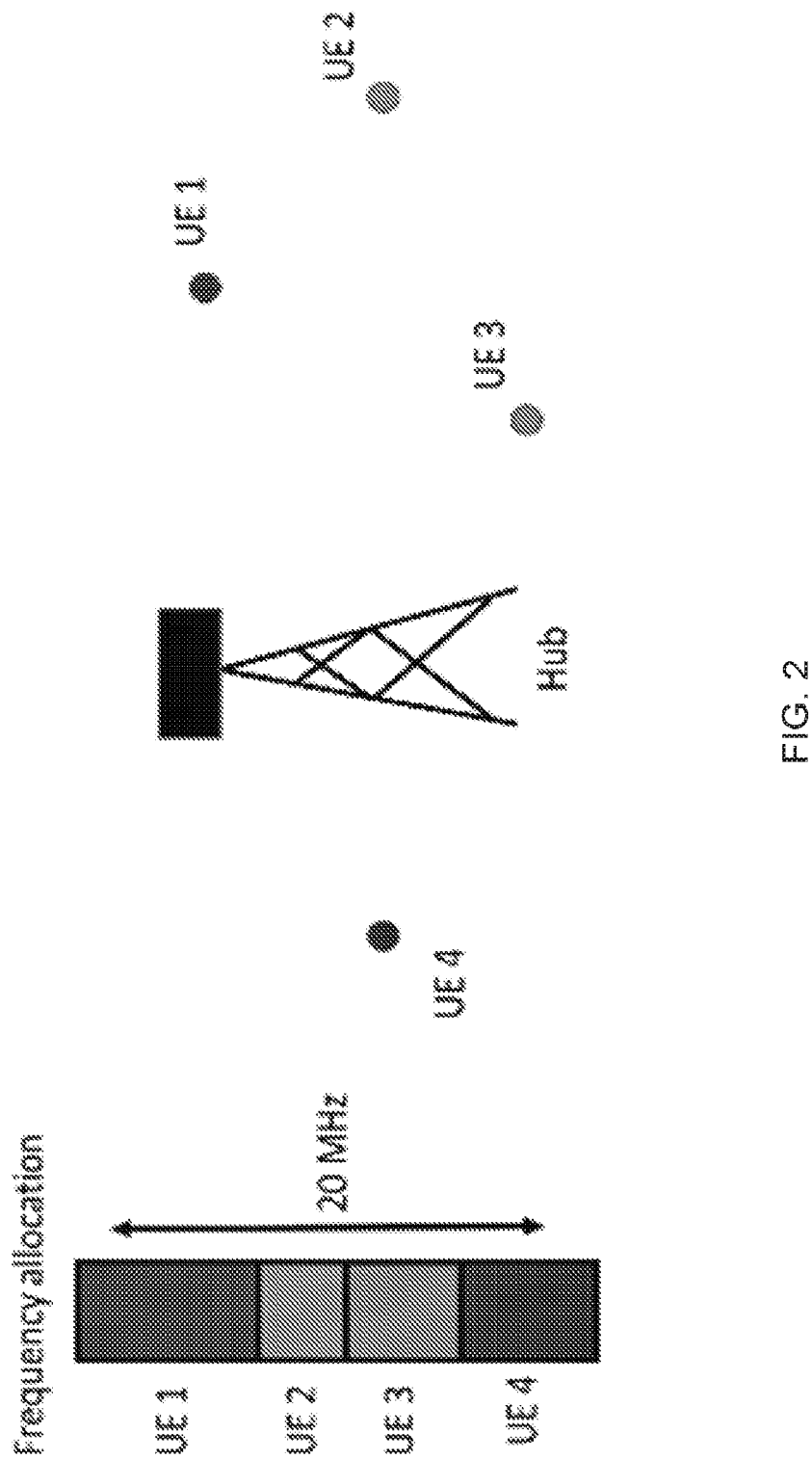
FIG. 2 depicts an example embodiment in which an orthogonal frequency division multiplexing access (OFDMA) scheme is used for communication.

Currently the common technique used for multiple access is orthogonal multiple access. This means that the hub breaks it's time and frequency resources into disjoint pieces and assigns them to the UEs. An example is shown in FIG. 2, where four UEs (UE1, UE2, UE3 and UE4) get four different frequency allocations and therefore signals are orthogonal to each other.

The advantage of orthogonal multiple access is that each UE experience its own private channel with no interference.

The disadvantage is that each UE is only assigned a fraction of the available resource and so typically has a low data rate compared to non-orthogonal cases.

Precoding Multiple Access

Figure 3:
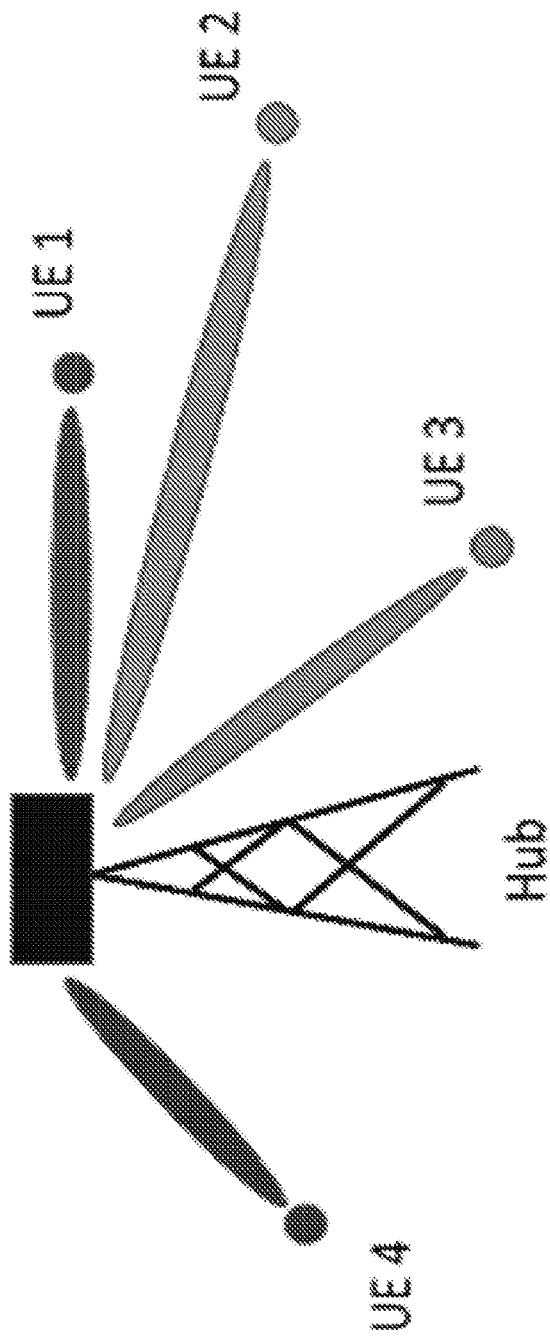
FIG. 3 illustrates the concept of precoding in an example network configuration.

Recently, a more advanced technique, precoding, has been proposed for multiple access. In precoding, the hub is equipped with multiple antennas. The hub uses the multiple antennas to create separate beams which it then uses to transmit data over the entire bandwidth to the UEs. An example is depicted in FIG. 3, which shows that the hub is able to form individual beams of directed RF energy to UEs based on their positions.

The advantage of precoding it that each UE receives data over the entire bandwidth, thus giving high data rates. The disadvantage of precoding is the complexity of implementation. Also, due to power constraints and noisy channel estimates the hub cannot create perfectly disjoint beams, so the UEs will experience some level of residual interference.

Introduction to Precoding

Precoding may be implemented in four steps: channel acquisition, channel extrapolation, filter construction, filter application.

Channel acquisition: To perform precoding, the hub determines how wireless signals are distorted as they travel from the hub to the UEs. The distortion can be represented mathematically as a matrix: taking as input the signal transmitted from the hubs antennas and giving as output the signal received by the UEs, this matrix is called the wireless channel.

Channel prediction: In practice, the hub first acquires the channel at fixed times denoted by $s_1, s_2, \ldots, s_n$. Based on these values, the hub then predicts what the channel will be at some future times when the pre-coded data will be transmitted, we denote these times denoted by $t_1, t_2, \ldots, t_m$.

Filter construction: The hub uses the channel predicted at $t_1, t_2, \ldots, t_m$ to construct precoding filters which minimize the energy of interference and noise the UEs receive.

Filter application: The hub applies the precoding filters to the data it wants the UEs to receive.

Channel Acquisition

This section gives a brief overview of the precise mathematical model and notation used to describe the channel.

Time and frequency bins: the hub transmits data to the UEs on a fixed allocation of time and frequency. This document denotes the number of frequency bins in the allocation by $N_f$ and the number of time bins in the allocation by $N_t$.

Number of antennas: the number of antennas at the hub is denoted by $L_h$, the total number of UE antennas is denoted by $L_u$.

Transmit signal: for each time and frequency bin the hub transmits a signal which we denote by $\varphi(f,t) \in \mathbb{C}^{L_h}$ for $f=1, \ldots, N_f$ and $t=1, \ldots, N_t$.

Receive signal: for each time and frequency bin the UEs receive a signal which we denote by $y(f,t) \in \mathbb{C}^{L_u}$ for $f=1, \ldots, N_f$ and $t=1, \ldots, N_t$.

White noise: for each time and frequency bin white noise is modeled as a vector of iid Gaussian random variables with mean zero and variance $N_0$. This document denotes the noise by $w(f,t) \in \mathbb{C}^{L_u}$ for $f=1, \ldots, N_f$ and $t=1, \ldots, N_t$.

Channel matrix: for each time and frequency bin the wireless channel is represented as a matrix and is denoted by $H(f,t) \in \mathbb{C}^{L_u \times L_h}$ for $f=1, \ldots, N_f$ and $t=1, \ldots, N_t$.

Figure 4:
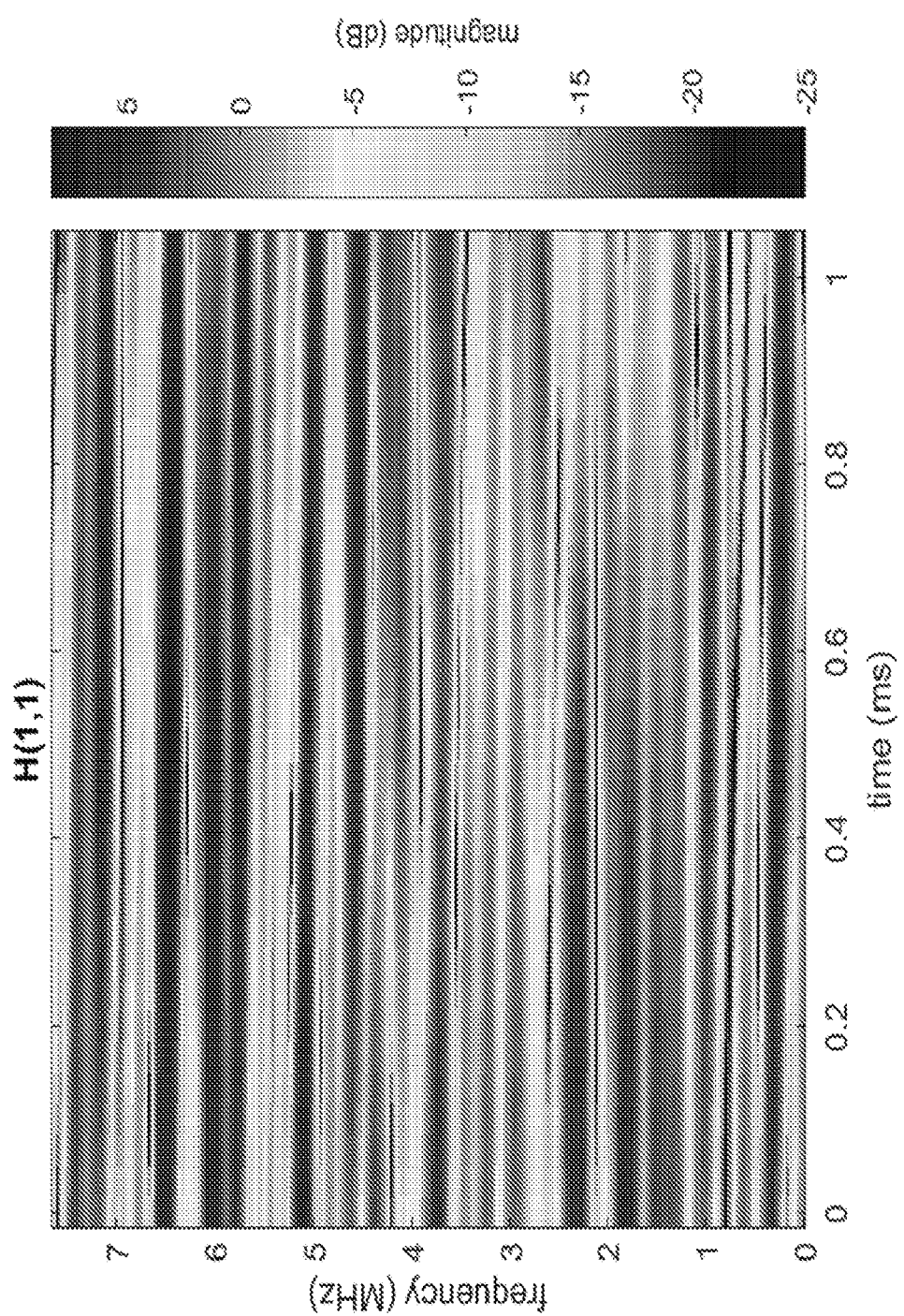
FIG. 4 is a spectral chart of an example of a wireless communication channel.

The wireless channel can be represented as a matrix which relates the transmit and receive signals through a simple linear equation:

$$y(f,t)=H(f,t)\varphi(f,t)+w(f,t) \qquad (1)$$

for $f=1, \ldots, N_f$ and $t=1, \ldots, N_t$. FIG. 4 shows an example spectrogram of a wireless channel between a single hub antenna and a single UE antenna. The graph is plotted with time as the horizontal axis and frequency along the vertical axis. The regions are shaded to indicate where the channel is strong or weak, as denoted by the dB magnitude scale shown in FIG. 4.

Two common ways are typically used to acquire knowledge of the channel at the hub: explicit feedback and implicit feedback.

Explicit Feedback

In explicit feedback, the UEs measure the channel and then transmit the measured channel back to the hub in a packet of data. The explicit feedback may be done in three steps.

Pilot transmission: for each time and frequency bin the hub transmits a pilot signal denoted by $p(f,t) \in \mathbb{C}^{L_h}$ for $f=1, \ldots, N_f$ and $t=1, \ldots, N_t$. Unlike data, the pilot signal is known at both the hub and the UEs.

Channel acquisition: for each time and frequency bin the UEs receive the pilot signal distorted by the channel and white noise:

$$H(f,t)p(f,t)+w(f,t), \qquad (2)$$

for $f=1, \ldots, N_f$ and $t=1, \ldots, N_t$. Because the pilot signal is known by the UEs, they can use signal processing to compute an estimate of the channel, denoted by $\hat{H}(f,t)$.

Feedback: the UEs quantize the channel estimates $\hat{H}(f,t)$ into a packet of data. The packet is then transmitted to the hub.

The advantage of explicit feedback is that it is relatively easy to implement. The disadvantage is the large overhead of transmitting the channel estimates from the UEs to the hub.

Implicit Feedback

Figure 5:
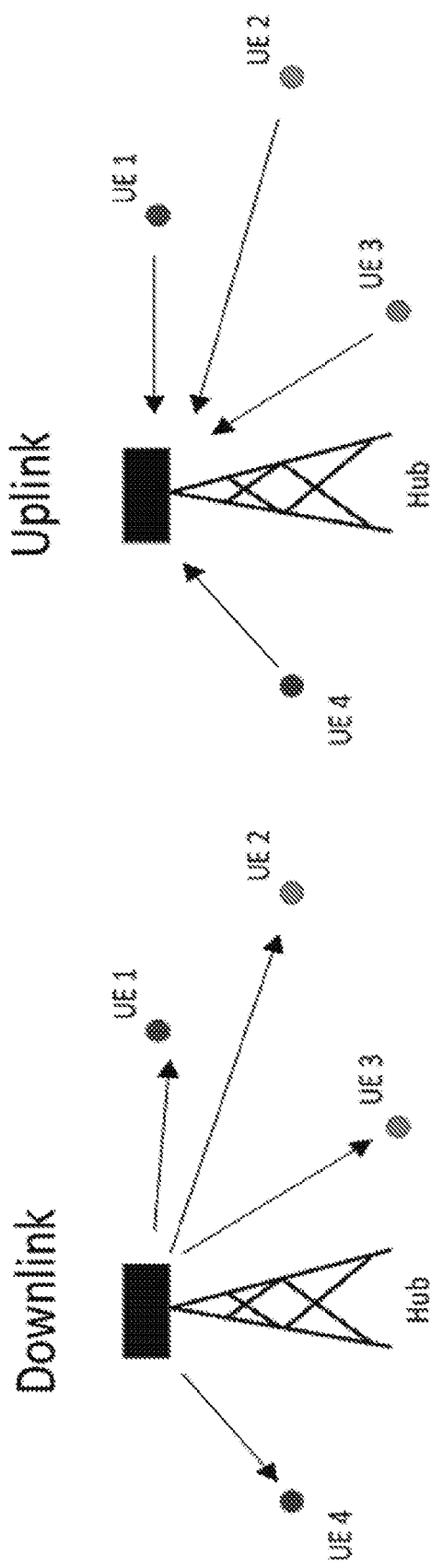
FIG. 5 illustrates examples of downlink and uplink transmission directions.

Implicit feedback is based on the principle of reciprocity which relates the uplink channel (UEs transmitting to the hub) to the downlink channel (hub transmitting to the UEs). FIG. 5 shows an example configuration of uplink and downlink channels between a hub and multiple UEs.

Specifically, denote the uplink and downlink channels by $H_{up}$ and $H$ respectively, then:

$$H(f,t)=AH_{up}^T(f,t)B, \qquad (3)$$

for $f=1, \ldots, N_f$ and $t=1, \ldots, N_t$. Where $H_{up}^T(f,t)$ denotes the matrix transpose of the uplink channel. The matrices $A \in \mathbb{C}^{L_u \times L_u}$ and $B \in \mathbb{C}^{L_h \times L_h}$ represent hardware non-idealities. By performing a procedure called reciprocity calibration, the effect of the hardware non-idealities can be removed, thus giving a simple relationship between the uplink and downlink channels:

$$H(f,t)=H_{up}^T(f,t) \qquad (4)$$

The principle of reciprocity can be used to acquire channel knowledge at the hub. The procedure is called implicit feedback and consists of three steps.

Reciprocity calibration: the hub and UEs calibrate their hardware so that equation (4) holds.

Pilot transmission: for each time and frequency bin the UEs transmits a pilot signal denoted by $p(f,t) \in \mathbb{C}^{L_u}$ for $f=1, \ldots, N_f$ and $t=1, \ldots, N_t$. Unlike data, the pilot signal is known at both the hub and the UEs.

Channel acquisition: for each time and frequency bin the hub receives the pilot signal distorted by the uplink channel and white noise:

$$H_{up}(f,t)p(f,t)+w(f,t) \quad (5)$$

for $f=1, \ldots, N_f$ and $t=1, \ldots, N_t$. Because the pilot signal is known by the hub, it can use signal processing to compute an estimate of the uplink channel, denoted by $\widehat{H_{up}}(f,t)$. Because reciprocity calibration has been performed the hub can take the transpose to get an estimate of the downlink channel, denoted by $\hat{H}(f,t)$.

The advantage of implicit feedback is that it allows the hub to acquire channel knowledge with very little overhead; the disadvantage is that reciprocity calibration is difficult to implement.

Channel Prediction

Figure 6:
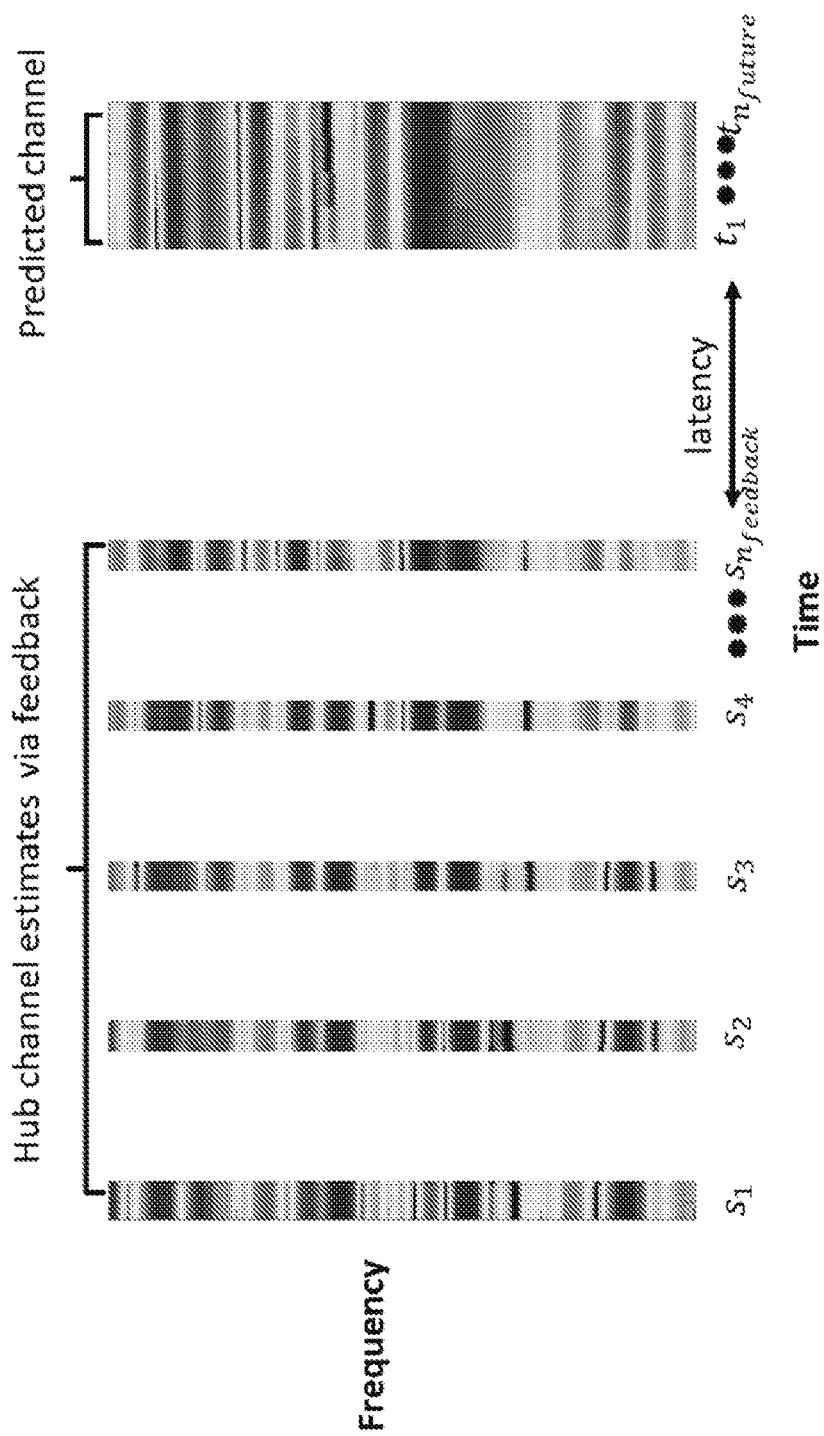
FIG. 6 illustrates spectral effects of an example of a channel prediction operation.

Using either explicit or implicit feedback, the hub acquires estimates of the downlink wireless channel at certain times denoted by $s_1, s_2, \ldots, s_n$ using these estimates it must then predict what the channel will be at future times when the precoding will be performed, denoted by $t_1, t_2, \ldots, t_m$. FIG. 6 shows this setup in which "snapshots" of channel are estimated, and based on the estimated snapshots, a prediction is made regarding the channel at a time in the future. As depicted in FIG. 6, channel estimates may be available across the frequency band at a fixed time slots, and based on these estimates, a predicated channel is calculated.

There are tradeoffs when choosing the feedback times $s_1, s_2, \ldots, s_n$.

Latency of extrapolation: Refers to the temporal distance between the last feedback time, $s_n$, and the first prediction time, $t_1$, determines how far into the future the hub needs to predict the channel. If the latency of extrapolation is large, then the hub has a good lead time to compute the pre-coding filters before it needs to apply them. On the other hand, larger latencies give a more difficult prediction problem.

Density: how frequent the hub receives channel measurements via feedback determines the feedback density. Greater density leads to more accurate prediction at the cost of greater overhead.

There are many channel prediction algorithms in the literature. They differ by what assumptions they make on the mathematical structure of the channel. The stronger the assumption, the greater the ability to extrapolate into the future if the assumption is true. However, if the assumption is false then the extrapolation will fail. For example:

Polynomial extrapolation: assumes the channel is smooth function. If true, can extrapolate the channel a very short time into the future ≈0.5 ms.

Bandlimited extrapolation: assumes the channel is a bandlimited function. If true, can extrapolated a short time into the future ≈1 ms.

MUSIC extrapolation: assumes the channel is a finite sum of waves. If true, can extrapolate a long time into the future ≈10 ms.

Precoding Filter Computation and Application

Using extrapolation, the hub computes an estimate of the downlink channel matrix for the times the pre-coded data will be transmitted. The estimates are then used to construct precoding filters. Precoding is performed by applying the filters on the data the hub wants the UEs to receive. Before going over details we introduce notation.

Channel estimate: for each time and frequency bin the hub has an estimate of the downlink channel which we denote by $\hat{H}(f,t) \in \mathbb{C}^{L_u \times L_h}$, for $f=1, \ldots, N_f$ and $t=1, \ldots, N_t$.

Precoding filter: for each time and frequency bin the hub uses the channel estimate to construct a precoding filter which we denote by $W(f,t) \in \mathbb{C}^{L_h \times L_u}$ for $f=1, \ldots, N_f$ and $t=1, \ldots, N_t$.

Data: for each time and frequency bin the UE wants to transmit a vector of data to the UEs which we denote by $x(f,t) \in \mathbb{C}^{L_u}$ for $f=1, \ldots, N_f$ and $t=1, \ldots, N_t$.

Hub Energy Constraint

When the precoder filter is applied to data, the hub power constraint is an important consideration. We assume that the total hub transmit energy cannot exceed $N_f N_t L_h$. Consider the pre-coded data:

$$W(f,t)x(f,t), \quad (6)$$

for $f=1, \ldots, N_f$ and $t=1, \ldots, N_t$. To ensure that the pre-coded data meets the hub energy constraints the hub applies normalization, transmitting:

$$\lambda W(f,t)x(f,t), \quad (7)$$

for $f=1, \ldots, N_f$ and $t=1, \ldots, N_t$. Where the normalization constant $\lambda$ is given by:

$$\lambda = \sqrt{\frac{N_f N_t L_h}{\sum_{f,t} \|W(f,t)x(f,t)\|^2}} \quad (8)$$

Receiver SNR

The pre-coded data then passes through the downlink channel, the UEs receive the following signal:

$$\lambda H(f,t)W(f,t)x(f,t)+w(f,t), \quad (9)$$

for $f=1, \ldots, N_f$ and $t=1, \ldots, N_t$. The UE then removes the normalization constant, giving a soft estimate of the data:

$$x_{soft}(f,t) = H(f,t)x(f,t) + \frac{1}{\lambda}w(f,t), \quad (10)$$

for $f=1, \ldots, N_f$ and $t=1, \ldots, N_t$. The error of the estimate is given by:

$$x_{soft}(f,t) - x(f,t) = H(f,t)W(f,t)x(f,t) - x(f,t) + \frac{1}{\lambda}w(f,t), \quad (11)$$

The error of the estimate can be split into two terms. The term $H(f,t)W(f,t)x(f,t)$ is the interference experienced by the UEs while the term $$\frac{1}{\lambda}w(f,t)$$

gives the noise experienced by the UEs.

When choosing a pre-coding filter there is a tradeoff between interference and noise. We now review the two most popular pre-coder filters: zero-forcing and regularized zero-forcing.

Zero Forcing Precoder

Figure 7:
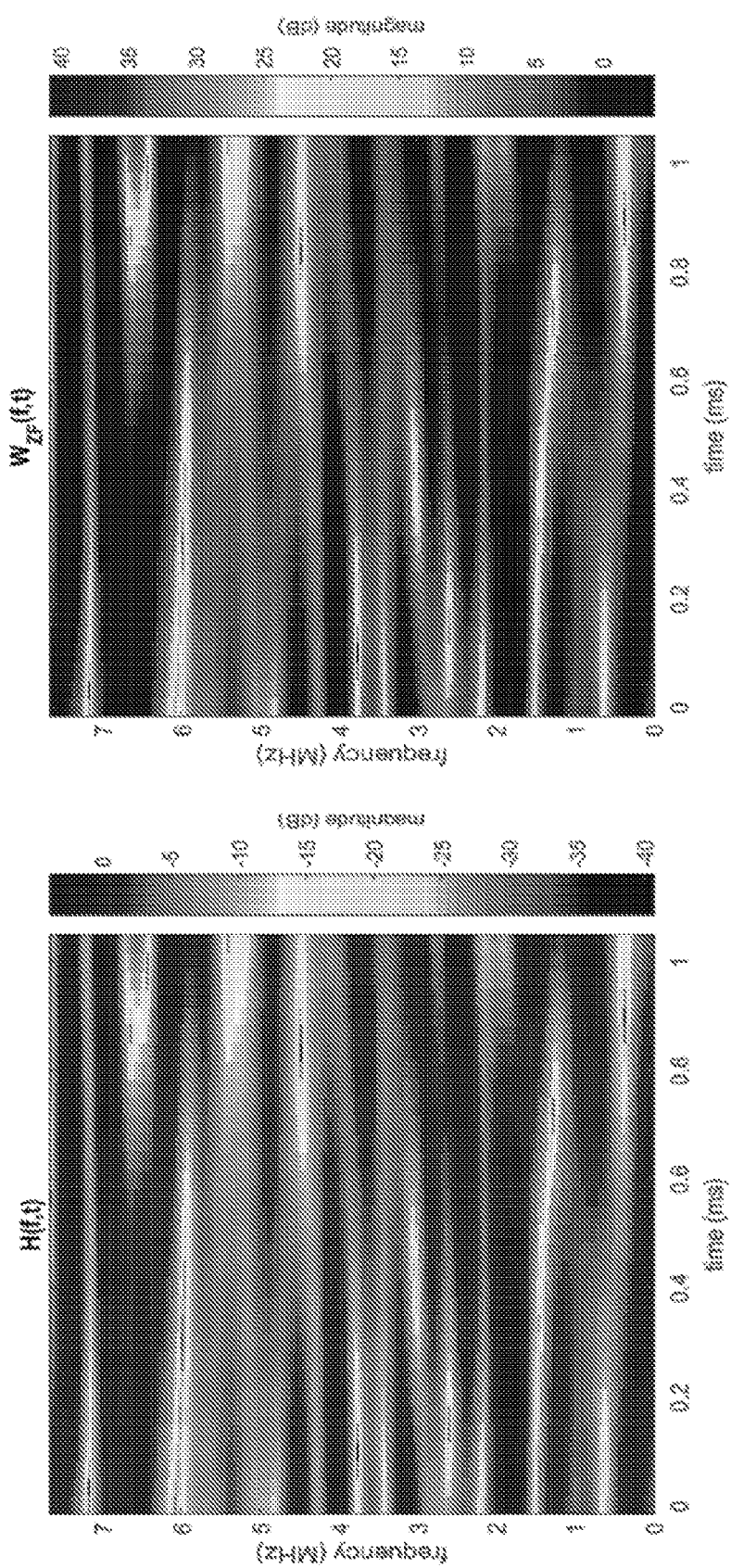
FIG. 7 graphically illustrates operation of an example implementation of a zero-forcing precoder (ZFP).

The hub constructs the zero forcing pre-coder (ZFP) by inverting its channel estimate:

$$w_{ZF}(f,t)=(\hat{H}^*(f,t)\hat{H}(f,t))^{-1}\hat{H}^*(f,t), \quad (12)$$

for f=1, ..., $N_f$ and t=1, ..., $N_t$. The advantage of ZPP is that the UEs experience little interference (if the channel estimate is perfect then the UEs experience no interference). The disadvantage of ZFP is that the UEs can experience a large amount of noise. This is because at time and frequency bins where the channel estimate $\hat{H}(f,t)$ is very small the filter $W_{ZF}$ (f,t) will be very large, thus causing the normalization constant λ to be very small giving large noise energy. FIG. 7 demonstrates this phenomenon for a SISO channel.

Regularized Zero-Forcing Pre-Coder (rZFP)

Figure 8:
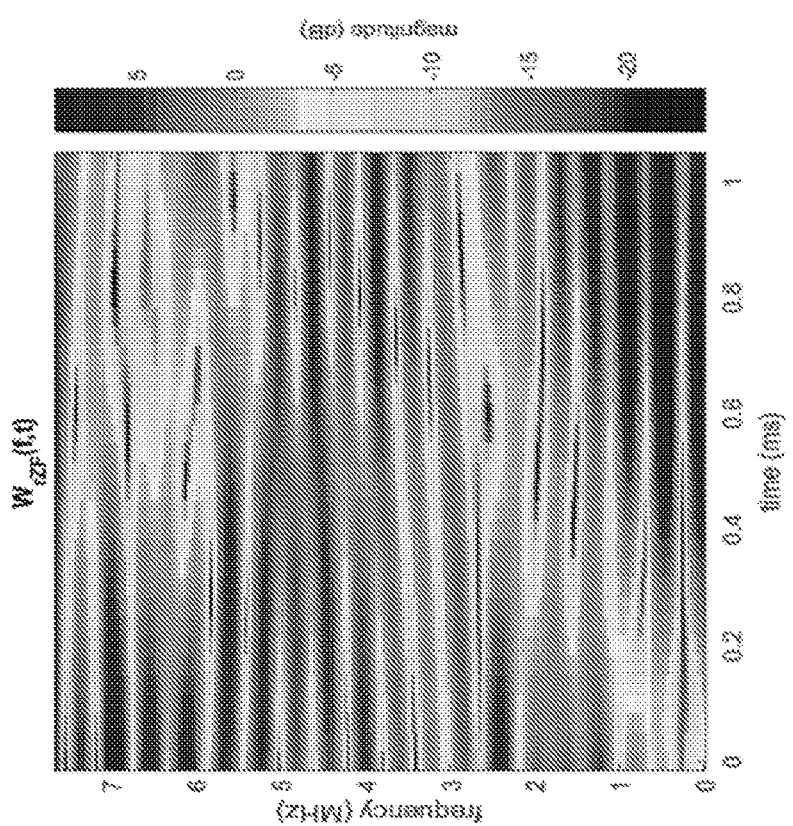
FIG. 8 graphically compares two implementations—a ZFP implementation and regularized ZFP implementation (rZFP).
Figure 8:
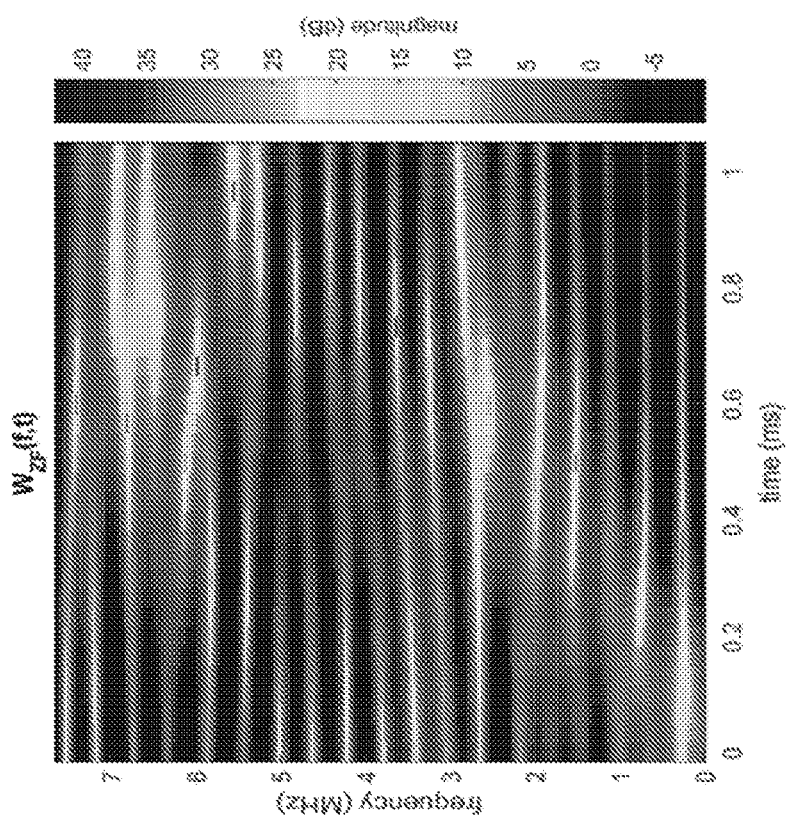

To mitigates the effect of channel nulls (locations where the channel has very small energy) the regularized zero forcing precoder (rZFP) is constructed be taking a regularized inverse of its channel estimate:

$$W_{rZF}(f,t)=(\hat{H}^*(f,t)\hat{H}(f,t)+\alpha I)^{-1}\hat{H}^*(f,t), \quad (13)$$

for f=1, ..., $N_f$ and t=1, ..., $N_t$. Where α>0 is the normalization constant. The advantage of rZFP is that the noise energy is smaller compared to ZPF. This is because rZFP deploys less energy in channel nulls, thus the normalization constant λ is larger giving smaller noise energy. The disadvantage of rZFP is larger interference compared to ZFP. This is because the channel is not perfectly inverted (due to the normalization constant), so the UEs will experience residual interference. FIG. 8 demonstrates this phenomenon for a SISO channel.

Figure 9:
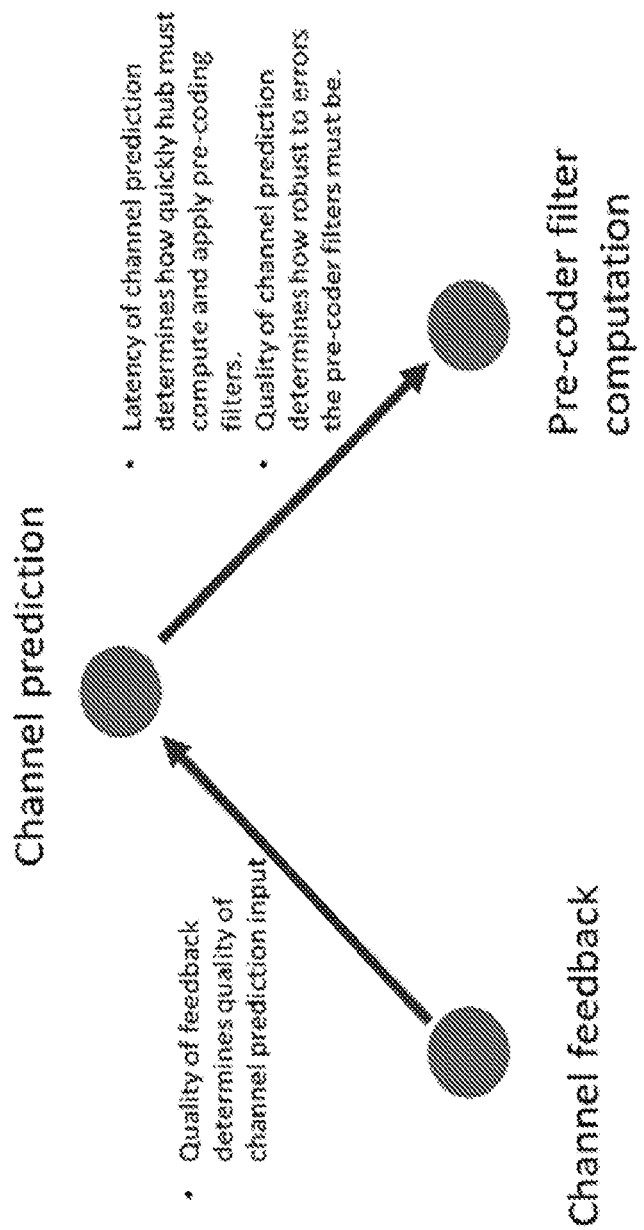
FIG. 9 shows components of an example embodiment of a precoding system.

As described above, there are three components to a precoding system: a channel feedback component, a channel prediction component, and a pre-coding filter component. The relationship between the three components is displayed in FIG. 9.

OTFS Precoding System

Various techniques for implementing OTFS precoding system are discussed. Some disclosed techniques can be used to provide unique ability to shape the energy distribution of the transmission signal. For example, energy distribution may be such that the energy of the signal will be high in regions of time frequency and space where the channel information and the channel strength are strong. Conversely, the energy of the signal will be low in regions of time frequency and space where the channel information or the channel strength are weak.

Figure 10:
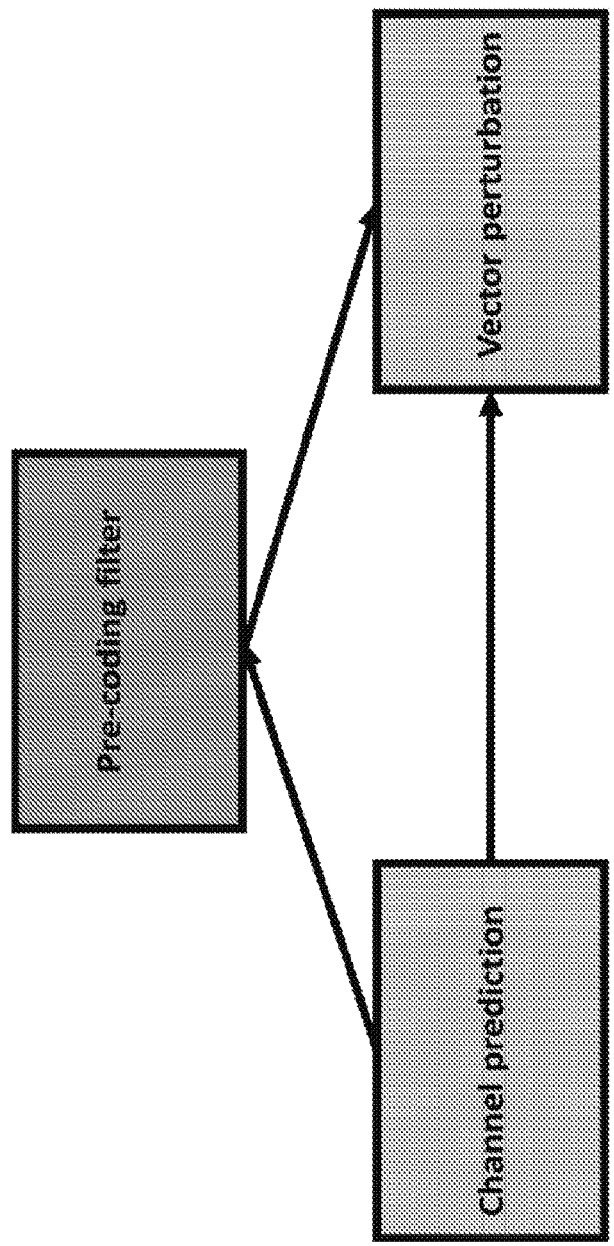
FIG. 10 is a block diagram depiction of an example of a precoding system.

Some embodiments may be described with reference to three main blocks, as depicted in FIG. 10.

Channel prediction: During channel prediction, second order statistics are used to build a prediction filter along with the covariance of the prediction error.

Optimal precoding filter: using knowledge of the predicted channel and the covariance of the prediction error: the hub computes the optimal precoding filter. The filter shapes the spatial energy distribution of the transmission signal.

Vector perturbation: using knowledge of the predicted channel, precoding filter, and prediction error, the hub perturbs the transmission signal. By doing this the hub shapes the time, frequency, and spatial energy distribution of the transmission signal.

Review of OTFS Modulation

A modulation is a method to transmit a collection of finite symbols (which encode data) over a fixed allocation of time and frequency. A popular method used today is Orthogonal Frequency Division Multiplexing (OFDM) which transmits each finite symbol over a narrow region of time and frequency (e.g., using subcarriers and timeslots). In contrast, Orthogonal Time Frequency Space (OTFS) transmits each finite symbol over the entire allocation of time and frequency. Before going into details, we introduce terminology and notation.

We call the allocation of time and frequency a frame. We denote the number of subcarriers in the frame by $N_f$. We denote the subcarrier spacing by df. We denote the number of OFDM symbols in the frame by $N_t$. We denote the OFDM symbol duration by dt. We call a collection of possible finite symbols an alphabet, denoted by A.

A signal transmitted over the frame, denoted by φ, can be specified by the values it takes for each time and frequency bin:

$$\varphi(f,t)\in\mathbb{C}, \quad (14)$$

for f=1, ..., $N_f$ and t=1, ..., $N_t$.

Figure 11:
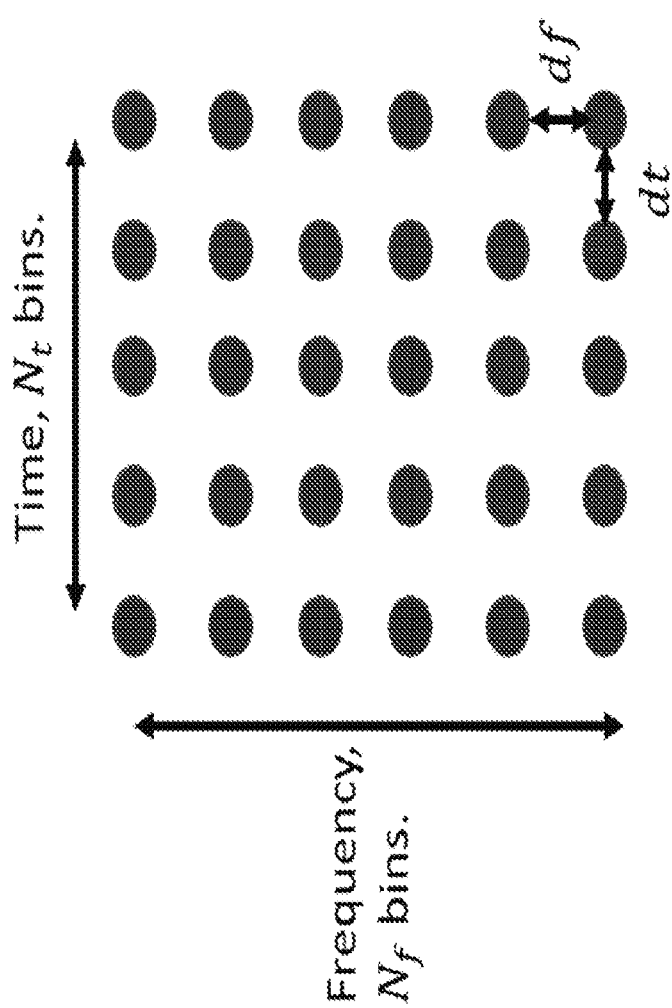
FIG. 11 shows an example of a quadrature amplitude modulation (QAM) constellation.
Figure 12:
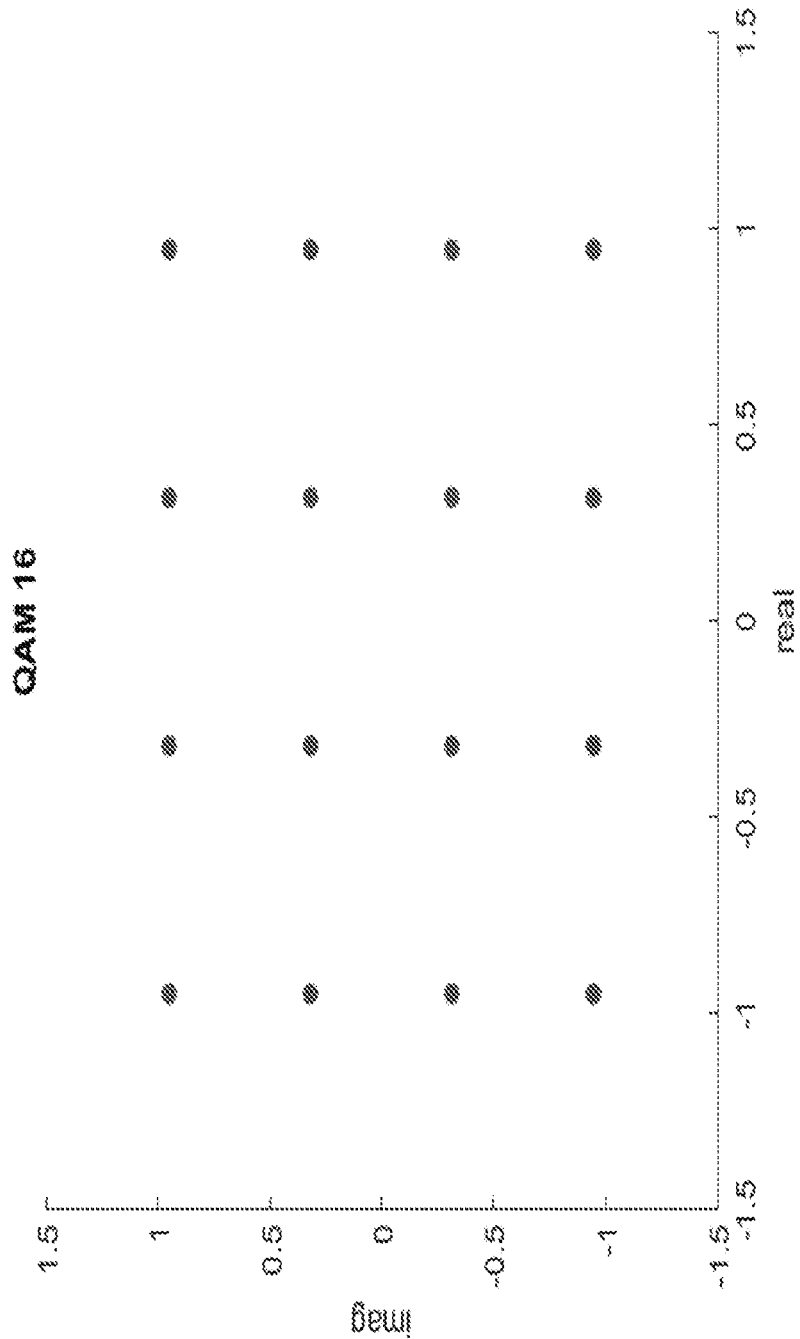
FIG. 12 shows another example of QAM constellation.

FIG. 11 shows an example of a frame along time (horizontal) axis and frequency (vertical) axis. FIG. 12 shows an example of the most commonly used alphabet: Quadrature Amplitude Modulation (QAM).

OTFS Modulation

Suppose a transmitter has a collection of $N_f N_t$ QAM symbols that the transmitter wants to transmit over a frame, denoted by:

$$x(f,t)\in A, \quad (15)$$

for f=1, ..., $N_f$ and t=1, ..., $N_t$. OFDM works by transmitting each QAM symbol over a single time frequency bin:

$$\varphi(f,t)=x(f,t), \quad (16)$$

for f=1, ..., $N_f$ and t=1, ..., $N_t$. The advantage of OFDM is its inherent parallelism, this makes many computational aspects of communication very easy to implement. The disadvantage of OFDM is fading, that is, the wireless channel can be very poor for certain time frequency bins. Performing pre-coding for these bins is very difficult.

The OTFS modulation is defined using the delay Doppler domain, which is relating to the standard time frequency domain by the two-dimensional Fourier transform.

The delay dimension is dual to the frequency dimension. There are $N_\tau$ delay bins with $N_\tau=N_f$. The Doppler dimension is dual to the time dimension. There are $N_v$ Doppler bins with $N_v=N_t$.

A signal in the delay Doppler domain, denoted by φ, is defined by the values it takes for each delay and Doppler bin:

$$\phi(\tau,v)\in\mathbb{C}, \quad (16)$$

for τ=1, ..., $N_\tau$ and v=1, ..., $N_v$.

Given a signal φ in the delay Doppler domain, some transmitter embodiments may apply the two-dimensional Fourier transform to define a signal φ in the time frequency domain:

$$\varphi(f,t)=(F\phi)(f,t), \quad (17)$$

for f=1, ..., $N_f$ and t=1, ..., $N_t$. Where F denotes the two-dimensional Fourier transform.

Conversely, given a signal φ in the time frequency domain, transmitter embodiments could apply the inverse two-dimensional Fourier transform to define a signal φ in the delay Doppler domain:

$$\phi(\tau,v)=(F^{-1}\varphi)(\tau,v), \quad (18)$$

for τ=1, ..., $N_\tau$ and v=1, ..., $N_v$.

Figure 13:
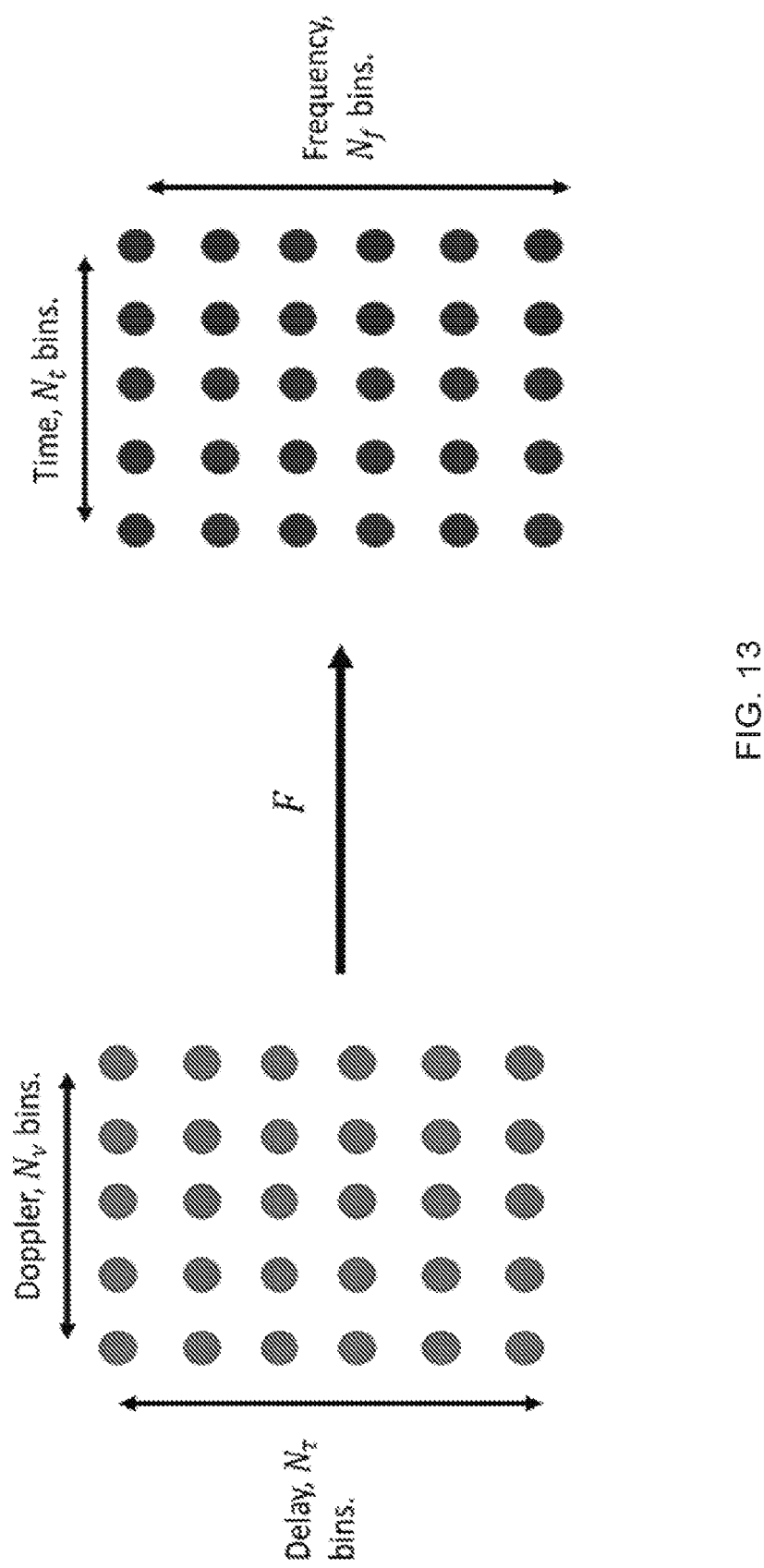
FIG. 13 pictorially depicts an example of relationship between delay-Doppler domain and time-frequency domain.

FIG. 13 depicts an example of the relationship between the delay Doppler and time frequency domains.

The advantage of OTFS is that each QAM symbol is spread evenly over the entire time frequency domain (by the two-two-dimensional Fourier transform), therefore each QAM symbol experience all the good and bad regions of the channel thus eliminating fading. The disadvantage of OTFS is that the QAM spreading adds computational complexity.

MMSE Channel Prediction

Figure 14:
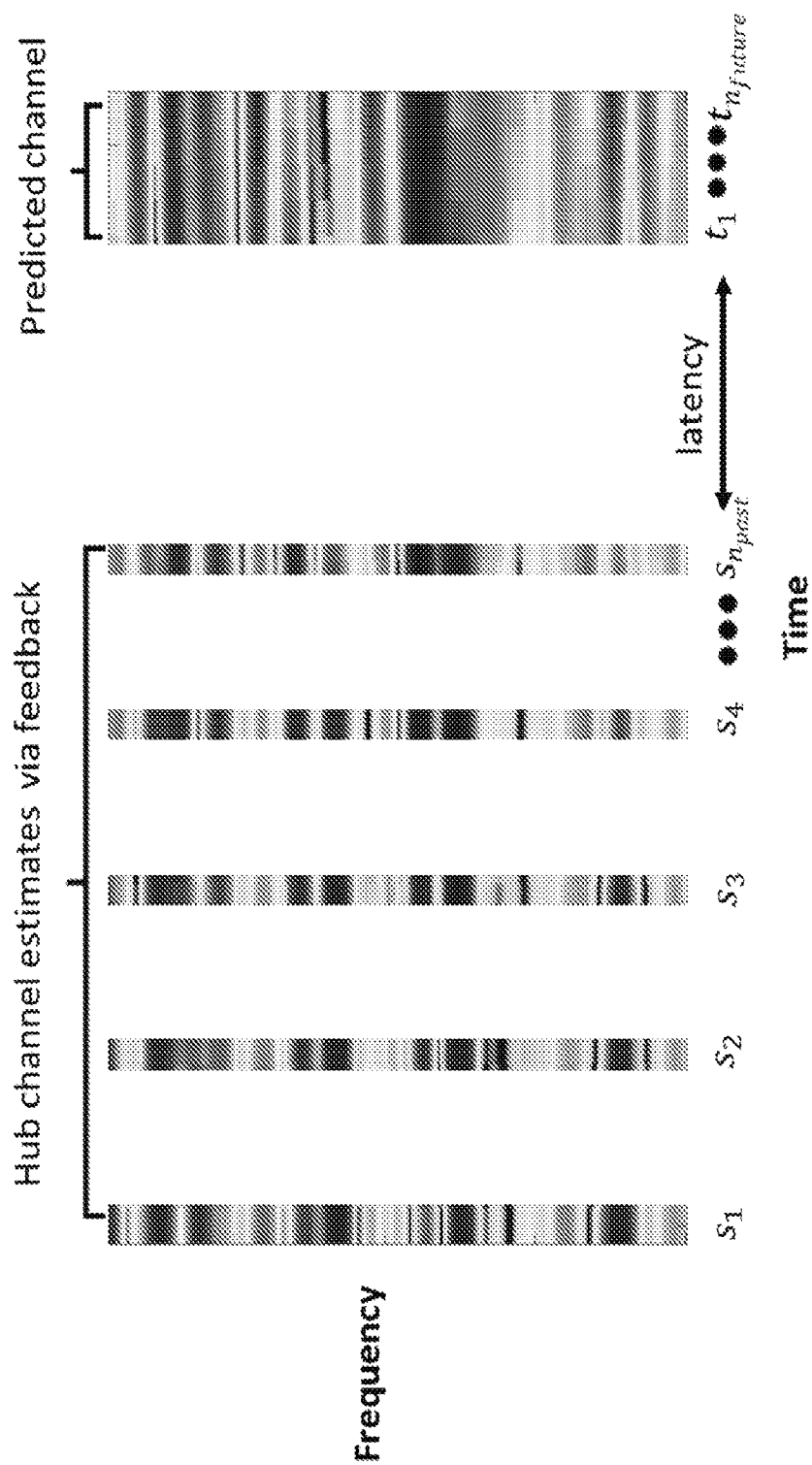
FIG. 14 is a spectral graph of an example of an extrapolation process.

Channel prediction is performed at the hub by applying an optimization criterion, e.g., the Minimal Mean Square Error (MMSE) prediction filter to the hub's channel estimates (acquired by either implicit or explicit feedback). The MMSE filter is computed in two steps. First, the hub computes empirical estimates of the channel's second order statistics. Second, using standard estimation theory, the hub uses the second order statistics to compute the MMSE prediction filter. Before going into details, we introduce notation:

We denote the number of antennas at the hub by $L_h$. We denote the number of UE antennas by $L_u$. We index the UE antennas by $u=1, \ldots, L_u$. We denote the number frequency bins by $N_f$. We denote the number of feedback times by $n_{past}$. We denote the number of prediction times by $n_{future}$ FIG. 14 shows an example of an extrapolation process setup.

For each UE antenna, the channel estimates for all the frequencies, hub antennas, and feedback times can be combined to form a single $N_f L_h n_{past}$ dimensional vector. We denote this by:

$$\hat{H}_{past}(u) \in \mathbb{C}^{N_f L_h n_{past}}, \tag{19}$$

Likewise, the channel values for all the frequencies, hub antennas, and prediction times can be combined to form a single $N_f L_h n_{future}$ dimensional vector. We denote this by:

$$\hat{H}_{future}(u) \in \mathbb{C}^{N_f L_h n_{future}}, \tag{20}$$

In typical implementations, these are extremely high dimensional vectors and that in practice some form of compression should be used. For example, principal component compression may be one compression technique used.

Empirical Second Order Statistics

Empirical second order statistics are computed separately for each UE antenna in the following way:

At fixed times, the hub receives through feedback N samples of $\hat{H}_{past}(u)$ and estimates of $H_{future}(u)$. We denote them by: $\hat{H}_{past}(u)_i$ and $\hat{H}_{future}(u)_i$ for $i=1, \ldots, N$.

The hub computes an estimate of the covariance of $\hat{H}_{past}(u)$, which we denote by $\hat{R}_{past}(u)$:

$$\hat{R}_{past}(u) = \frac{1}{N} \sum_{i=1}^{N} \hat{H}_{past}(u)_i \hat{H}_{past}(u)_i^* \tag{21}$$

The hub computes an estimate of the covariance of $H_{future}(u)$, which we denote by $\hat{R}_{future}(u)$:

$$\hat{R}_{future}(u) = \frac{1}{N} \sum_{i=1}^{N} \hat{H}_{future}(u)_i \hat{H}_{future}(u)_i^* \tag{22}$$

The hub computes an estimate of the correlation between $H_{future}(u)$ and $\hat{H}_{past}(u)$, which we denote by $\hat{R}_{past,future}(u)$:

$$\hat{R}_{future,past}(u) = \frac{1}{N} \sum_{i=1}^{N} \hat{H}_{future}(u)_i \hat{H}_{past}(u)_i^* \tag{23}$$

In typical wireless scenarios (pedestrian to highway speeds) the second order statistics of the channel change slowly (on the order of 1-10 seconds). Therefore, they should be recomputed relatively infrequently. Also, in some instances it may be more efficient for the UEs to compute estimates of the second order statistics and feed these back to the hub.

MMSE Prediction Filter

Using standard estimation theory, the second order statistics can be used to compute the MMSE prediction filter for each UE antenna:

$$C(u) = \hat{R}_{future,past}(u) \hat{R}_{past}^{-1}(u) \tag{24}$$

Where C(u) denotes the MMSE prediction filter. The hub can now predict the channel by applying feedback channel estimates into the MMSE filter:

$$\hat{H}_{future}(u) = C(u) \hat{H}_{past}(u) \tag{25}$$

Prediction Error Variance

We denote the MMSE prediction error by $\Delta H_{future}(u)$, then:

$$H_{future}(u) = \hat{H}_{future}(u) + \Delta H_{future}(u). \tag{26}$$

We denote the covariance of the MMSE prediction error by $R_{error}(u)$, with:

$$R_{error}(u) = \mathbb{E}[\Delta H_{future}(u) \Delta H_{future}(u)^*] \tag{27}$$

Using standard estimation theory, the empirical second order statistics can be used to compute an estimate of $R_{error}(u)$:

$$\hat{R}_{error}(u) = C(U) \hat{R}_{past}(u) C(u)^* - C(u) \hat{R}_{future,past}(u)^* - \hat{R}_{future,past}(u) C(u)^* + \hat{R}_{future}(u) \tag{28}$$

Simulation Results

Figure 15:
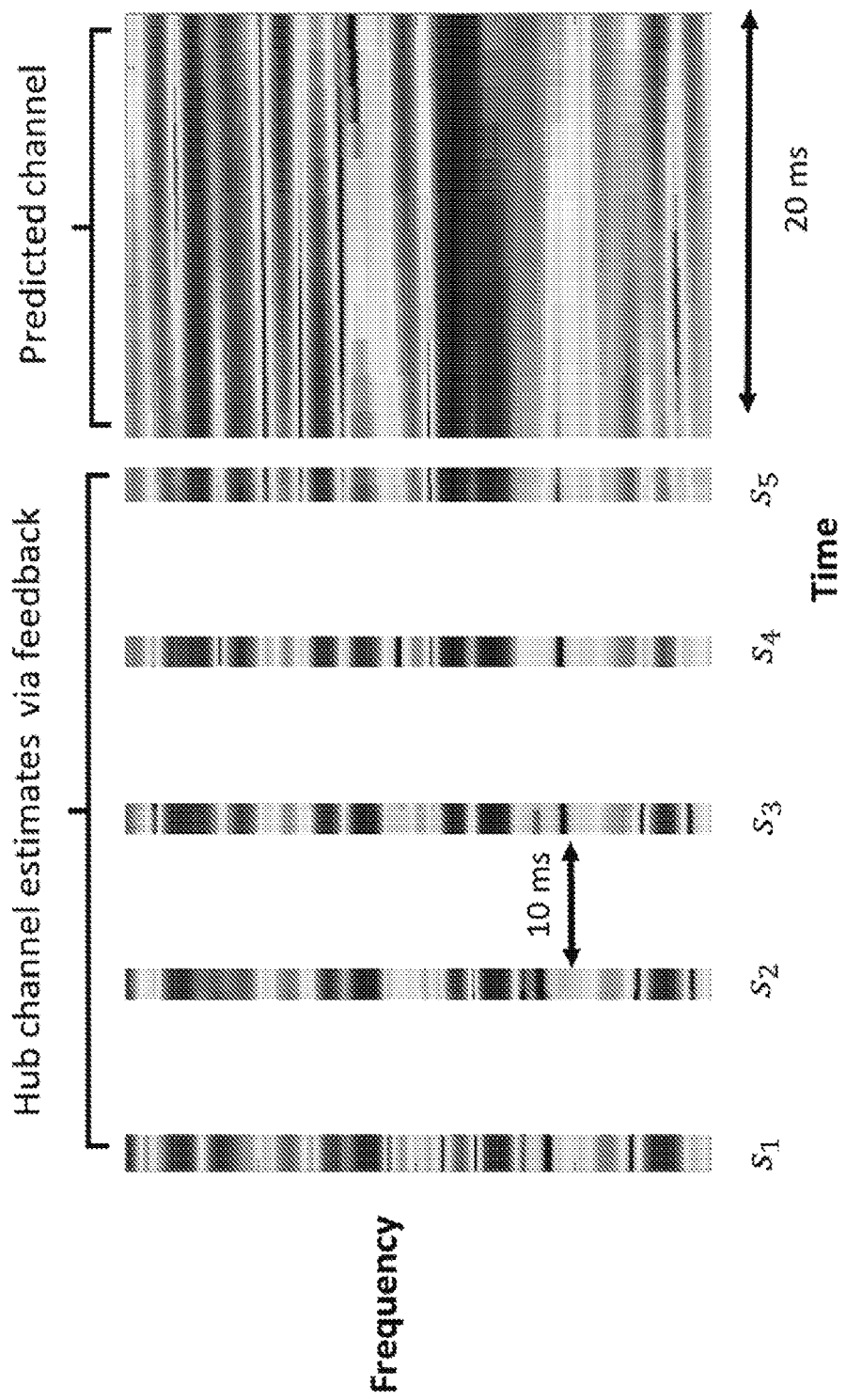
FIG. 15 is a spectral graph of another example of an extrapolation process.

We now present simulation results illustrating the use of the MMSE filter for channel prediction. Table 1 gives the simulation parameters and FIG. 15 shows the extrapolation setup for this example.

TABLE 1

| | |
|---|---|
| Subcarrier spacing | 15 kHz |
| Number of subcarriers | 512 |
| Delay spread | 3 µs |
| Doppler spread | 600 Hz |
| Number of channel feedback estimates | 5 |
| Spacing of channel feedback estimates | 10 ms |
| Prediction range | 0-20 ms into the future |

Figure 16:
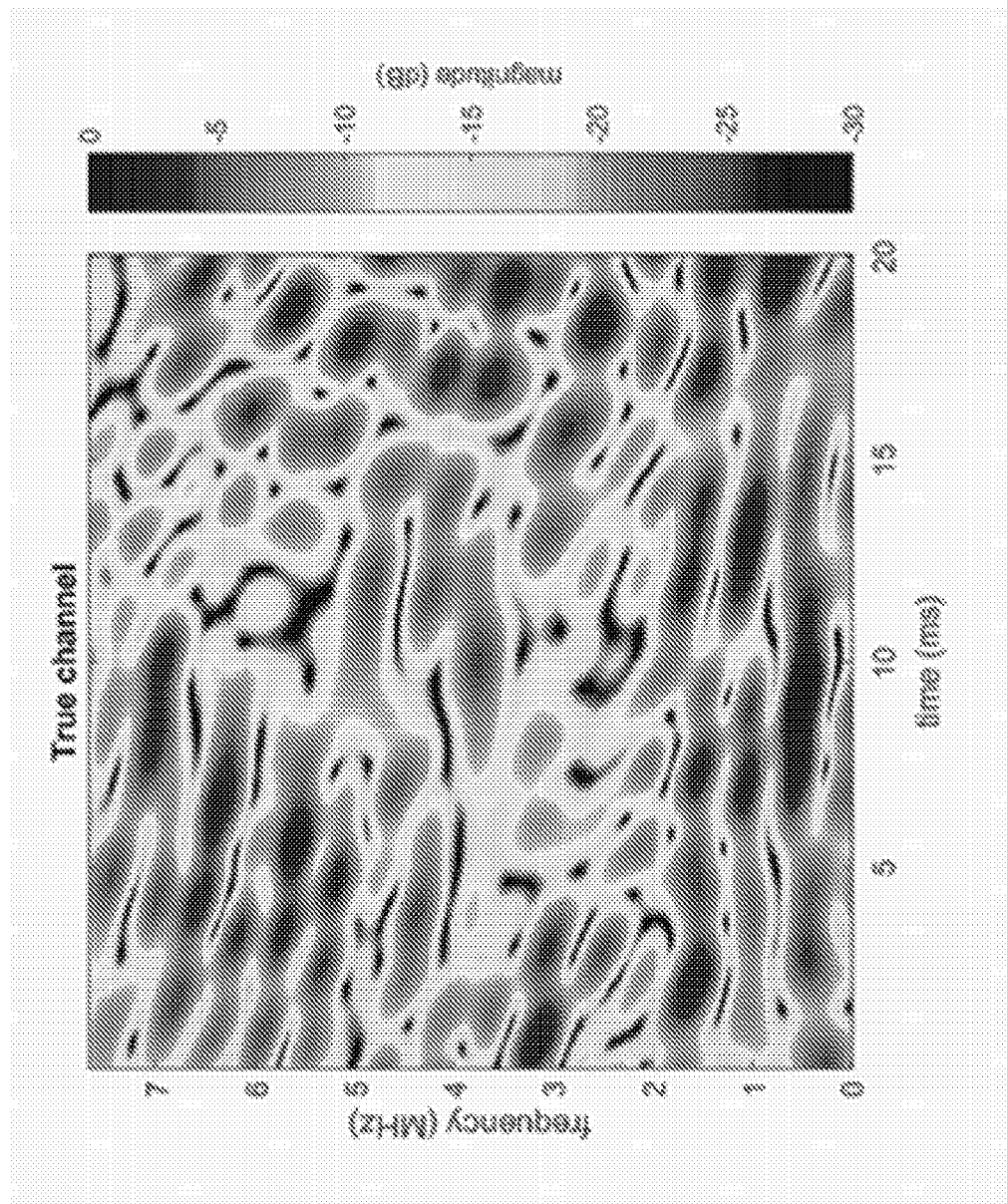
FIG. 16 compares spectra of a true and a predicted channel in some precoding implementation embodiments.
Figure 16:
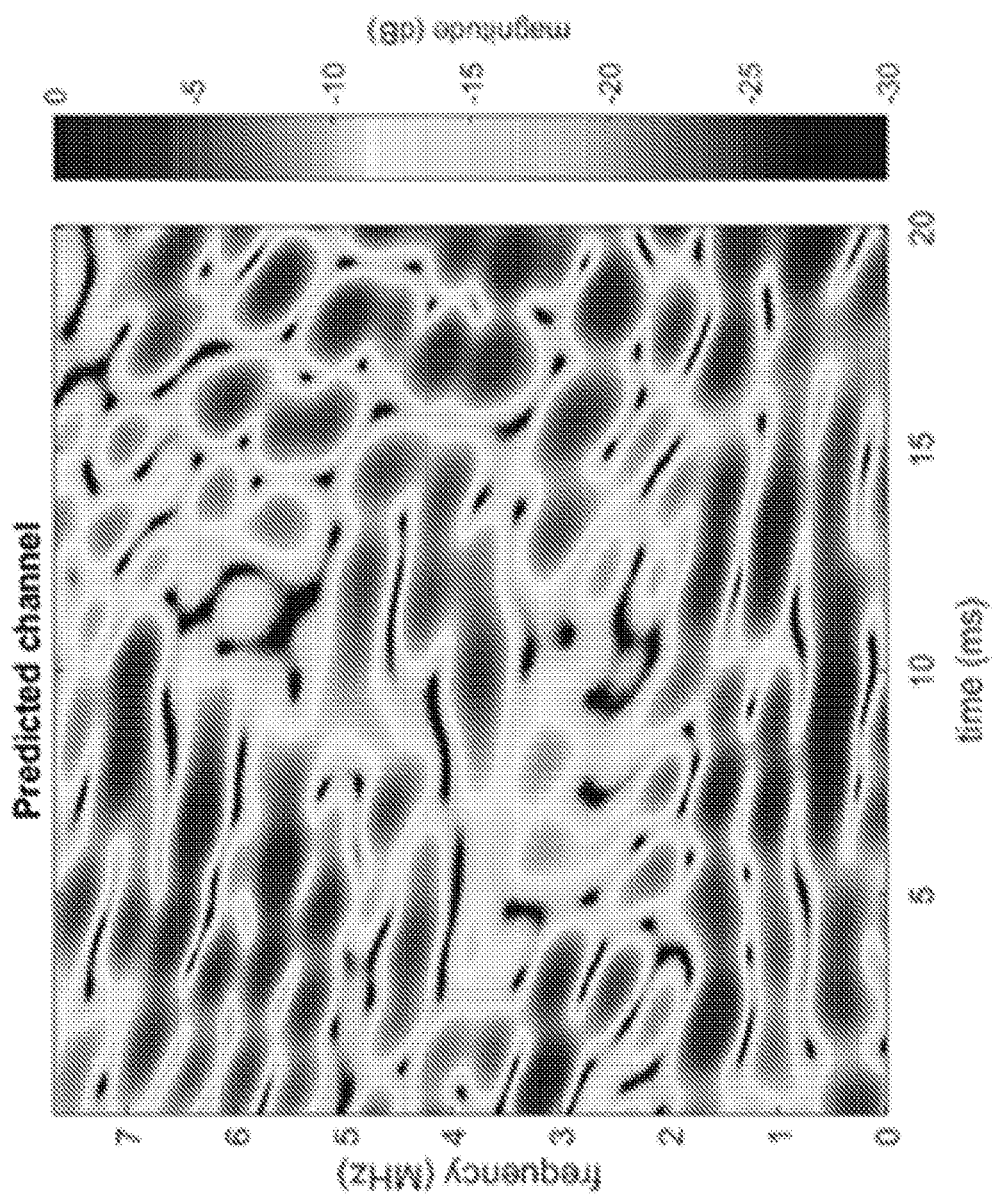

Fifty samples of $\hat{H}_{past}$ and $\hat{H}_{future}$ were used to compute empirical estimates of the second order statistics. The second order statistics were used to compute the MMSE prediction filter. FIG. 16 shows the results of applying the filter. The results have shown that the prediction is excellent at predicting the channel, even 20 ms into the future.

Block Diagrams

Figure 17:
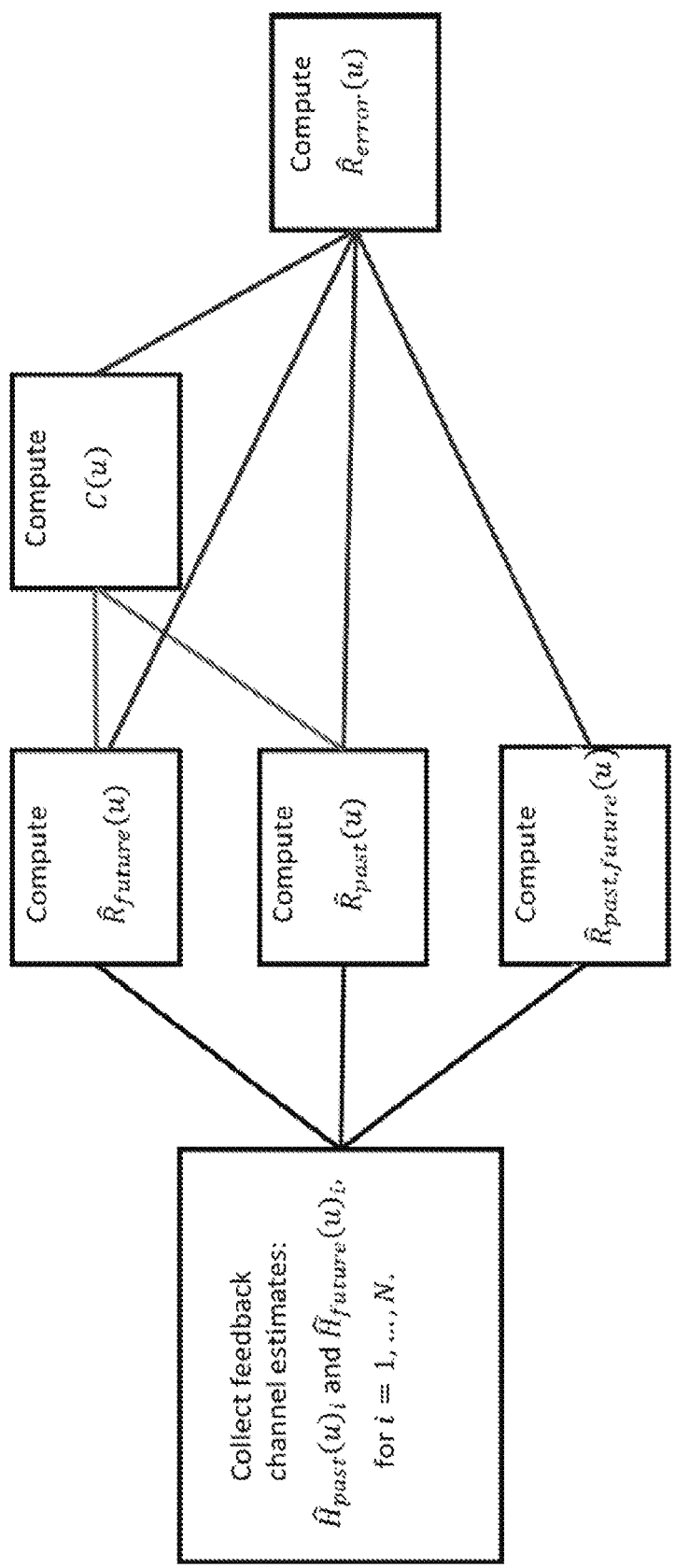
FIG. 17 is a block diagram depiction of a process for computing prediction filter and error covariance.

In some embodiments, the prediction is performed independently for each UE antenna. The prediction can be separated into two steps:

1) Computation of the MMSE prediction filter and prediction error covariance: the computation can be performed infrequently (on the order of seconds). The computation is summarized in FIG. 17. Starting from left in FIG. 17, first, feedback channel estimates are collected. Next, the past, future and future/past correlation matrices are computed. Next the filter estimate C(u) and the error estimate are computed.

Figure 18:
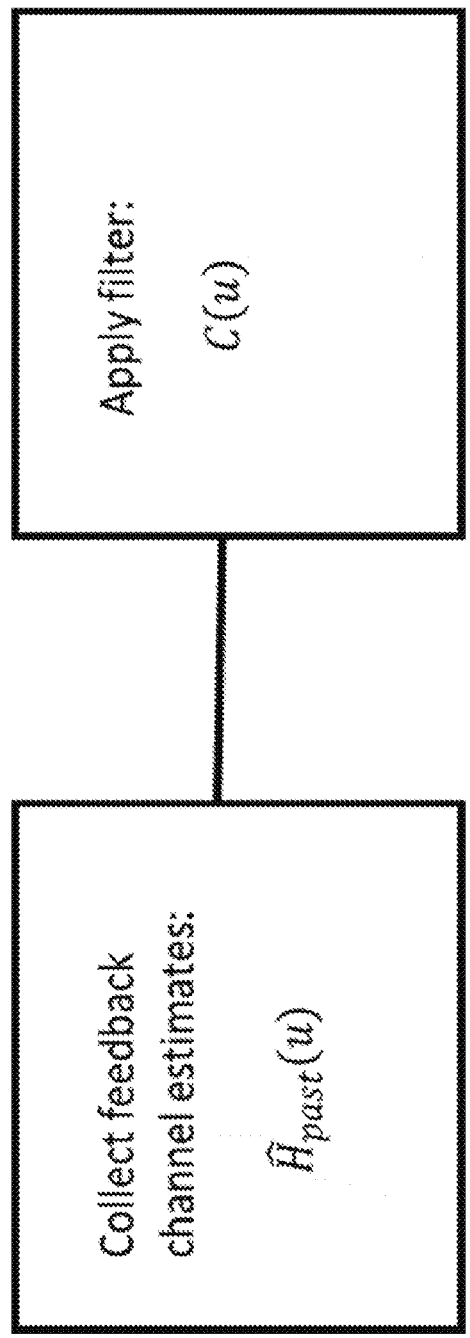
FIG. 18 is a block diagram illustrating an example of a channel prediction process.

2) Channel prediction: is performed every time precoding is performed. The procedure is summarized in FIG. 18.

Optimal Precoding Filter

Using MMSE prediction, the hub computes an estimate of the downlink channel matrix for the allocation of time and frequency the pre-coded data will be transmitted. The estimates are then used to construct precoding filters. Precoding is performed by applying the filters on the data the hub wants the UEs to receive. Embodiments may derive the "optimal" precoding filters as follows. Before going over details we introduce notation.

Frame (as defined previously): precoding is performed on a fixed allocation of time and frequency, with $N_f$ frequency bins and $N_t$ time bins. We index the frequency bins by: $f=1, \ldots, N_f$. We index the time bins by $t=1, \ldots, N_t$.

Channel estimate: for each time and frequency bin the hub has an estimate of the downlink channel which we denote by $\hat{H}(f,t) \in \mathbb{C}^{L_u \times L_h}$.

Error correlation: we denote the error of the channel estimates by $\Delta H(f,t)$, then:

$$H(f,t)=\hat{H}(f,t)+\Delta H(f,t), \quad (29)$$

We denote the expected matrix correlation of the estimation error by $R_{\Delta H}(f,t) \in \mathbb{C}^{L_h \times L_h}$, with:

$$R_{\Delta H}(f,t) = \mathbb{E}[\Delta H(f,t)^* \Delta H(f,t)]. \quad (30)$$

The hub can be easily compute these using the prediction error covariance matrices computed previously: $\hat{R}_{error}(U)$ for $u=1, \ldots, L_u$.

Signal: for each time and frequency bin the UE wants to transmit a signal to the UEs which we denote by $s(f,t) \in \mathbb{C}^{L_u}$.

Precoding filter: for each time and frequency bin the hub uses the channel estimate to construct a precoding filter which we denote by $W(f,t) \in \mathbb{C}^{L_h \times L_u}$.

White noise: for each time and frequency bin the UEs experience white noise which we denote by $n(f,t) \in \mathbb{C}^{L_u}$. We assume the white noise is iid Gaussian with mean zero and variance $N_0$.

Hub Energy Constraint

When the precoder filter is applied to data, the hub power constraint may be considered. We assume that the total hub transmit energy cannot exceed $N_f N_t L_h$. Consider the pre-coded data:

$$W(f,t)s(f,t), \quad (31)$$

To ensure that the pre-coded data meets the hub energy constraints the hub applies normalization, transmitting:

$$\lambda W(f,t)s(f,t), \quad (32)$$

Where the normalization constant $\lambda$ is given by:

$$\lambda = \sqrt{\frac{N_f N_t L_h}{\sum_{f,t} \|W(f,t)s(f,t)\|^2}} \quad (33)$$

Receiver SINR

The pre-coded data then passes through the downlink channel, the UEs receive the following signal:

$$\lambda H(f,t)W(f,t)s(f,t)+n(f,t), \quad (34)$$

The UEs then removes the normalization constant, giving a soft estimate of the signal:

$$s_{soft}(f,t) = H(f,t)W(f,t)s(f,t) + \frac{1}{\lambda}n(f,t). \quad (35)$$

The error of the estimate is given by:

$$s_{soft}(f,t) - s(f,t) = H(f,t)W(f,t)s(f,t) - s(f,t) + \frac{1}{\lambda}n(f,t). \quad (36)$$

The error can be decomposed into two independent terms: interference and noise. Embodiments can compute the total expected error energy:

$$\text{expected error energy} = \sum_{f=1}^{N_f} \sum_{t=1}^{N_t} \mathbb{E}\|s_{soft}(f,t) - s(f,t)\|^2 = \quad (37)$$

$$\sum_{f=1}^{N_f} \sum_{t=1}^{N_t} \mathbb{E}\|H(f,t)W(f,t)s(f,t) - s(f,t)\|^2 + \frac{1}{\lambda^2}\mathbb{E}\|n(f,t)\|^2 =$$

$$\sum_{f=1}^{N_f} \sum_{t=1}^{N_t} \left(\hat{H}(f,t)W(f,t)s(f,t) - s(f,t)\right)^*$$

$$\left(\hat{H}(f,t)W(f,t)s(f,t) - s(f,t)\right) +$$

$$\left(W(f,t)s(f,t)\right)^* \left(R_{\Delta H}(f,t) + \frac{N_0 L_u}{L_h}I\right)(W(f,t)s(f,t))$$

Optimal Precoding Filter

We note that the expected error energy is convex and quadratic with respect to the coefficients of the precoding filter. Therefore, calculus can be used to derive the optimal precoding filter:

$$W_{opt}(f,t) = \left(\hat{H}(f,t)^* \hat{H}(f,t) + R_{\Delta H}(f,t) + \frac{N_0 L_u}{L_h}I\right)^{-1} \hat{H}(f,t)^* \quad (38)$$

Accordingly, some embodiments of an OTFS precoding system use this filter (or an estimate thereof) for precoding.

Simulation Results

Figure 19:
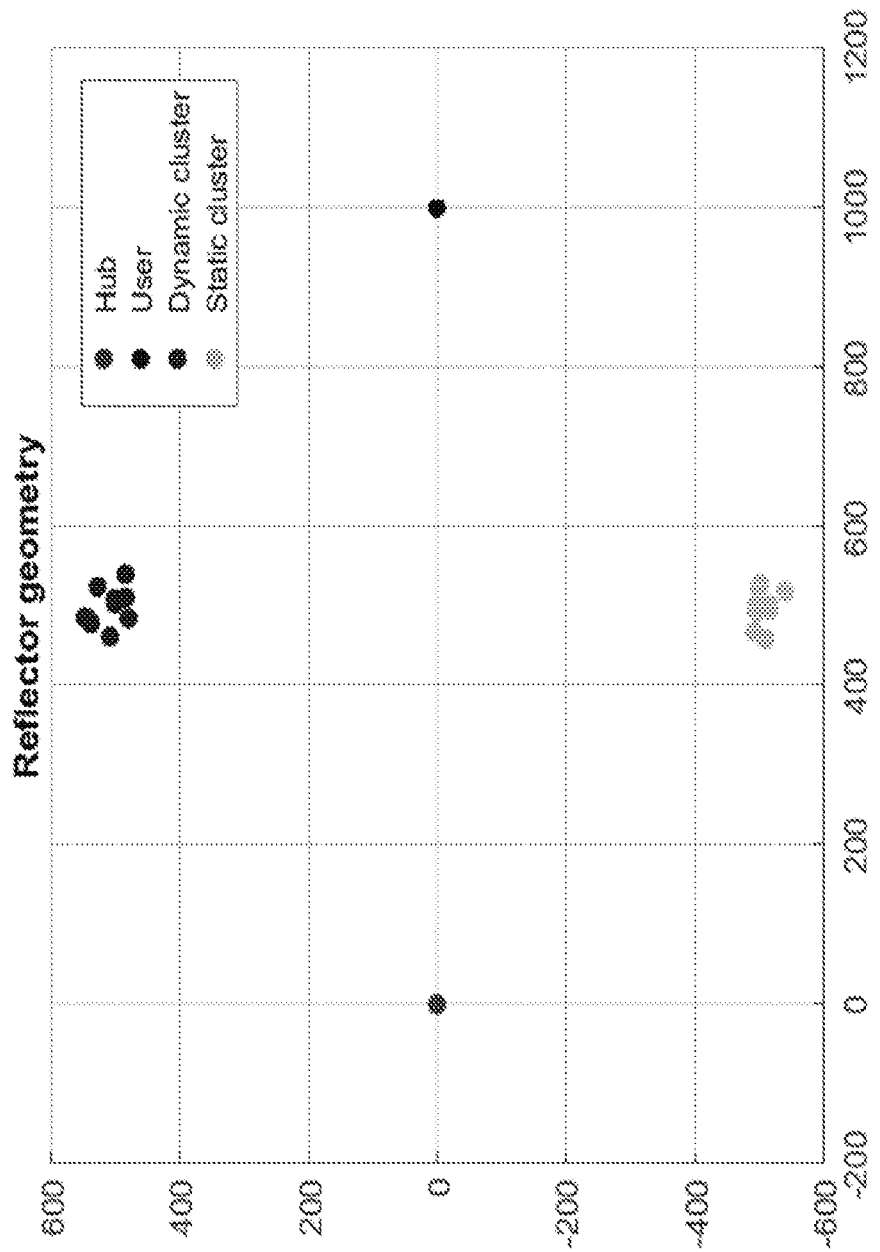
FIG. 19 is a graphical depiction of channel geometry of an example wireless channel.
Figure 20:
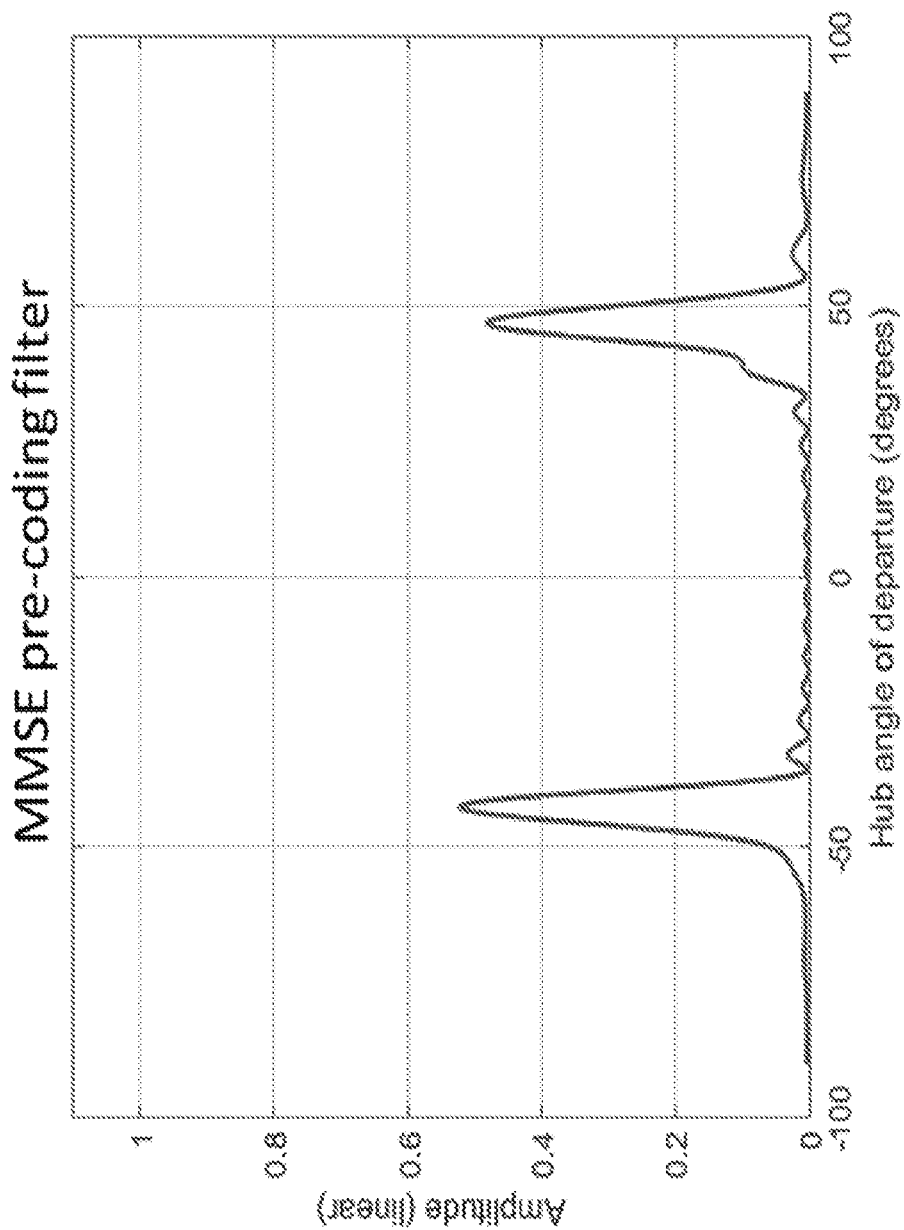
FIG. 20 is a graph showing an example of a precoding filter antenna pattern.

We now present a simulation result illustrating the use of the optimal precoding filter. The simulation scenario was a hub transmitting data to a single UE. The channel was non line of sight, with two reflector clusters: one cluster consisted of static reflectors, the other cluster consisted of moving reflectors. FIG. 19 illustrates the channel geometry, with horizontal and vertical axis in units of distance. It is assumed that the hub has good Channel Side Information (CSI) regarding the static cluster and poor CSI regarding the dynamic cluster. The optimal precoding filter was compared to the MMSE precoding filter. FIG. 20 displays the antenna pattern given by the MMSE precoding filter. It can be seen that the energy is concentrated at ±45°, that is, towards the two clusters. The UE SINR is 15.9 dB, the SINR is relatively low due to the hub's poor CSI for the dynamic cluster.

Figure 21:
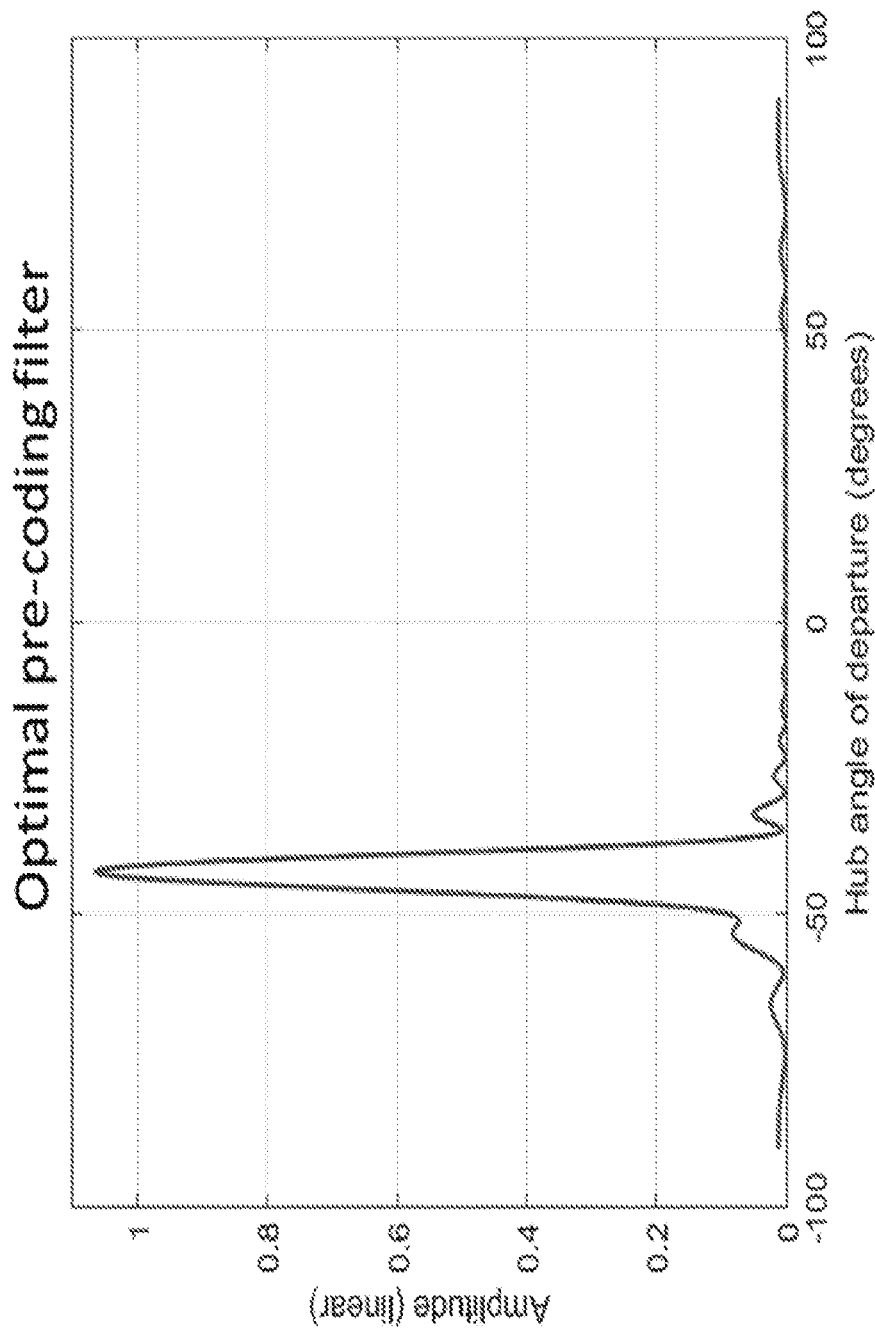
FIG. 21 is a graph showing an example of an optical pre-coding filter.

FIG. 21 displays the antenna pattern given by the optimal precoding filter as described above, e.g., using equation (38). In this example, the energy is concentrated at −45°, that is, toward the static cluster. The UE SINR is 45.3 dB, the SINR is high (compared to the MMSE case) due to the hub having good CSI for the static reflector.

The simulation results depicted in FIG. 20 and FIG. 21 illustrate the advantage of the optimal pre-coding filter. The filter it is able to avoid sending energy towards spatial regions of poor channel CSI, e.g., moving regions.

Example Block Diagrams

Figure 22:
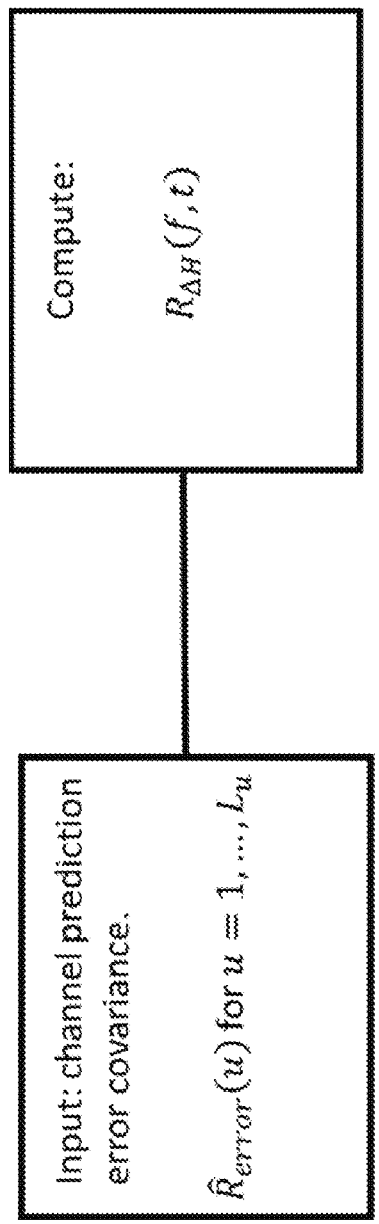
FIG. 22 is a block diagram showing an example process of error correlation computation.

Precoding is performed independently for each time frequency bin. The precoding can be separated into three steps:

[1] Computation of error correlation: the computation be performed infrequently (on the order of seconds). The computation is summarized in FIG. 22.

Figure 23:
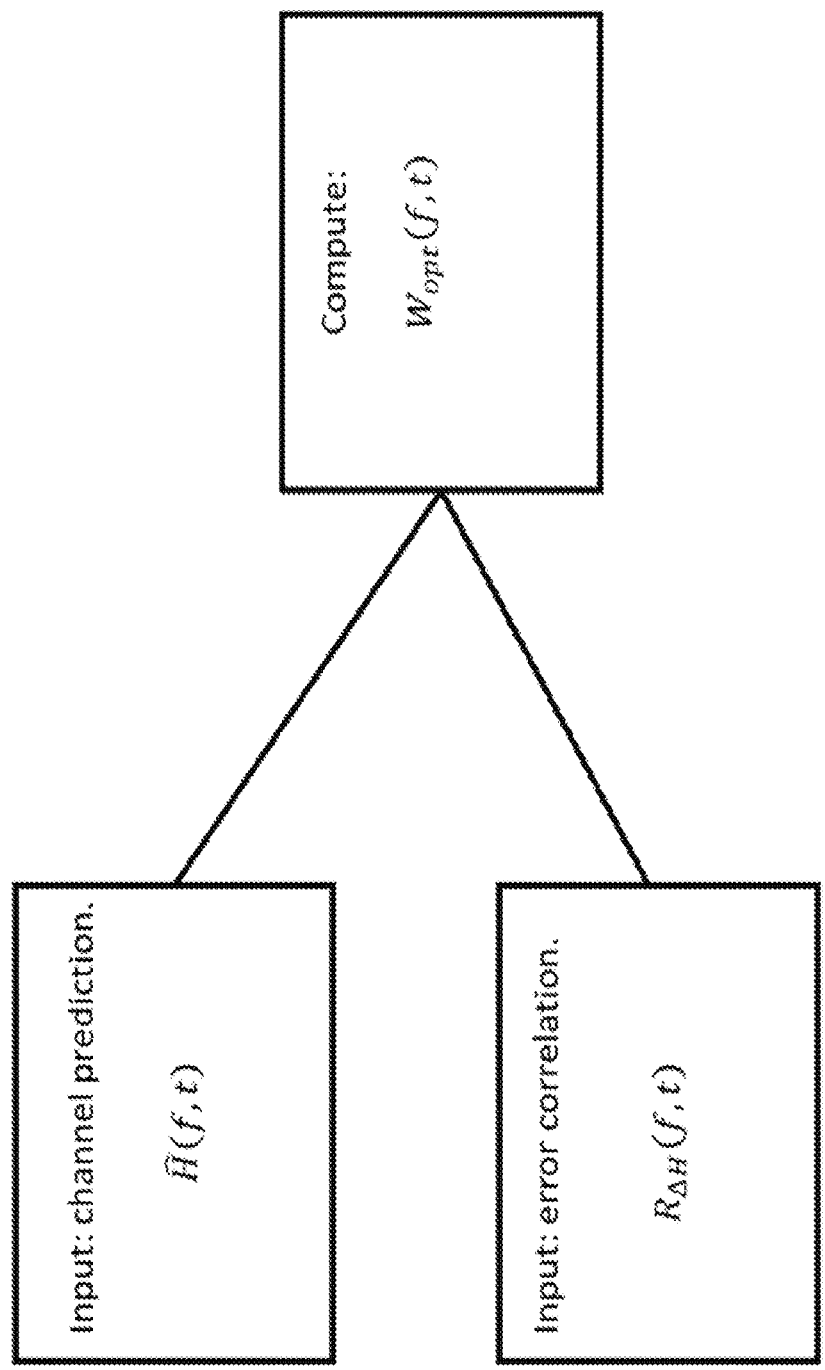
FIG. 23 is a block diagram showing an example process of precoding filter estimation.

[2] Computation of optimal precoding filter: may be performed every time pre-coding is performed. The computation is summarized in FIG. 23.

Figure 24:
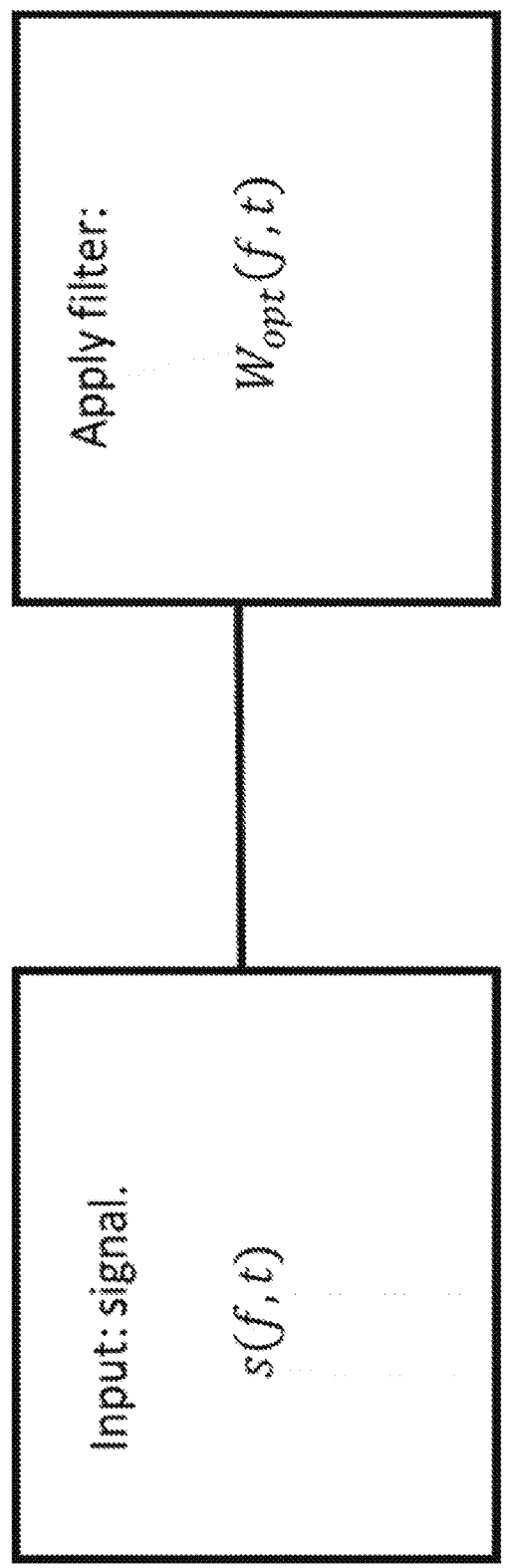
FIG. 24 is a block diagram showing an example process of applying an optimal precoding filter.

[3] Application of the optimal precoding filter: may be performed every time pre-coding is performed. The procedure is summarized in FIG. 24.

OTFS Vector Perturbation

Before introducing the concept of vector perturbation, we outline the application of the optimal pre-coding filter to OTFS.

OTFS Optimal Precoding

In OTFS, the data to be transmitted to the UEs are encoded using QAMs in the delay-Doppler domain. We denote this QAM signal by x, then:

$$x(\tau,\nu) \in A^{L_u}, \quad (39)$$

for $\tau=1, \ldots, N_\tau$ and $\nu=1, \ldots, N_\nu$. A denotes the QAM constellation. Using the two-dimensional Fourier transform the signal can be represented in the time frequency domain. We denote this representation by X:

$$X(f,t)=(Fx)(f,t), \quad (40)$$

for $f=1, \ldots, N_f$ and $t=1, \ldots, N_t$. F denotes the two-dimensional Fourier transform. The hub applies the optimal pre-coding filter to X and transmit the filter output over the air:

$$\lambda W_{opt}(f,t)X(f,t), \quad (41)$$

for $f=1, \ldots, N_f$ and $t=1, \ldots, N_t$. $\lambda$ denotes the normalization constant. The UEs remove the normalization constant giving a soft estimate of X:

$$X_{soft}(f,t) = H(f,t)W_{opt}(f,t)X(f,t) + \frac{1}{\lambda}w(f,t), \quad (42)$$

for $f=1, \ldots, N_f$ and $t=1, \ldots, N_t$. The term $w(f,t)$ denotes white noise. We denote the error of the soft estimate by E:

$$E(f,t)=X_{soft}(f,t)-X(f,t), \quad (43)$$

for $f=1, \ldots, N_f$ and $t=1, \ldots, N_t$. The expected error energy was derived earlier in this document:

$$\text{expected error energy} = \sum_{f=1}^{N_f}\sum_{t=1}^{N_t} \mathbb{E}\|X_{soft}(f,t) - X(f,t)\|^2 \quad (44)$$

$$= \sum_{f=1}^{N_f}\sum_{t=1}^{N_t} X(f,t)^* M_{error}(f,t)X(f,t)$$

Where:

$$M_{error}(f,t) = (\hat{H}(f,t)W_{opt}(f,t) - 1)^*(\hat{H}(f,t)W_{opt}(f,t) - 1) + \quad (45)$$

$$\ldots W_{opt}(f,t)^*\left(R_{\Delta H}(f,t) + \frac{N_0 L_u}{L_h}\right)W_{opt}(f,t)$$

We call the positive definite matrix $M_{error}(f,t)$ the error metric.

Vector Perturbation

In vector perturbation, the hub transmits a perturbed version of the QAM signal:

$$x(\tau,\nu)+p(\tau,\nu), \quad (46)$$

for $\tau=1, \ldots, N_\tau$ and $\nu=1, \ldots, N_\nu$. Here, $p(\tau,\nu)$ denotes the perturbation signal. The perturbed QAMs can be represented in the time frequency domain:

$$X(f,t)+P(f,t)=(Fx)(f,t)+(Fp)(f,t), \quad (47)$$

for $f=1, \ldots, N_f$ and $t=1, \ldots, N_t$. The hub applies the optimal pre-coding filter to the perturbed signal and transmits the result over the air. The UEs remove the normalization constant giving a soft estimate of the perturbed signal:

$$X(f,t)+P(f,t)+E(f,t), \quad (48)$$

for $f=1, \ldots, N_f$ and $t=1, \ldots, N_t$. Where E denotes the error of the soft estimate. The expected energy of the error is given by:

$$\text{expected error energy} = \sum_{f=1}^{N_f}\sum_{t=1}^{N_t}(X(f,t)+P(f,t))^* M_{error}(f,t)(X(f,t)+P(f,t)) \quad (49)$$

The UEs then apply an inverse two dimensional Fourier transform to convert the soft estimate to the delay Doppler domain:

$$x(\tau,\nu)+p(\tau,\nu)+e(\tau,\nu), \quad (50)$$

for $\tau=1, \ldots, N_\tau$ and $\nu=1, \ldots, N_\nu$. The UEs then remove the perturbation $p(\tau,\nu)$ for each delay Doppler bin to recover the QAM signal x.

Collection of Vector Perturbation Signals

One question is: what collection of perturbation signals should be allowed? When making this decision, there are two conflicting criteria:

1) The collection of perturbation signals should be large so that the expected error energy can be greatly reduced.

2) The collection of perturbation signals should be small so the UE can easily remove them (reduced computational complexity):

$$x(\tau,\nu)+p(\tau,\nu) \rightarrow x(\tau,\nu) \quad (51)$$

Coarse Lattice Perturbation

An effective family of perturbation signals in the delay-Doppler domain, which take values in a coarse lattice:

$$p(\tau,\nu) \in B^{L_u}, \quad (52)$$

for $\tau=1, \ldots, N_\tau$ and $\nu=1, \ldots, N_\nu$. Here, B denotes the coarse lattice. Specifically, if the QAM symbols lie in the box: $[-r,r] \times j[-r,r]$ we take as our perturbation lattice $B = 2r\mathbb{Z} + 2rj\mathbb{Z}$. We now illustrate coarse lattice perturbation with an example.

EXAMPLES

Figure 25:
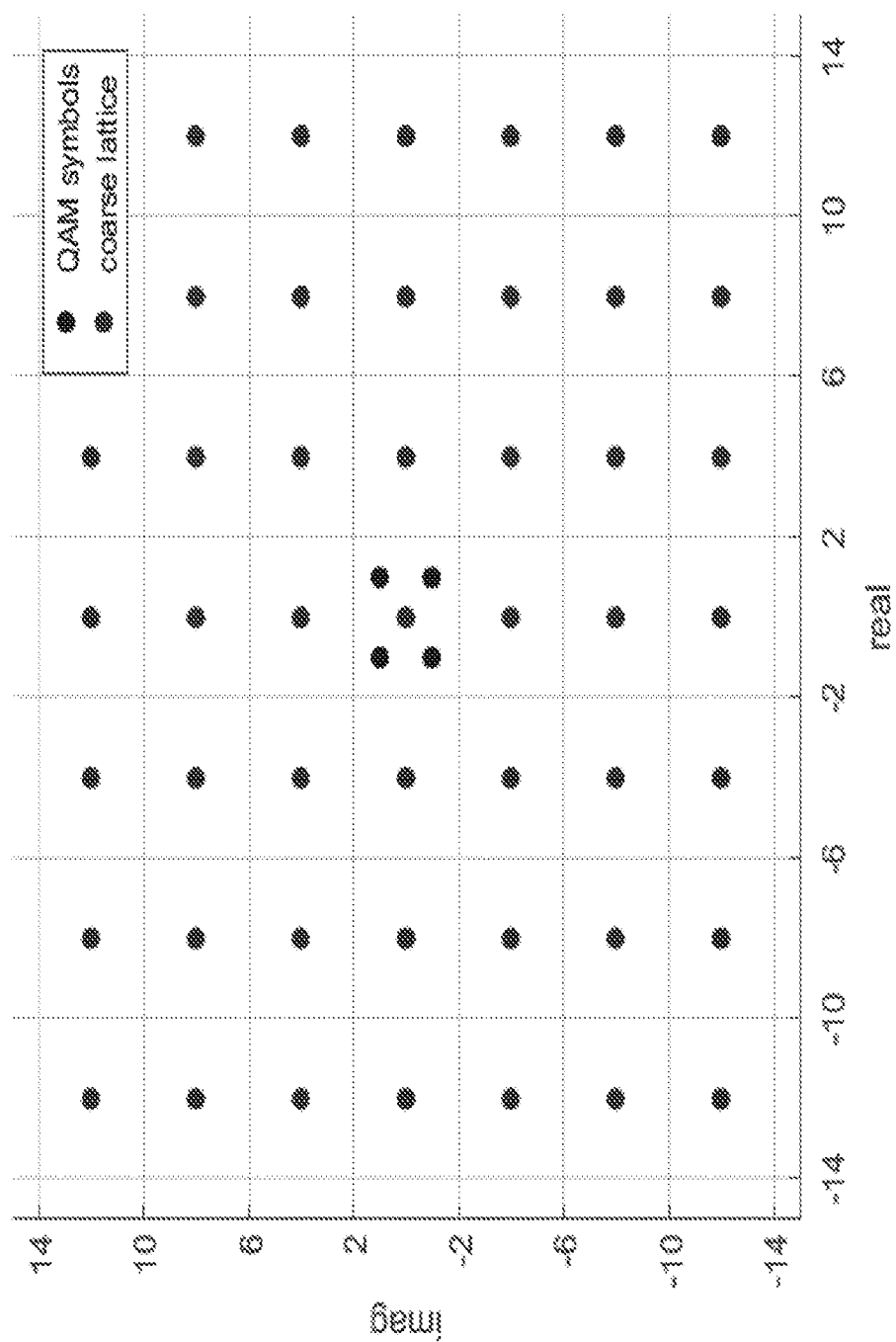
FIG. 25 is a graph showing an example of a lattice and QAM symbols.
Figure 26:
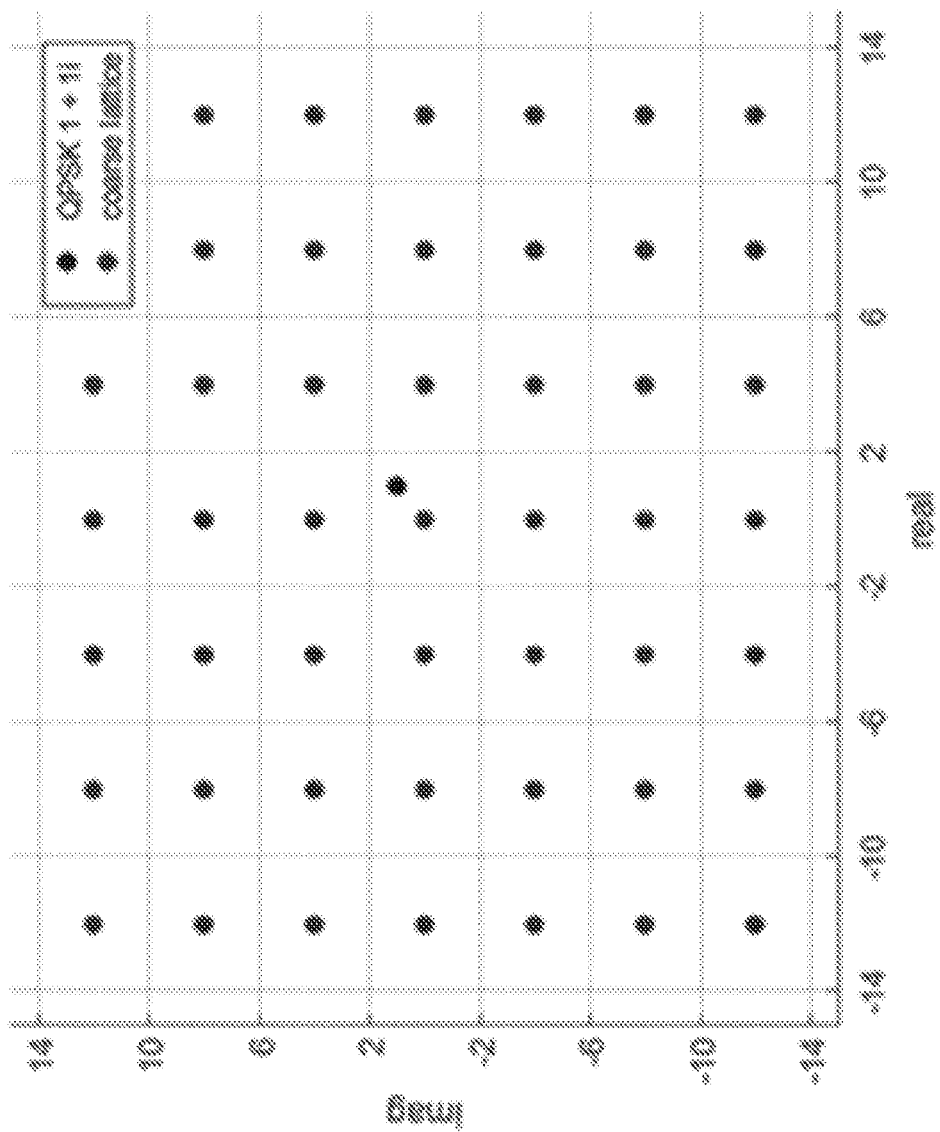
FIG. 26 graphically illustrates effects of perturbation examples.
Figure 26:
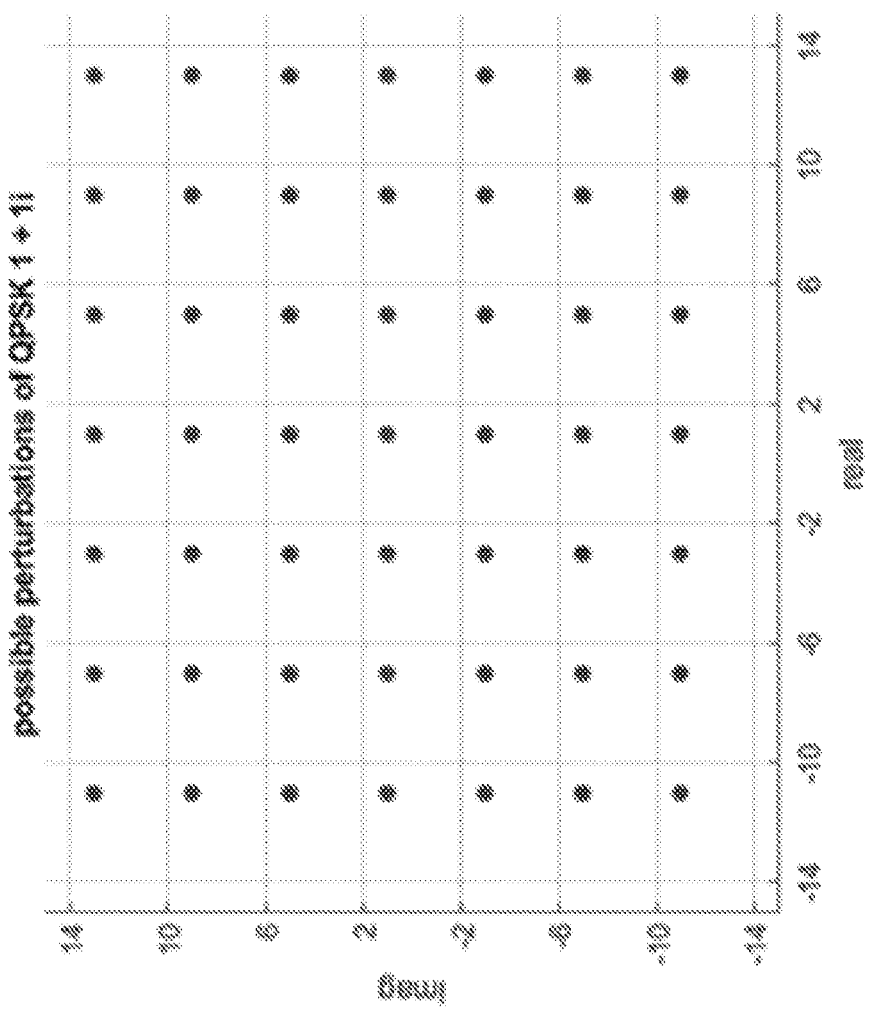
Figure 27:
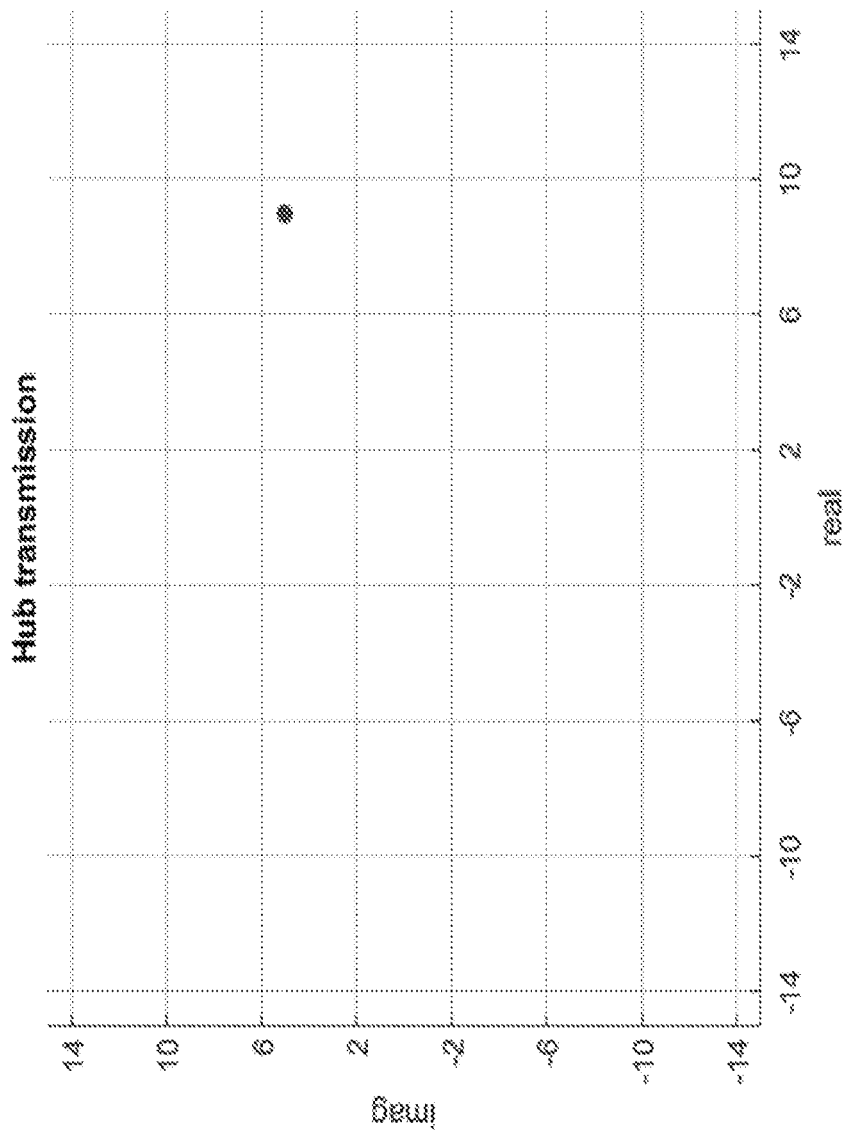
FIG. 27 is a graph illustrating an example of hub transmission.

Consider QPSK (or 4-QAM) symbols in the box $[-2,2] \times j[-2,2]$. The perturbation lattice is then $B = 4\mathbb{Z} + 4j\mathbb{Z}$. FIG. 25 illustrates the symbols and the lattice. Suppose the hub wants to transmit the QPSK symbol 1+1j to a UE. Then there is an infinite number of coarse perturbations of 1+1j that the hub can transmit. FIG. 26 illustrates an example. The hub selects one of the possible perturbations and transmits it over the air. FIG. 27 illustrates the chosen perturbed symbol, depicted with a single solid circle.

Figure 28:
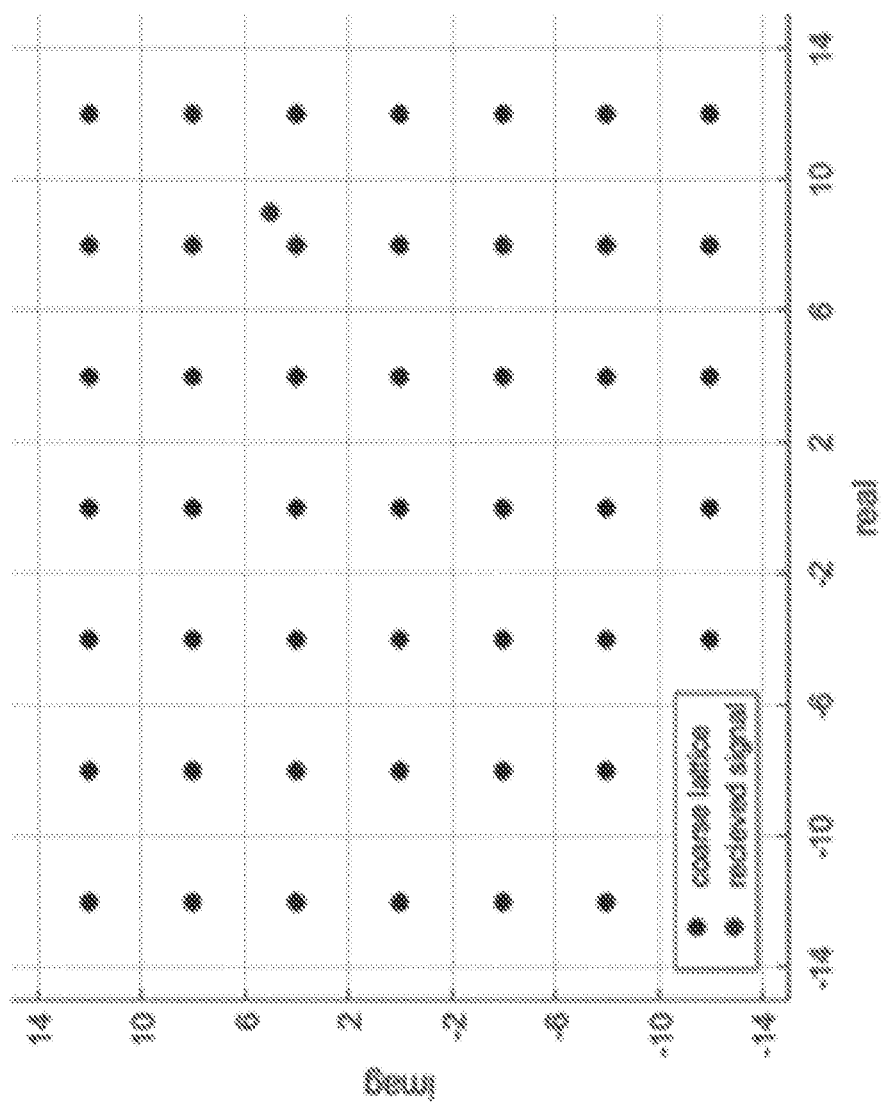
FIG. 28 is a graph showing an example of the process of a UE finding a closest coarse lattice point.
Figure 28:
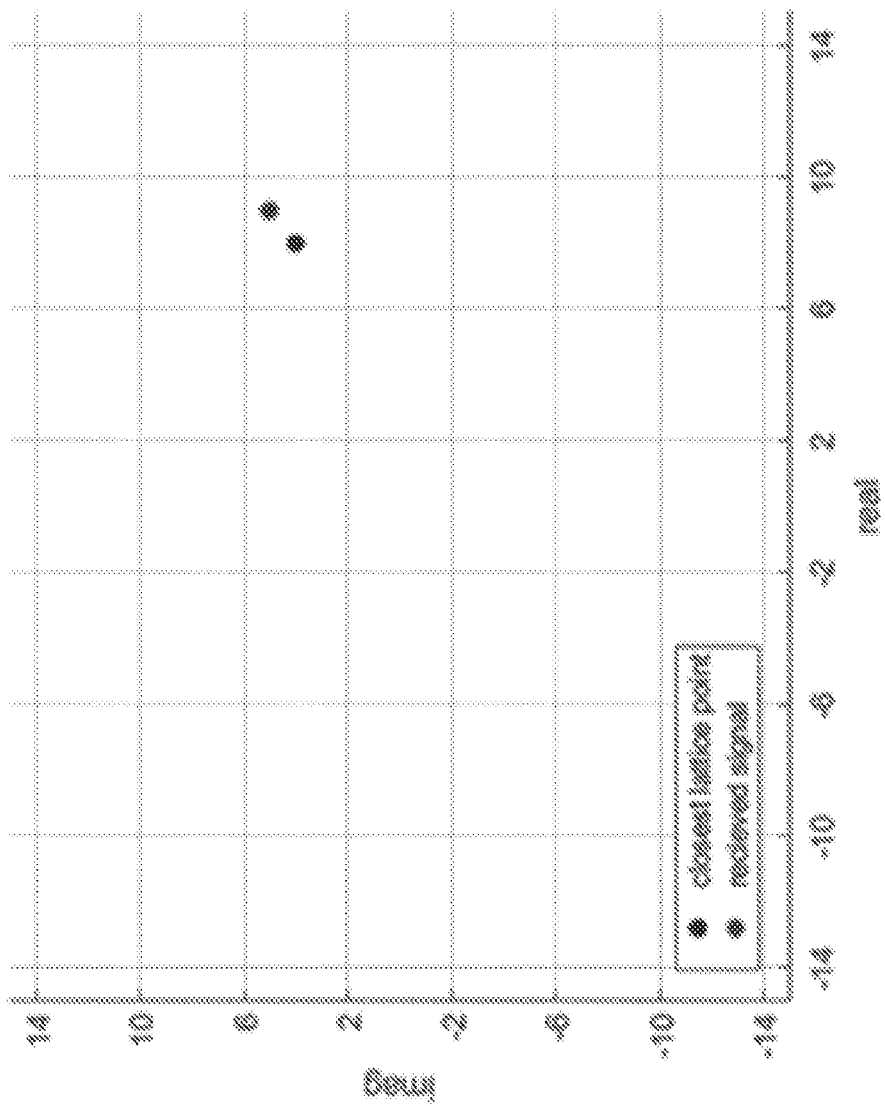

The UE receives the perturbed QPSK symbol. The UE then removes the perturbation to recover the QPSK symbol. To do this, the UE first searches for the coarse lattice point closest to the received signal. FIG. 28 illustrates this.

Figure 29:
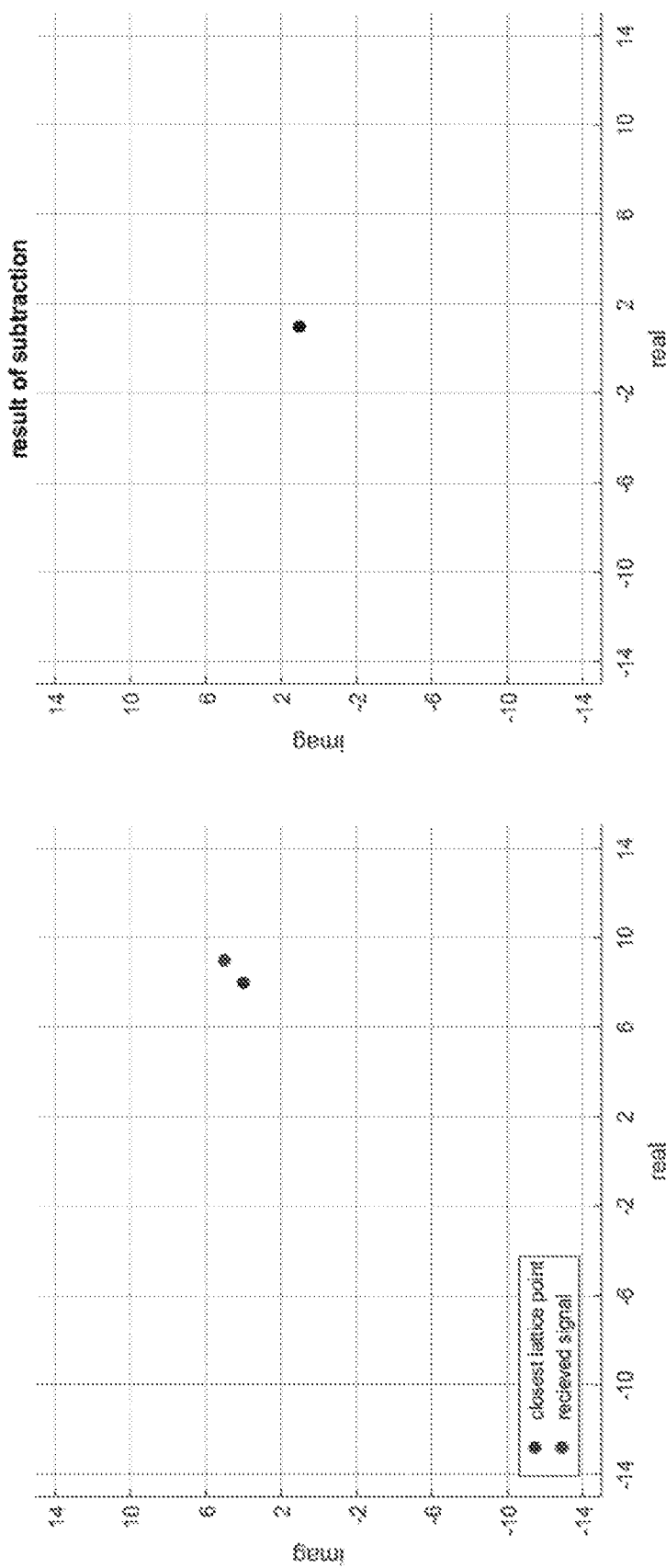
FIG. 29 is a graph showing an example process of UE recovering a QPSK symbol by subtraction.

The UE subtracts the closest lattice point from the received signal, thus recovering the QPSK symbol 1+1j. FIG. 29 illustrates this process.

Finding Optimal Coarse Lattice Perturbation Signal

The optimal coarse lattice perturbation signal, $p_{opt}$, is the one which minimizes the expected error energy:

$$p_{opt} = \arg\min_p \Sigma_{f=1}^{Nf} \Sigma_{t=1}^{Nt} (X(f,t)+P(f,t))^* M_{error}(f,t)(X(f,t)+P(f,t)) \quad (53)$$

The optimal coarse lattice perturbation signal can be computed using different methods. A computationally efficient method is a form of Thomlinson-Harashima precoding which involves applying a DFE filter at the hub.

Coarse Lattice Perturbation Example

We now present a simulation result illustrating the use of coarse lattice perturbation. The simulation scenerio was a hub antenna transmitting to a single UE antenna. Table 2 displays the modulation paramaters. Table 3 display the channel paramaters for this example.

TABLE 2

| Subcarrier spacing | 30 kHz |
|---|---|
| Number of subcarriers | 256 |
| OFDM symbols per frame | 32 |
| QAM order | Infinity (uniform in the unit box) |

TABLE 3

| Number of reflectors | 20 |
|---|---|
| Delay spread | 2 μs |
| Doppler spread | 1 KHz |
| Noise variance | −35 dB |

Figure 30:
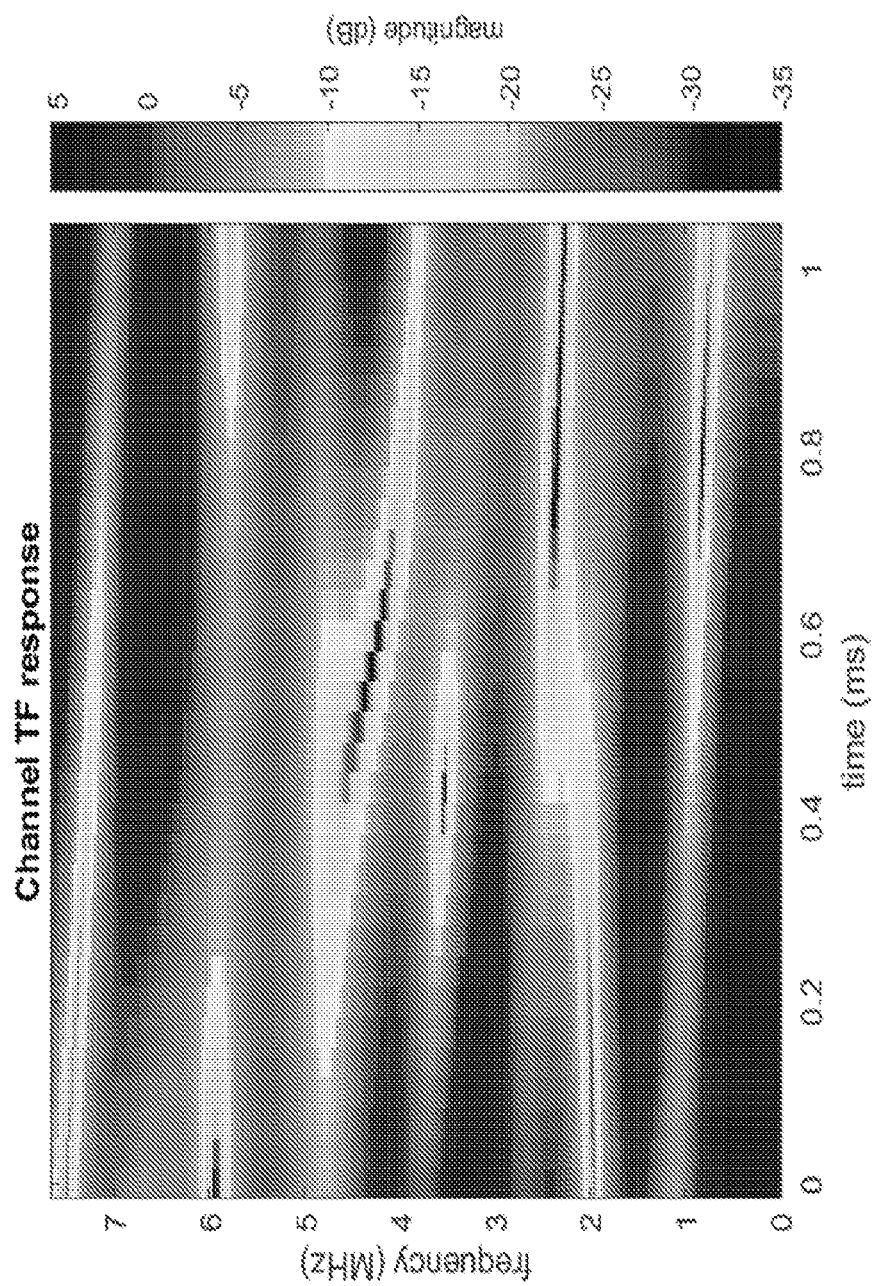
FIG. 30 depicts an example of a channel response.

FIG. 30 displays the channel energy in the time (horizontal axis) and frequency (vertical axis) domain.

Because this is a SISO (single input single output) channel, the error metric $M_{error}(f,t)$ is a positive scaler for each time frequency bin. The expected error energy is given by integrating the product of the error metric with the perturbed signal energy:

$$\text{expected error energy} = \Sigma_{f=1}^{Nf} \Sigma_{t=1}^{Nt} M_{error}(f,t) |X(f,t)+P(f,t)|^2 \quad (54)$$

Figure 31:
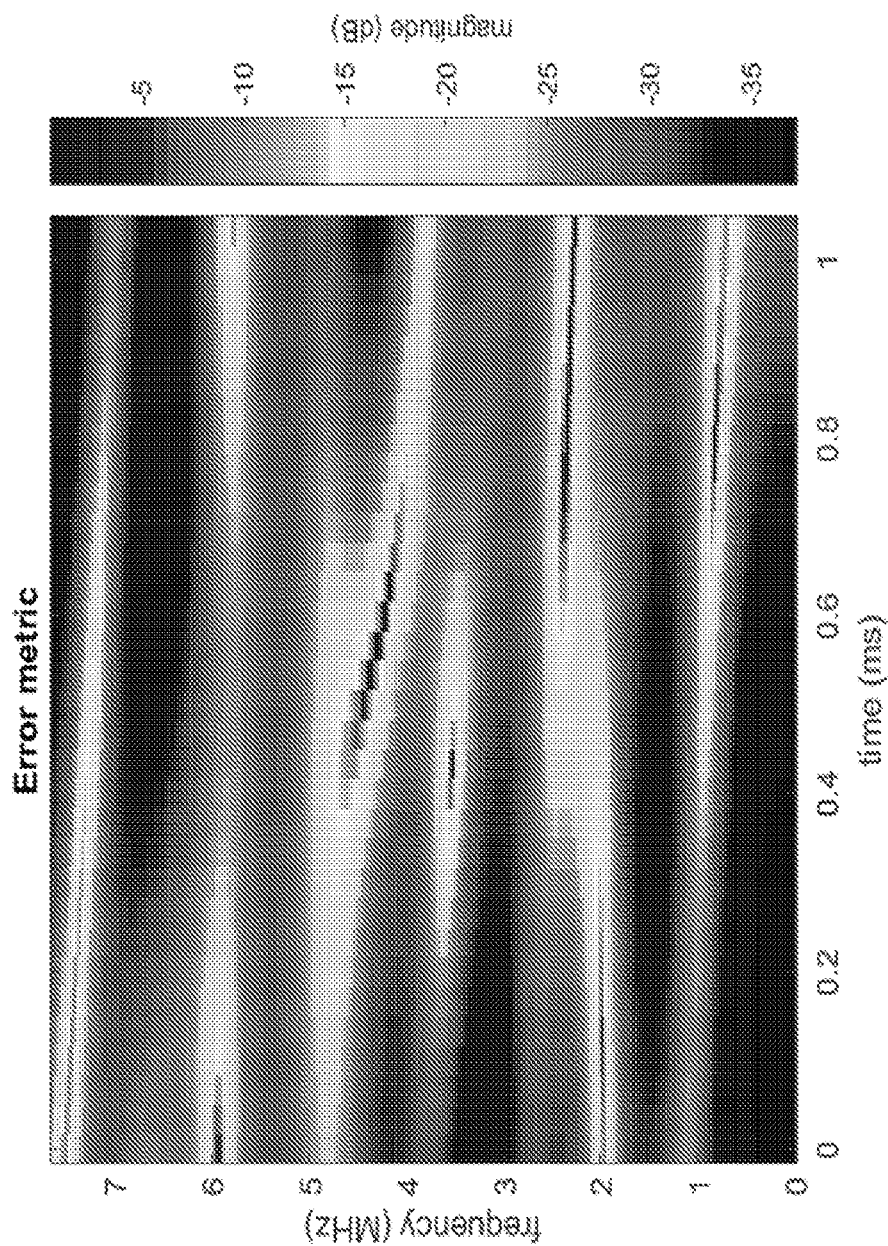
FIG. 31 depicts an example of an error of channel estimation.
Figure 32:
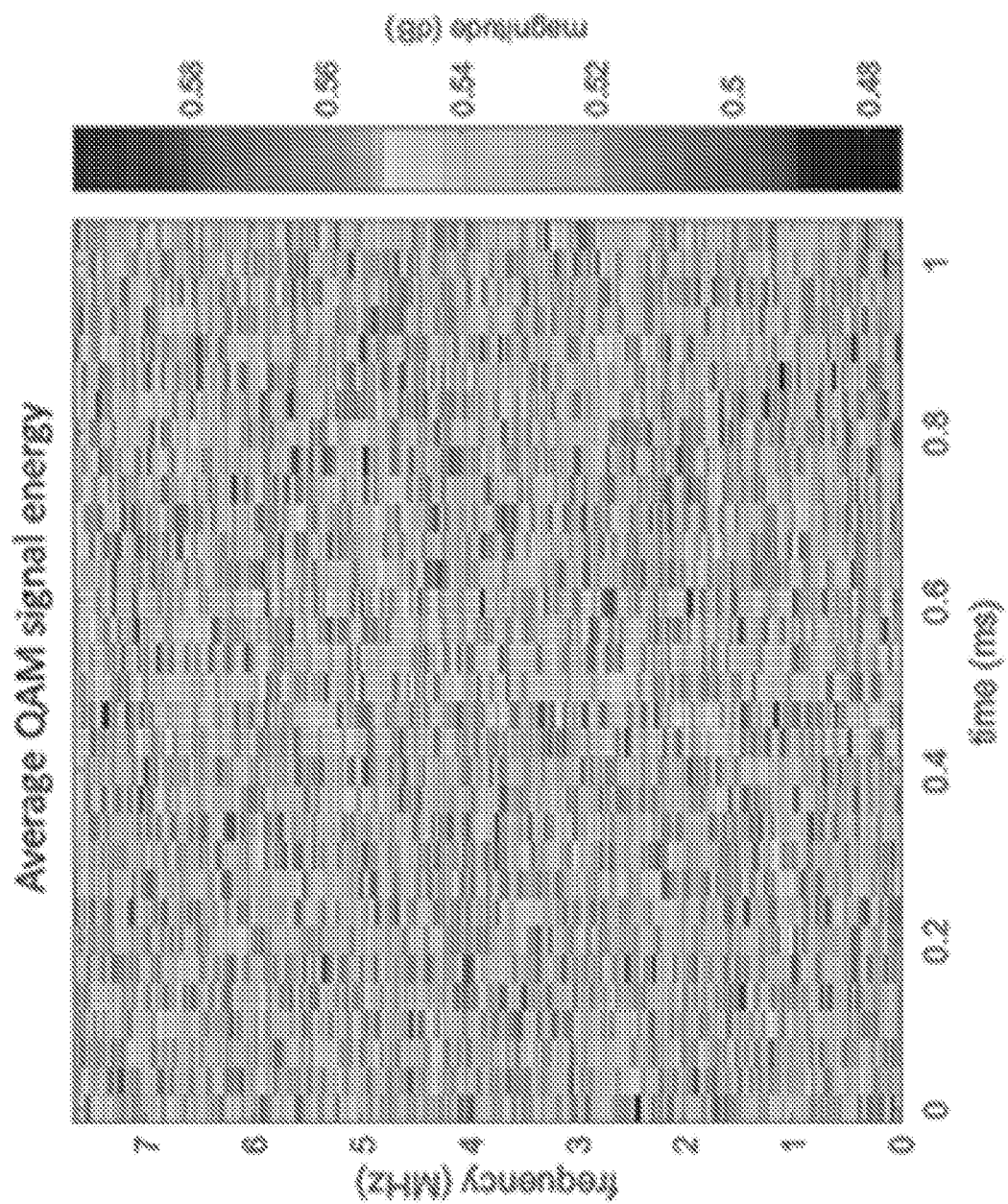
FIG. 32 shows a comparison of energy distribution of an example of QAM signals and an example of perturbed QAM signals.
Figure 32:
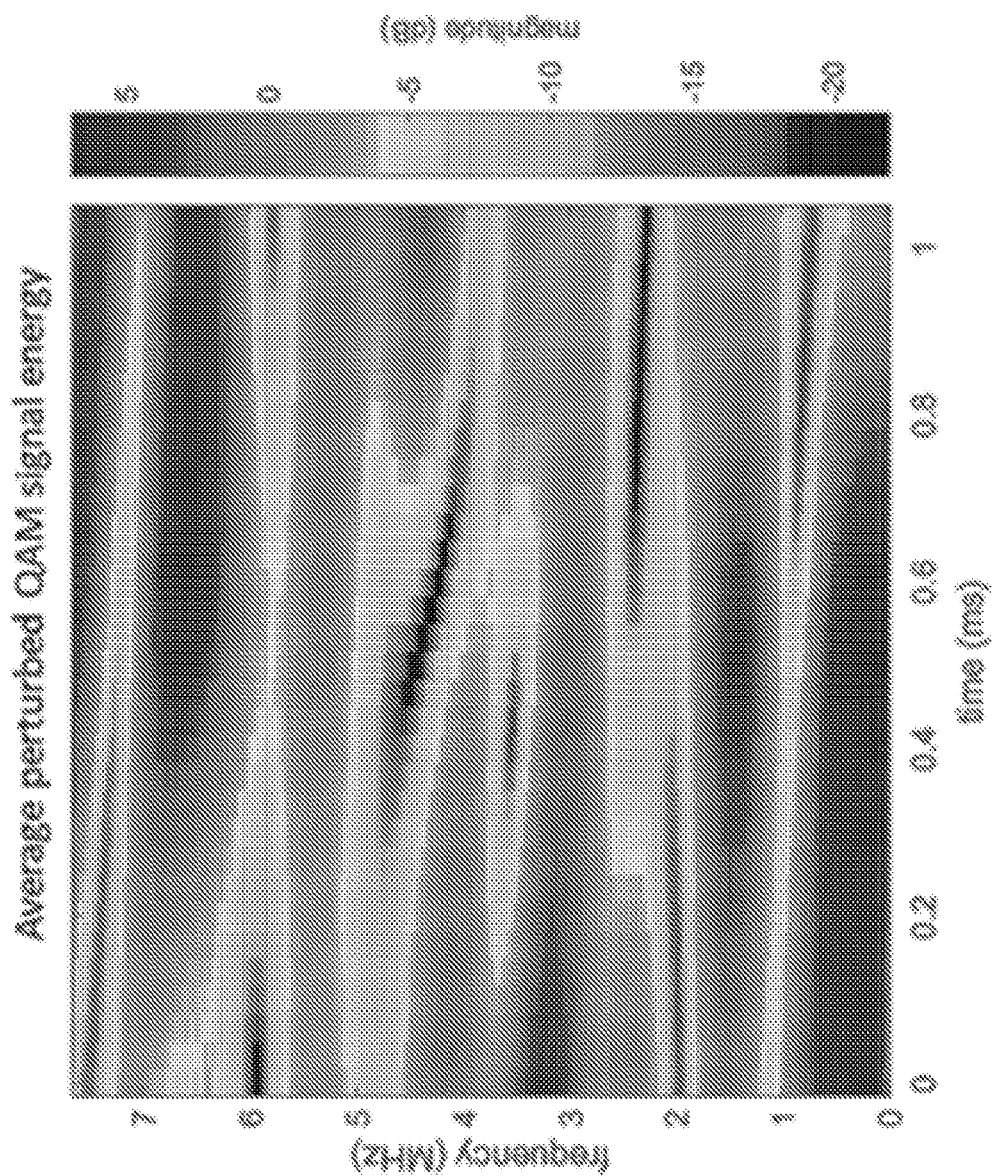

FIG. 31 displays an example of the error metric. One hundred thousand random QAM signals were generated. For each QAM signal, the corresponding optimal perturbation signal was computed using Thomlinson-Harashima precoding. FIG. 32 compares the average energy of the QAM signals with the average energy of the perturbed QAM signals. The energy of QAM signals is white (evenly distributed) while the energy of the perturbed QAM signals is colored (strong in some time frequency regions and weak in others). The average error energy of the unperturbed QAM signal was −24.8 dB. The average error energy of the perturbed QAM signal was −30.3 dB. The improvement in error energy can be explained by comparing the energy distribution of the perturbed QAM signal with the error metric.

Figure 33:
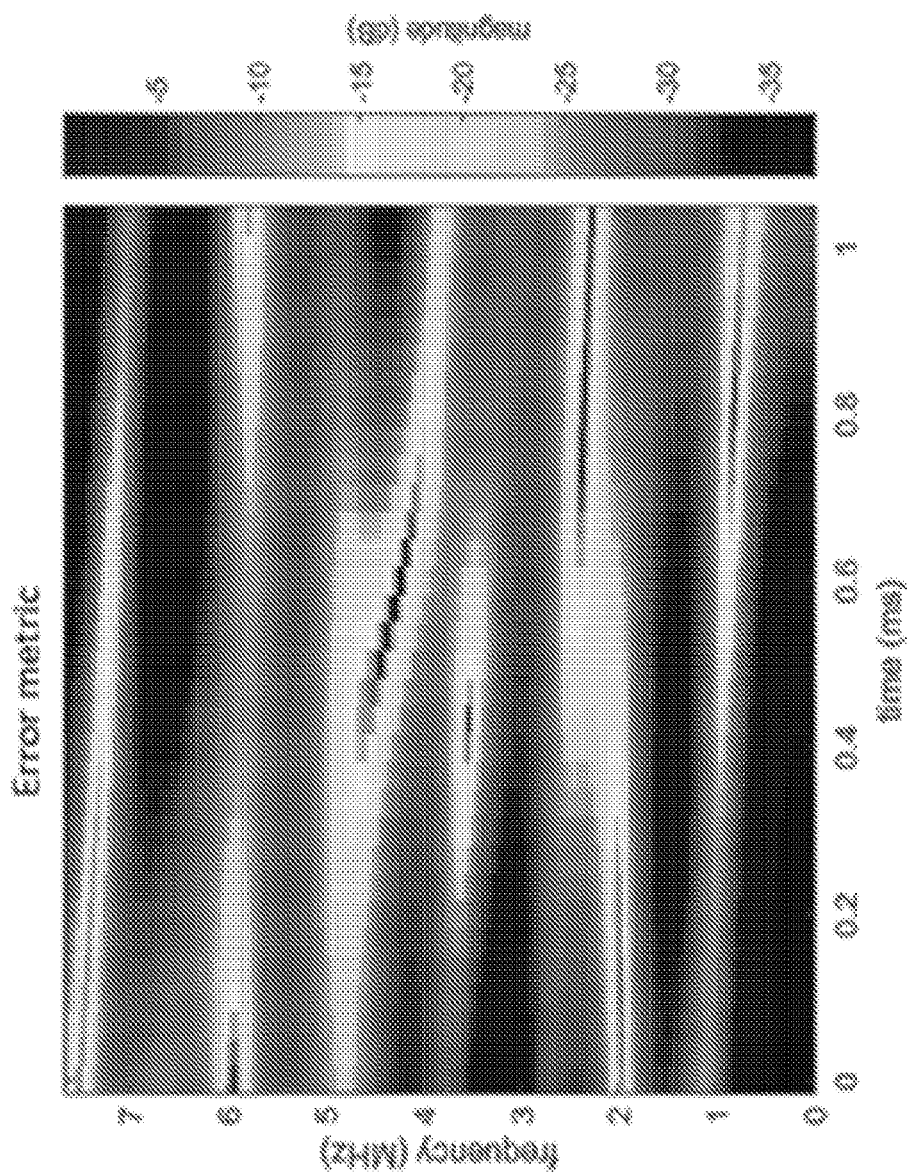
FIG. 33 is a graphical depiction of a comparison of an example error metric with an average perturbed QAM energy.
Figure 33:
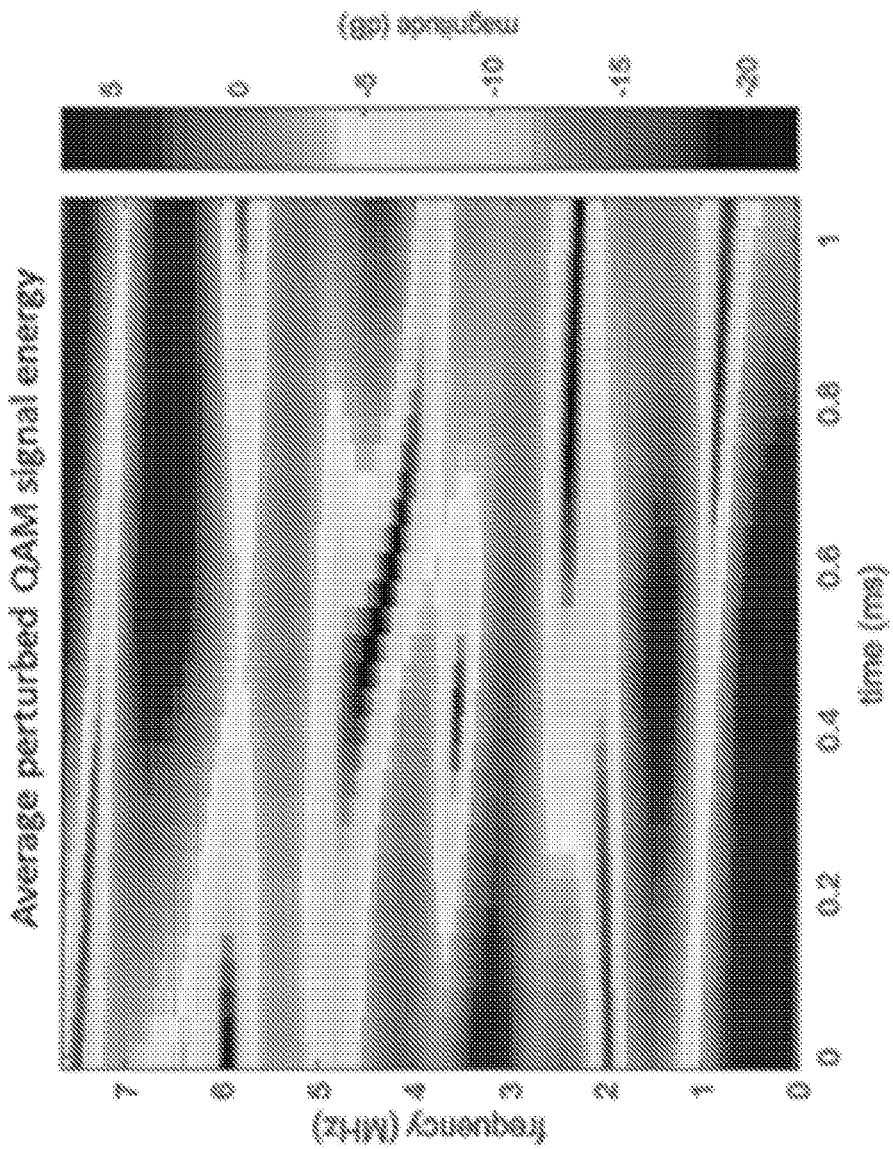

FIG. 33 shows a comparison of an example error metric with an average perturbed QAM energy. The perturbed QAM signal has high energy where the error metric is low, conversely it has low energy where the error metric is high.

The simulation illustrates the gain from using vector perturbation: shaping the energy of the signal to avoid time frequency regions where the error metric is high.

Block Diagrams

Vector perturbations may be performed in three steps. First, the hub perturbs the QAM signal. Next, the perturbed signal is transmitted over the air using the pre-coding filters. Finally, the UEs remove the perturbation to recover the data.

Figure 34:
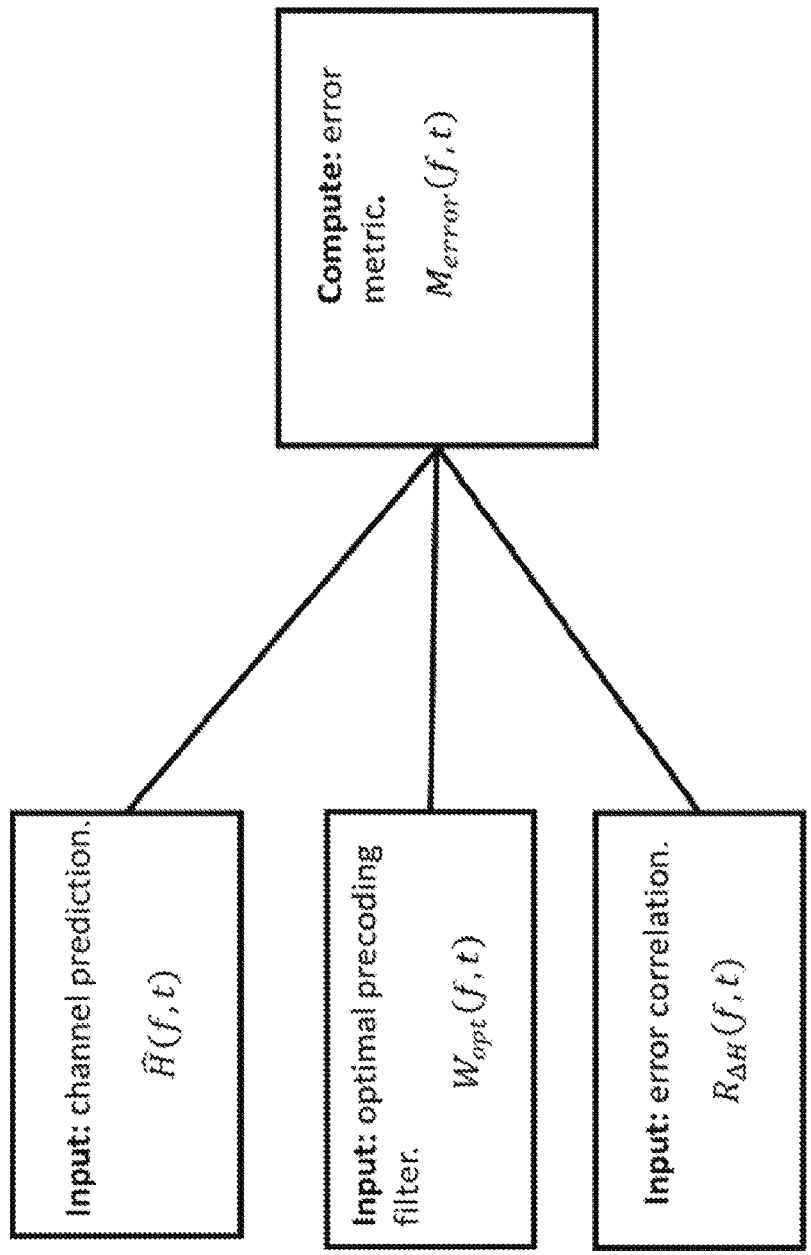
FIG. 34 is a block diagram illustrating an example process of computing an error metric.

Computation of error metric: the computation can be performed independently for each time frequency bin. The computation is summarized in FIG. 34. See also Eq. (45). As shown, the error metric is calculated using channel prediction estimate, the optimal coding filter and error correlation estimate.

Figure 35:
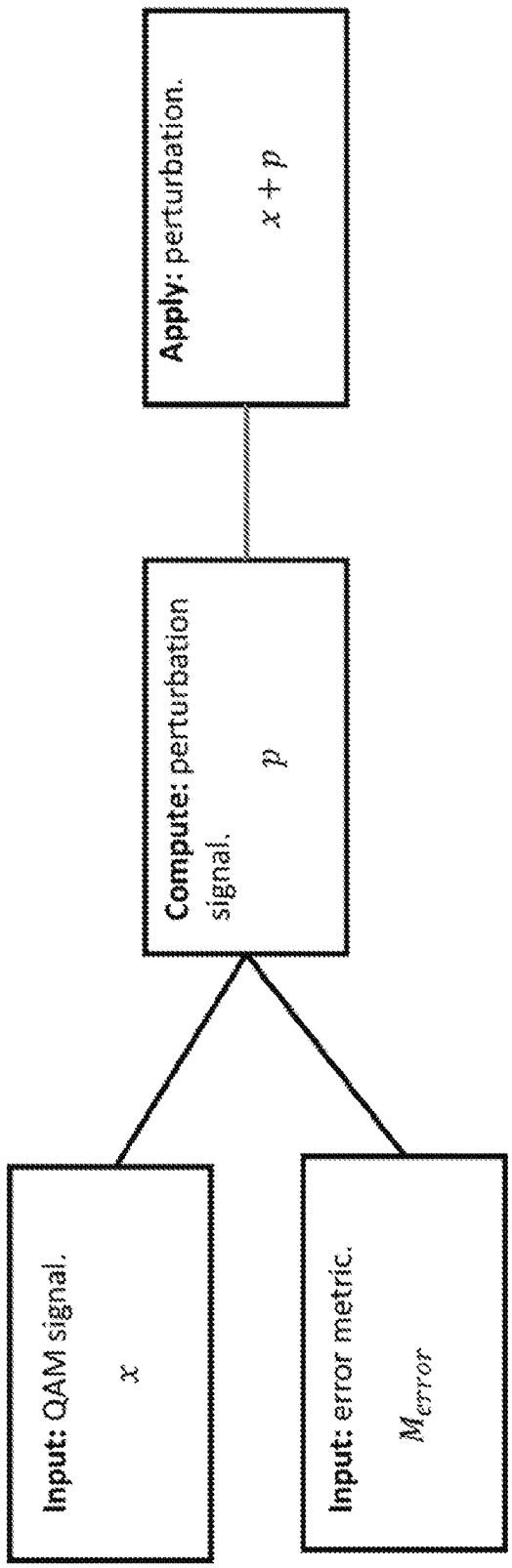
FIG. 35 is a block diagram illustrating an example process of computing perturbation.

Computation of perturbation: the perturbation is performed on the entire delay Doppler signal. The computation is summarized in FIG. 35. As shown, the QAM signal and the error metric are used to compute the perturbation signal. The calculated perturbation signal is additively applied to the QAM input signal.

Figure 36:
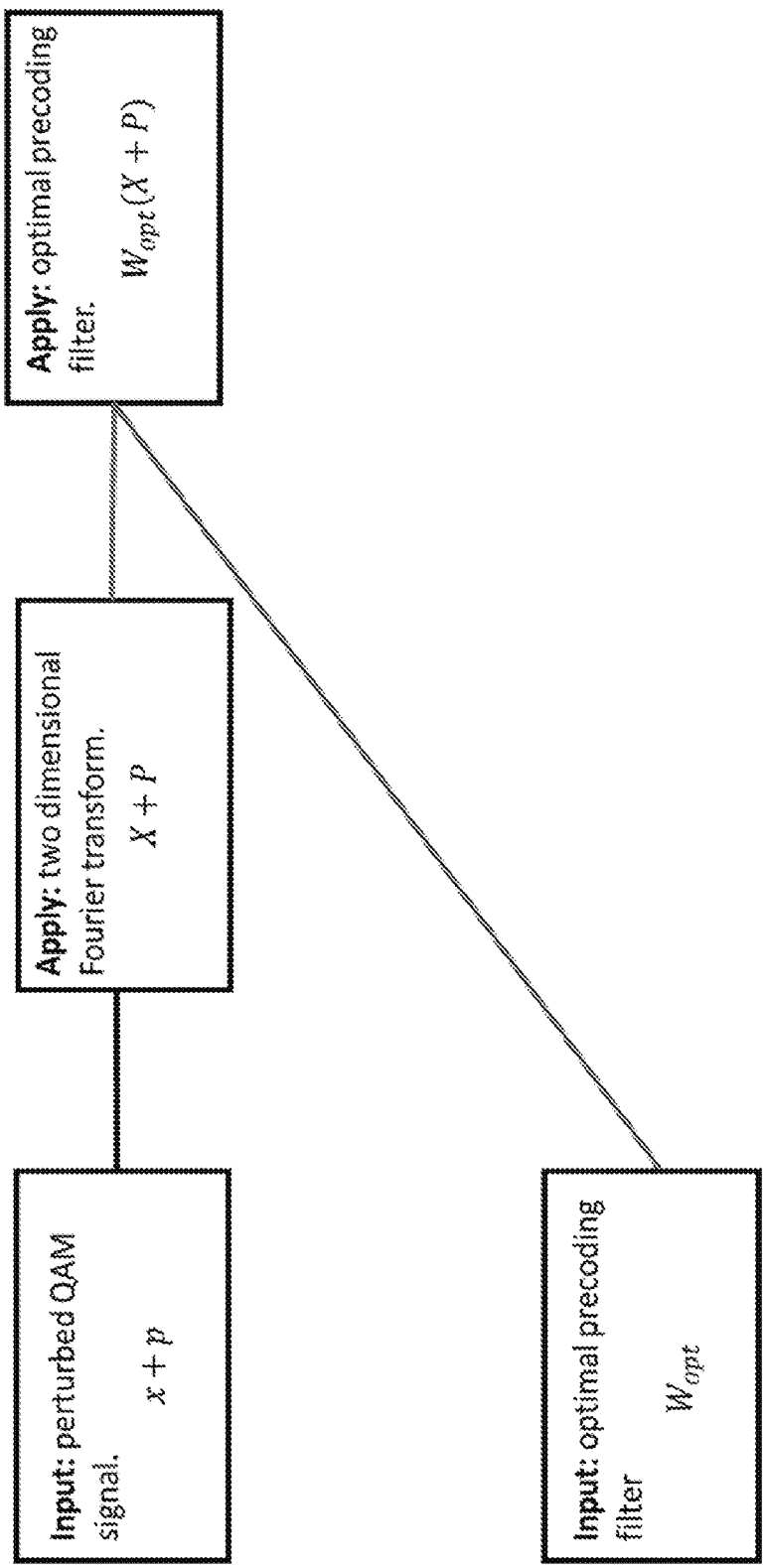
FIG. 36 is a block diagram illustrating an example of application of a precoding filter.

Application of the optimal precoding filter: the computation can be performed independently for each time frequency bin. The computation is summarized in FIG. 36. The perturbed QAM signal is processed through a two dimensional Fourier transform to generate a 2D transformed perturbed signal. The optimal precoding filter is applied to the 2D transformed perturbed signal.

Figure 37:
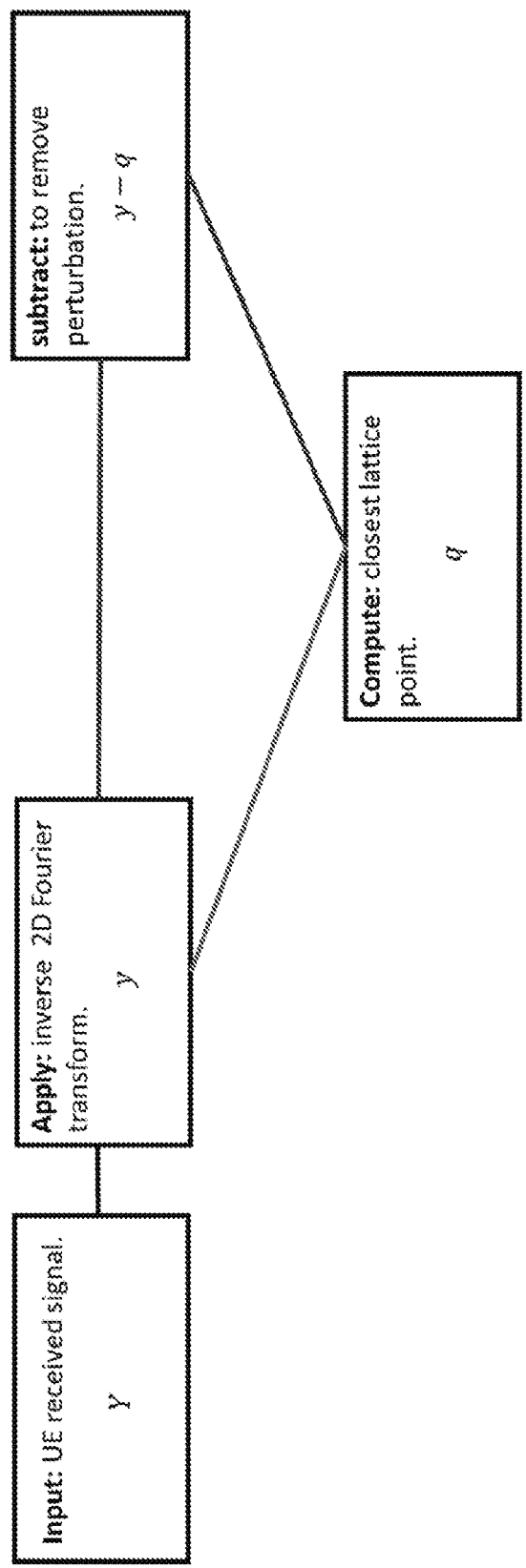
FIG. 37 is a block diagram illustrating an example process of UE removing the perturbation.

UEs removes perturbation: the computation can be FIG. 37. At UE, the input signal received is transformed through an inverse 2D Fourier transform. The closest lattice point for the resulting transformed signal is determined and then removed from the 2D transformed perturbed signal.

Spatial Tomlinson Harashima Precoding

This section provides additional details of achieving spatial precoding and the beneficial aspects of using Tomlinson Harashima precoding algorithm in implementing spatial precoding in the delay Doppler domain. The embodiments consider a flat channel (with no frequency or time selectivity).

Review of Linear Precoding

In precoding, the hub wants to transmit a vector of QAMs to the UEs. We denote this vector by $x \in \mathbb{C}^{L_u}$. The hub has access to the following information:

An estimate of the downlink channel, denoted by: $\hat{H} \in \mathbb{C}^{L_u \times L_h}$.

The matrix covariance of the channel estimation error, denoted by: $R_{\Delta H} \in \mathbb{C}^{L_h \times L_h}$.

From this information, the hub computes the "optimal" precoding filter, which minimizes the expected error energy experienced by the UEs:

$$W_{opt} = \left(\hat{H}^* \hat{H} + R_{\Delta H} + \frac{N_0 L_u}{L_h} I\right)^{-1} \hat{H}^*$$

By applying the precoding filter to the QAM vector the hub constructs a signal to transmit over the air: $\lambda W_{opt} x \in \mathbb{C}^{L_h}$, where $\lambda$ is a constant used to enforce the transmit energy constraints. The signal passes through the downlink channel and is received by the UEs:

$$\lambda H W_{opt} x + w,$$

Where $w \in \mathbb{C}^{L_u}$ denotes AWGN noise. The UEs remove the normalization constant giving a soft estimate of the QAM signal:

$$x+e,$$

where $e \in \mathbb{C}^{L_u}$ denotes the estimate error. The expected error energy can be computed using the error metric:

expected error energy=$x^*M_{error}x$ where $M_{error}$ is a positive definite matrix computed by:

$$M_{error} = \left(\hat{H}W_{opt} - I\right)^*\left(\hat{H}W_{opt} - I\right) + W_{opt}^*\left(R_{\Delta H} + \frac{N_0 L_u}{L_h}\right)W_{opt}$$

Review of Vector Perturbation

The expected error energy can be greatly reduced by perturbing the QAM signal by a vector $v \in \mathbb{C}^{L_u}$. The hub now transmits $\lambda W_{opt}(x+v) \in \mathbb{C}^{L_h}$. After removing the normalization constant, the UEs have a soft estimate of the perturbed QAM signal:

$$x+v+e$$

Again, the expected error energy can be computed using the error metric:

expected error energy=$(x+v)^*M_{error}(x+v)$

The optimal perturbation vector minimizes the expected error energy:

$$v_{opt}=\arg\min_v (x+v)^*M_{error}(x+v).$$

Computing the optimal perturbation vector is in general NP-hard, therefore, in practice an approximation of the optimal perturbation is computed instead. For the remainder of the document we assume the following signal and perturbation structure:

The QAMs lie in the box $[-1, 1] \times j[-1, 1]$.

The perturbation vectors lie on the coarse lattice: $(2\mathbb{Z}+2j\mathbb{Z})^{L_u}$.

Spatial Tomlinson Harashima Precoding

In spatial THP a filter is used to compute a "good" perturbation vector. To this end, we make use of the Cholesky decomposition of the positive definite matrix $M_{error}$:

$$M_{error}=U^*DU,$$

where D is a diagonal matrix with positive entries and U is unit upper triangular. Using this decomposition, the expected error energy can be expressed as:

expected error energy=$(U(x+v))^* D(U(x+v)) = z^*Dz = \sum_{n=1}^{L_u} D(n,n)|z(n)|^2$, where $z = U(x+v)$. We note that minimizing the expected error energy is equivalent to minimizing the energy of the z entries, where:

$$z(L_u) = x(L_u) + v(L_u),$$

$$z(n) = x(n) + v(n) + \sum_{m=n+1}^{L_u} U(n,m)(x(m)+v(m)),$$

for $n=1, 2, \ldots, L_u-1$. Spatial THP iteratively chooses a perturbation vector in the following way.

$$v(L_u)=0$$

Figure 38:
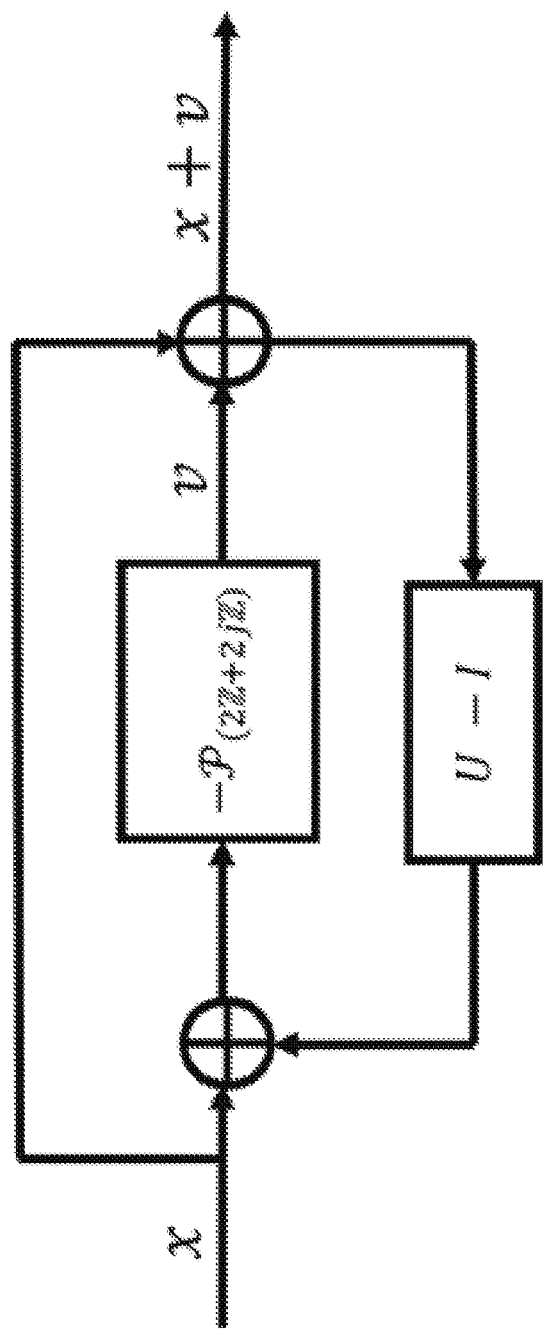
FIG. 38 is a block diagram illustrating an example spatial Tomlinsim Harashima precoder (THP).

Suppose $v(n+1), v(n+2), \ldots, v(L_u)$ have been chosen, then:

$$v(n) = -\mathcal{P}_{(2\mathbb{Z}+2j\mathbb{Z})}\left(x(n) + \sum_{m=n+1}^{L_u} U(n,m)(x(m)+v(m))\right)$$

where $\mathcal{P}_{(2\mathbb{Z}+2j\mathbb{Z})}$ denotes projection onto the coarse lattice. We note that by construction the coarse perturbation vector bounds the energy of the entries of z by two. FIG. 38 displays a block diagram of spatial THP.

Simulation Results

We now present the results of a simple simulation to illustrate the use of spatial THP. Table 4 summarizes the simulation setup.

TABLE 4

| Simulation setup | |
| --- | --- |
| Number of hub antennas | 2 |
| Number of UEs | 2 (one antenna each) |
| Channel condition number | 10 dB |
| Modulation | PAM infinity (data uniformly disturbed on the interval [−1, 1]) |
| Data noise variance | −35 dB |
| Channel noise variance | −35 dB |

Figure 39:
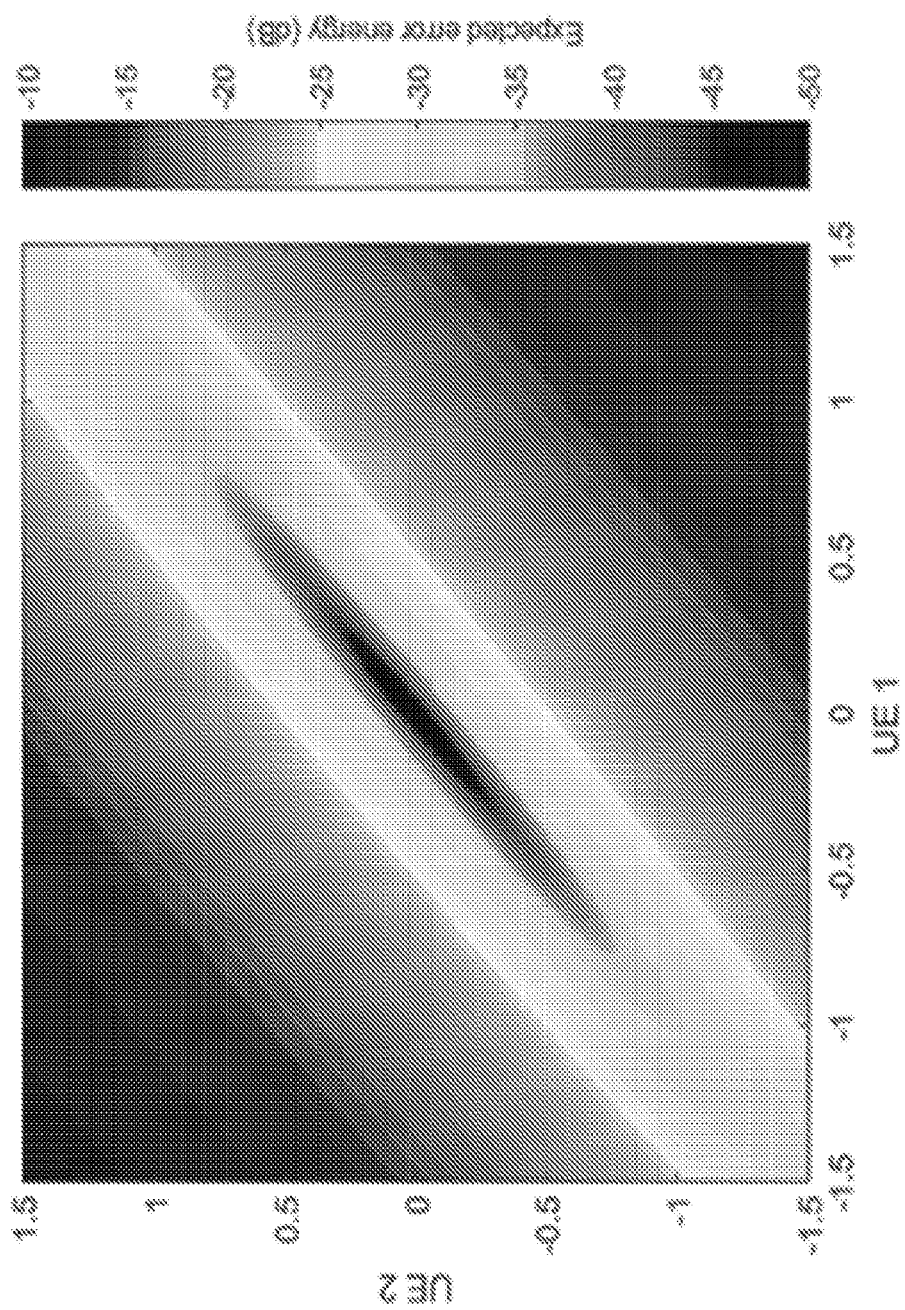
FIG. 39 is a spectral chart of the expected energy error for different PAM vectors.

FIG. 39 displays the expected error energy for different PAM vectors. We note two aspects of the figure.

The error energy is low when the signal transmitted to UE1 and UE2 are similar.

Conversely, the error energy is high when the signals transmitted to the UEs are dissimilar. We can expect this pattern to appear when two UEs are spatially close together; in these situations, it is advantageous to transmit the same message to both UEs.

The error energy has the shape of an ellipses. The axes of the ellipse are defined by the eigenvectors of $M_{error}$.

Figure 40:
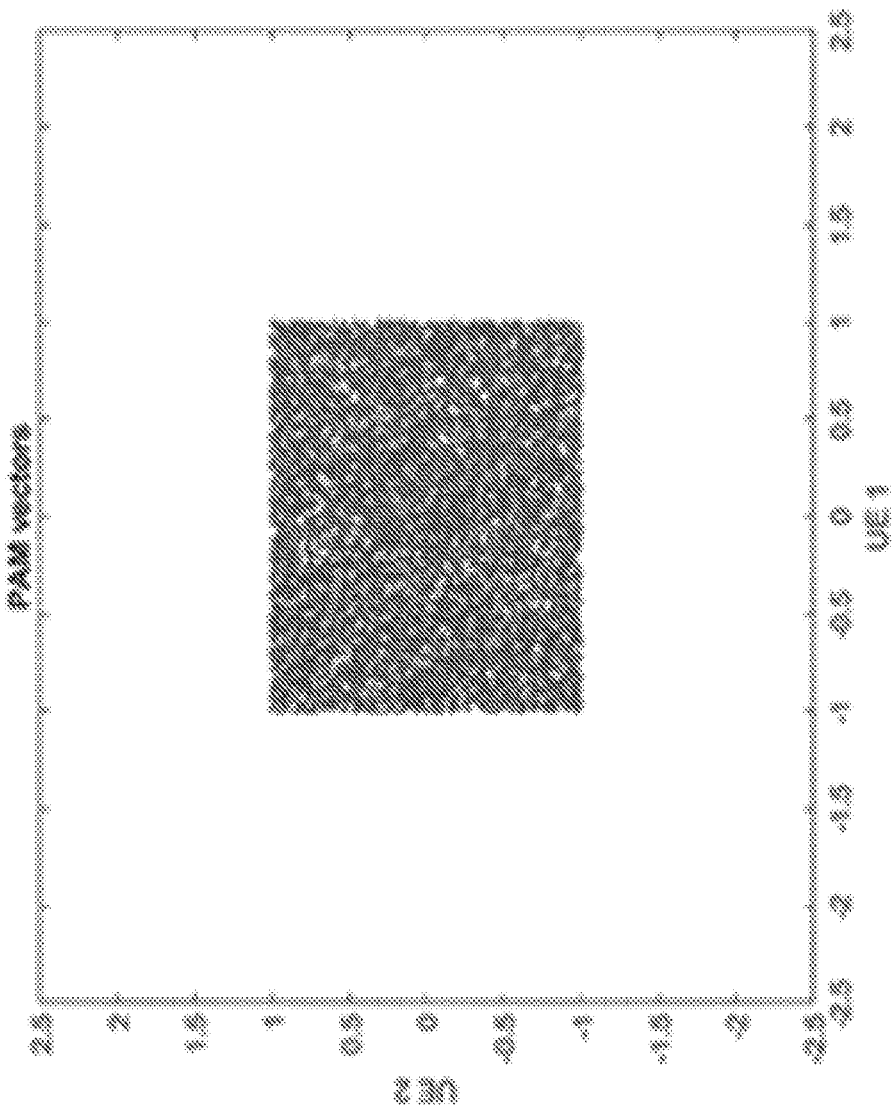
FIG. 40 is a plot illustrating an example result of a spatial THP.
Figure 40:
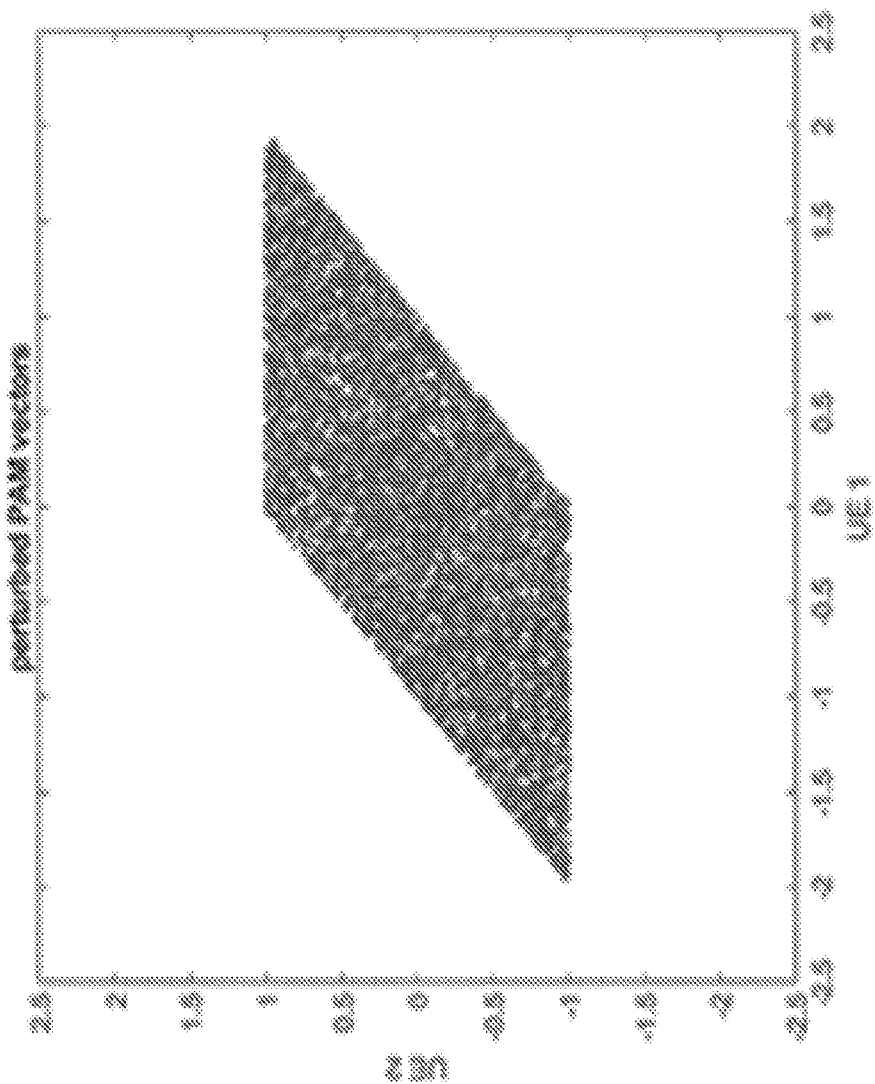

A large number data of PAM vectors was generated and spatial THP was applied. FIG. 40 shows the result. Note that the perturbed PAM vectors are clustered along the axis with low expected error energy.

THP Enhancements

The problem of finding the optimal perturbation vector at the transmitter is analogous to the MIMO QAM detection problem at the receiver. Furthermore, transmitter THP is analogous to receiver successive interference cancellation (SIC). The same improvements used for SIC can be used for THP, for example:

V-Blast, can be used to first choose a better ordering of streams before applying THP.

K-best and sphere detection can be used to search more perturbation vectors.

Lattice reduction can be used as a pre-processing step to THP, improving the condition number of the Cholesky factors.

All these techniques are well known to wireless engineers. We will only go into more depth with lattice reduction as it gives the best performance for polynomial complexity.

Lattice Reduction Enhancement

The performance of THP depends strongly on the size of the diagonal Cholesky factor of $M_{error}$:

$$\text{expected error energy} = \sum_{n=1}^{L_u} D(n, n)|z(n)|^2 \le 2\sum_{n=1}^{L_u} D(n, n)$$

Lattice reduction is a pre-processing step to THP which improves performance by relating the old Cholesky factorization $U^*DU$ to a new Cholesky factorization $U^*_{LR}D_{LR}U_{LR}$, with:

$$\sum_{n=1}^{L_u} D_{LR}(n, n) \le \sum_{n=1}^{L_u} D(n, n)$$

$$D^{\frac{1}{2}}U = AD_{LR}^{\frac{1}{2}}U_{LR}T$$

where $A \in \mathbb{C}^{L_u \times L_u}$ is a unitary matrix (i.e $AA^*=A^*A=1$), and $T \in (\mathbb{Z}+j\mathbb{Z})^{L_u \times L_u}$ is unimodular (i.e. complex integer entries with determinate 1 or −1). We note that if $M_{error}$ is ill-conditioned, then the diagonal of the lattice reduced Cholesky factor is typically much smaller then the original. To use the improved Cholesky factorization for THP we need to make use of two important properties of unimodular matrices:

If T is unimodular, then $T^{-1}$ is also unimodular.
If $v\Sigma(\mathbb{Z}Z+j\mathbb{Z})^{L_u}$, then $Tv \in (\mathbb{Z}+j\mathbb{Z})^{L_u}$.

We now return to the perturbation problem, where we are trying to find a coarse perturbation vector $v \in (2\mathbb{Z}L+2j\mathbb{Z})^{L_u}$ which minimizes the expected error energy:

$$\min_v (x+v)^*U^*DU(x+v) = \min_v (x+v)^*\left(D^{\frac{1}{2}}U\right)^*\left(D^{\frac{1}{2}}U\right)(x+v)$$
$$= \min_v (x+v)^*\left(AD_{LR}^{\frac{1}{2}}U_{LR}T\right)^* AD_{LR}^{\frac{1}{2}}U_{LR}T(x+v)$$
$$= \min_v (Tx+Tv)^* U_{LR}^* D_{LR} U_{LR}(Tx+Tv)$$
$$= \min_{\tilde{v}} (Tx+\tilde{v})^* U_{LR}^* D_{LR} U_{LR}(Tx+\tilde{v})$$

where the last equality follows from the fact that applying unimodular matrices to coarse perturbation vectors returns coarse perturbation vectors. THP can now be used to find a coarse perturbation vector $\tilde{v}$ which makes $(Tx+\tilde{v}))^*U^*_{LR}D_{LR}U_{LR}(Tx+\tilde{v})$ small. Applying $T^{-1}$ to $\tilde{v}$ returns a coarse perturbation vector $v$ which makes $(x+v)^*U^*DU(x+v)$ small. We now summarize the steps:

1. Compute a lattice reduced Cholesky factorization $U^*_{LR}D_{LR}U_{LR}$(The most popular algorithm for this is LAmstra-Lenstra-LovAsz basis reduction). The algorithm will return the reduced Cholesky factorization and the unimodular matrix T.
2. Use THP to find a coarse perturbation vector $\tilde{v}$ which makes the equation (1.) small: $(Tx+\tilde{v})^*U^*_{LR}D_{LR}U_{LR}(Tx+\tilde{v})$ (1.)
3. Return $T^{-1}\tilde{v}$.

OTFS Tomlinson Harashima Precoding Filters

This section details of techniques of efficiently computing coarse OTFS perturbation using a THP filter in the OTFS domain.

Review of OTFS Perturbation

The goal of OTFS perturbation is to find a coarse perturbation signal which makes the expected error energy small, where:

$$\text{expected error energy} = \sum_{f=0}^{N_f-1}\sum_{t=0}^{N_t-1} (X(f,t)+P(f,t))^* M_{error}(f,t)(X(f,t)+P(f,t))$$

Figure 41:
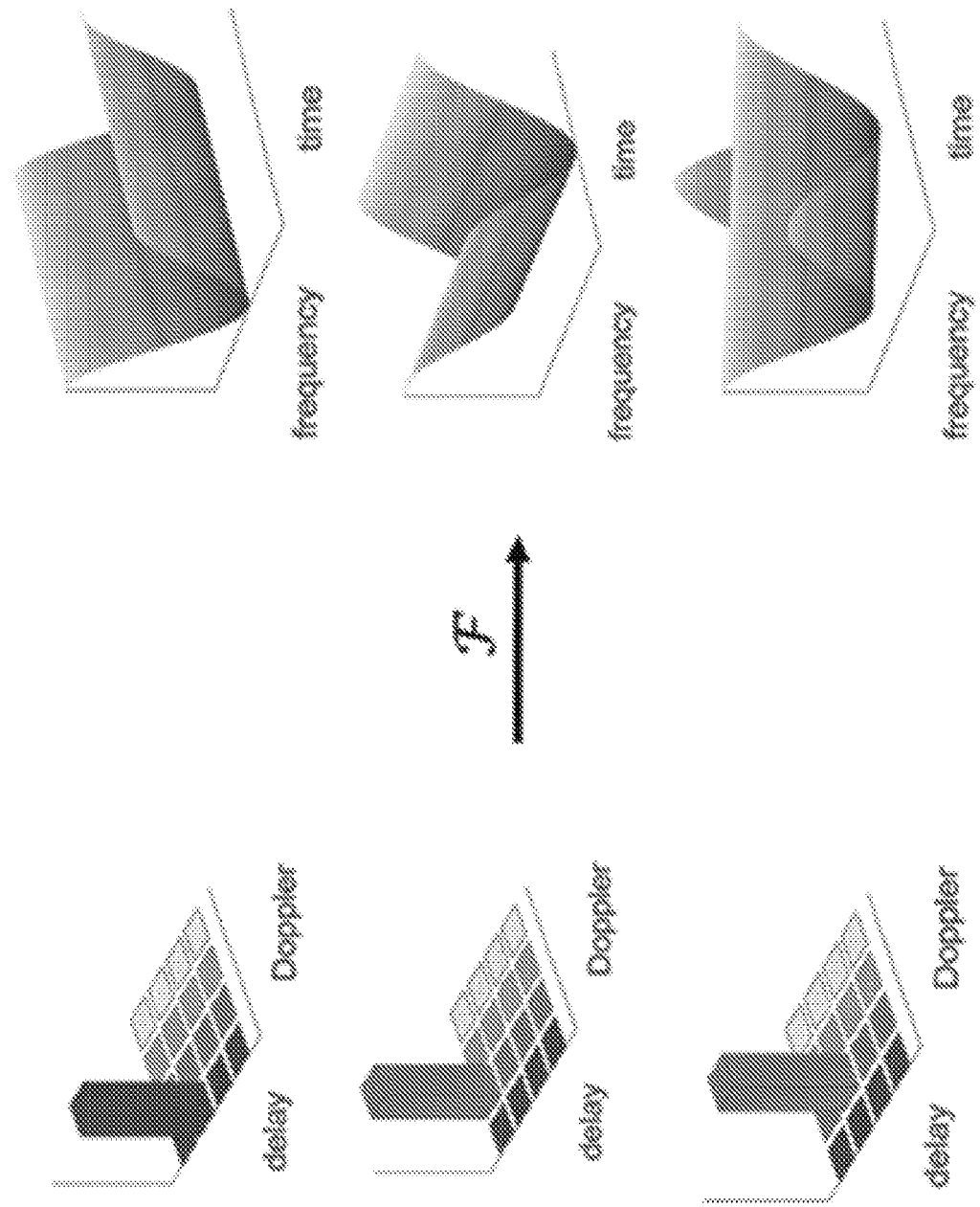
FIG. 41 shows examples of local signals in delay-Doppler domain being non-local in time-frequency domain

Recall that $X = \mathcal{F}_{TF}x$ and $P = \mathcal{F}_{TF}p$, where $\mathcal{F}_{TF}$ denotes the two-dimensional Fourier transform, x is the QAM signal, and p is the perturbation signal. The presence of the Fourier transform means that perturbing a single QAM in the delay-Doppler domain affects the signal over the entire time-frequency domain (illustrated in FIG. 41).

The time-frequency (TF) non-locality of OTFS perturbations carries advantages and disadvantages.

Advantage: OTFS perturbations can shape the TF spectrum of the signal to avoid TF channel fades.

Disadvantage: the OTFS perturbations are typically computed jointly, this contrasts with OFDM which can compute independent perturbations for each TF bin.

When OTFS perturbations are computed jointly, this means that brute force methods may not work efficiently. For example, consider the system parameters summarized in Table 5.

TABLE 5

| Typical system parameters | |
|---|---|
| $N_f$ | 600 |
| $N_\tau$ | 14 |
| $L_u$ | 4 |

For such a system the space of coarse perturbation signals, $(2\mathbb{Z}+2j\mathbb{Z})^{L_u N_f N_t}$, is 3.36e4 dimensional.

OTFS THP Filters

To manage the complexity of OTFS perturbations it may be recalled that the channel is localized in the delay-Doppler domain. Utilizing this fact, a near optimal coarse perturbation can be computed using a two-dimensional filter whose length is roughly equal to the delay and Doppler span of the channel. We call this class of filters OTFS THP filters. These filters can get quite sophisticated, so the document will develop them in stages: starting with simple cases and ending in full generality.

1) SISO single carrier (this is equivalent to OTFS with $N_t=1$)
2) SISO OTFS
3) MIMO single carrier
4) MIMO OTFS

SISO Single Carrier

In this section, we disclose a SISO single carrier THP filter. Towards this end we express the expected error energy in the delay domain (the domain where QAMs and perturbations are defined):

$$\text{expected error energy} = \sum_{f=0}^{N_f-1} (X(f)+P(f))^* M_{error}(f)(X(f)+P(f))$$
$$= \sum_{\tau=0}^{N_\tau-1} (x(\tau)+p(\tau))^* \sum_{\tau'=0}^{N_\tau-1} m_{error}(\tau-\tau')(x(\tau')+p(\tau'))$$

The QAM signal x and the perturbation signal p can be represented as vectors in $\mathbb{C}^{N_\tau}$ which we denote by x, p respectively. Likewise, convolution by $m_{error}$ can be represented as multiplication by a positive definite circulant matrix in $\mathbb{C}^{N_\tau \times N_\tau}$ which we denote by $m_{error}$. Using these representations, we can write the expected error energy as:

expected error energy=$(x+p)^* m_{error}(x+p)$

Figure 42:
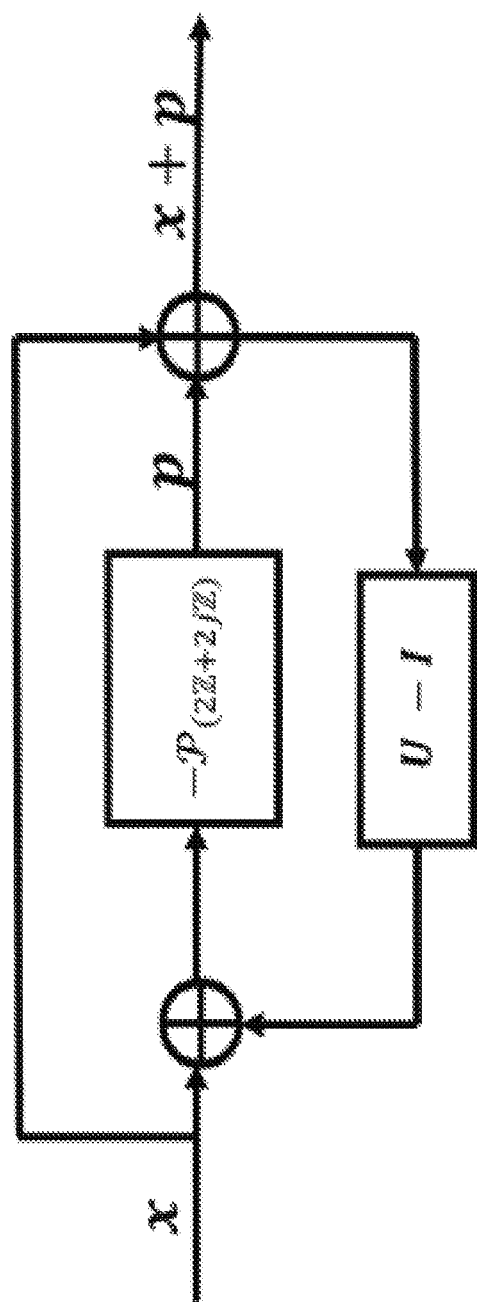
FIG. 42 is a block diagram showing an example of the computation of coarse perturbation using Cholesky factor.

Similar to the spatial case, a good coarse perturbation vector can be computed (FIG. 42) by utilizing the Cholesky factors of $m_{error}$:

$m_{error}=UDU^*$

Although the method computes good perturbations, there are two main challenges: it requires a very large Cholesky factorization and the application of U−I can be very expensive. To resolve these issues, we will utilize $U^{-1}$ which has much better structure:

$U^{-1}$ is bandlimited, with bandwidth approximately equal to the channel delay span.

Apart from its edges, $U^{-1}$ is nearly Toeplitz.

These facts enable the computation of good perturbations using a short filter which we call the SISO single carrier THP filter and denote by $W_{THP}$. Before showing how to compute coarse perturbations with $U^{-1}$ and $W_{THP}$, we illustrate the structure of $U^{-1}$ with a small simulation (parameters in Table 6).

TABLE 6

| | |
|---|---|
| Sample rate | 10 MHz |
| Number of samples | 512 |
| Delay span | 3 us |
| Shaping filter | Root raised cosine, roll-off 12% |
| Data noise variance | −35 dB |
| Channel noise variance | −35 dB |

Figure 43:
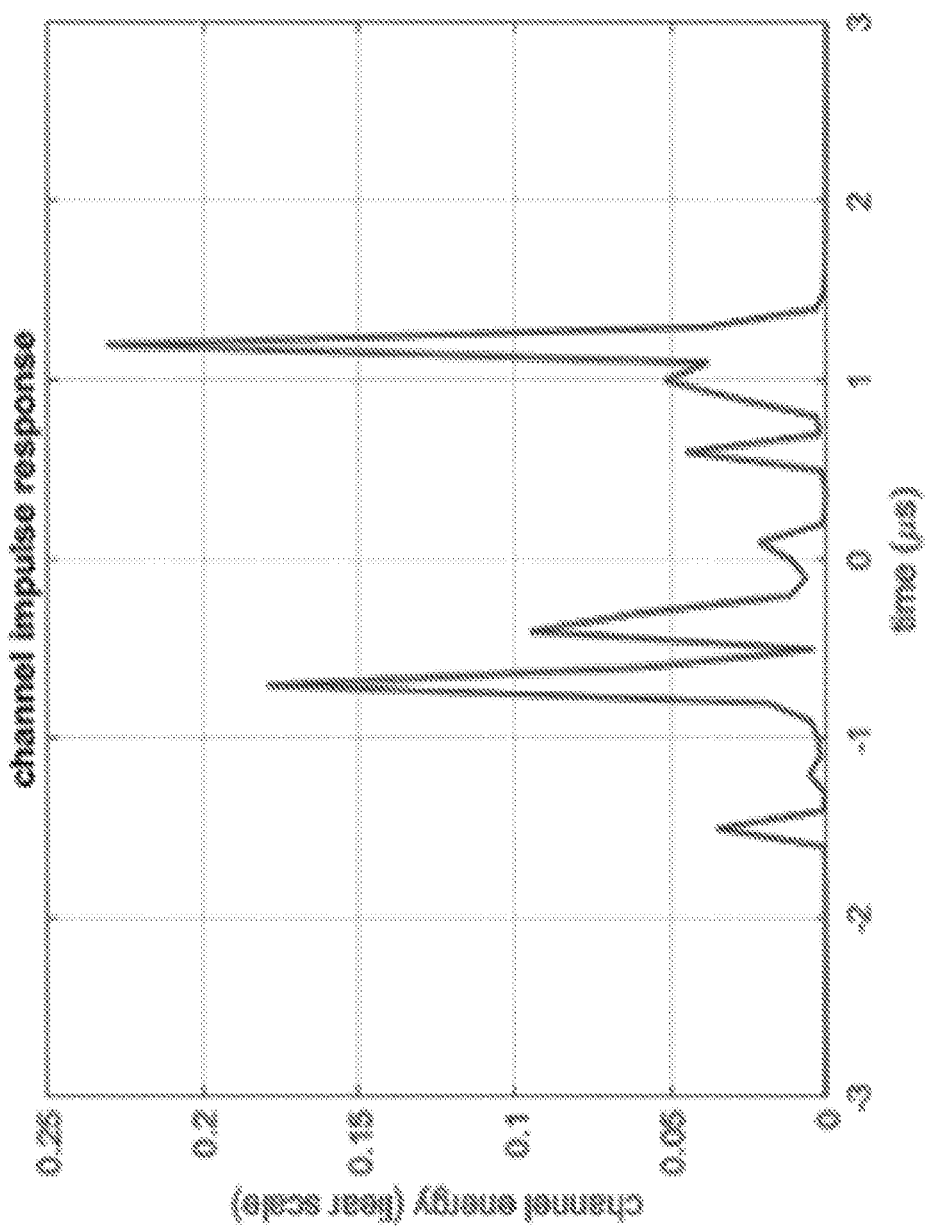
FIG. 43 shows an exemplary estimate of the channel impulse response for the SISO single carrier case.
Figure 44:
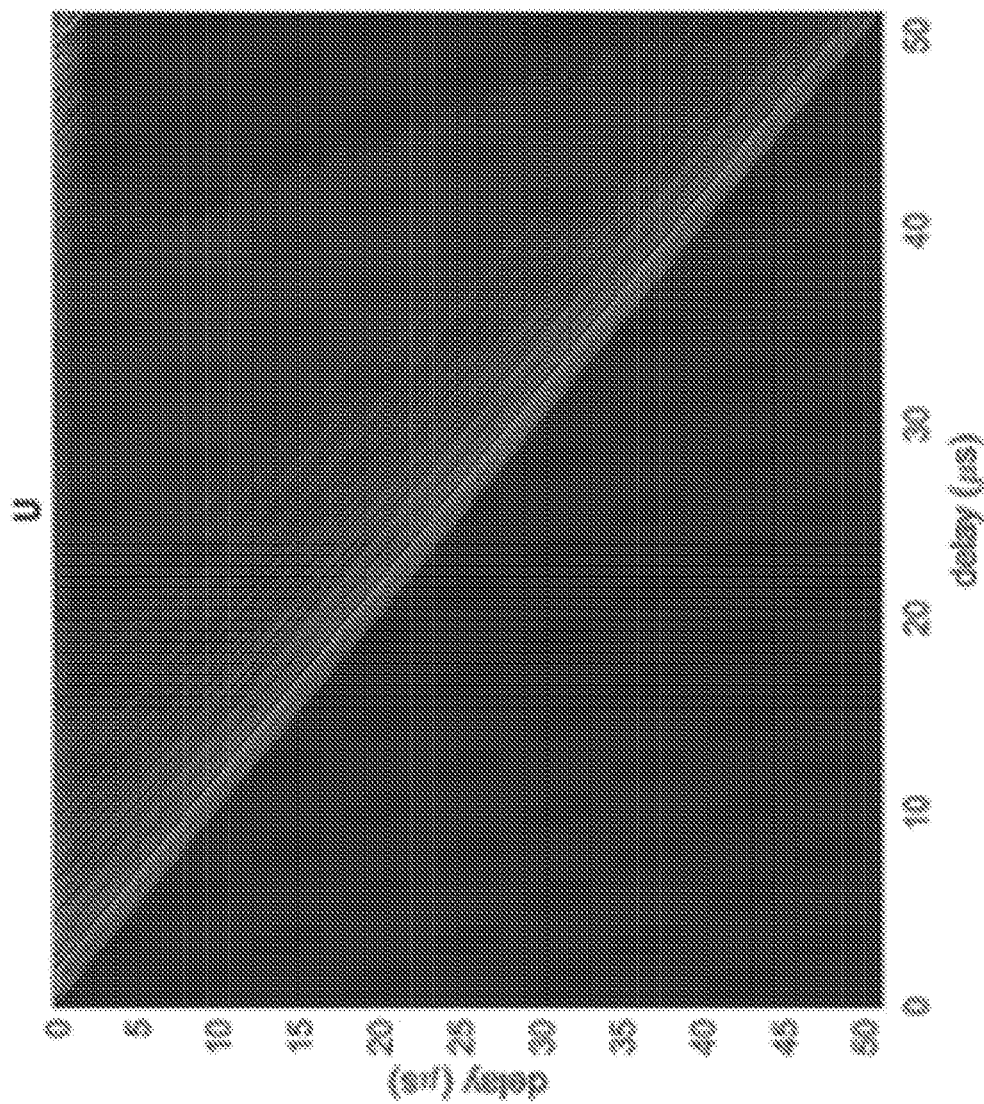
FIG. 44 shows spectral plots of an example of the comparison of Cholesky factor and its inverse.
Figure 44:
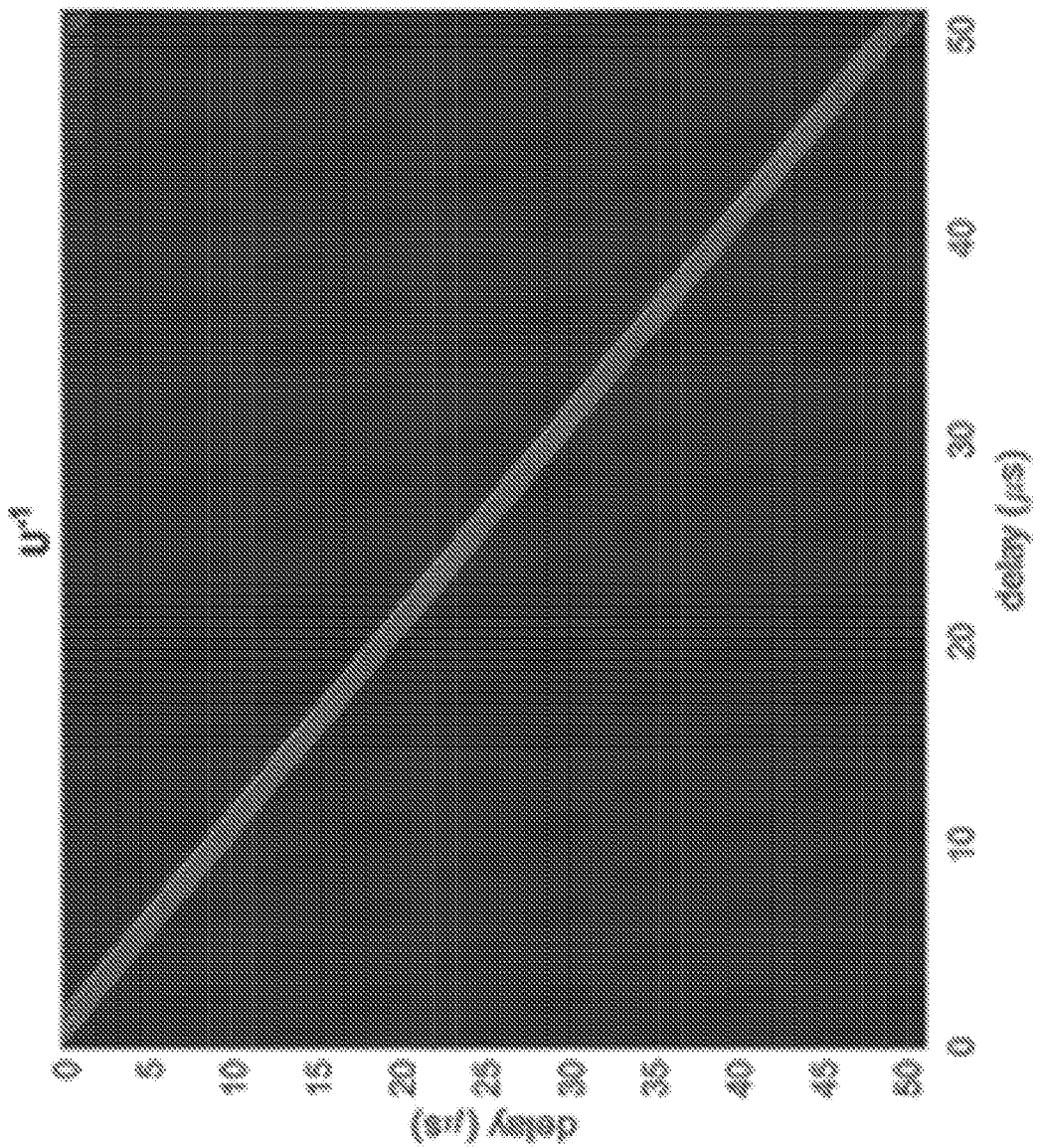

FIG. 43 displays an estimate of the channel impulse response. Using this estimate, the error metric in the delay domain, $m_{error}$, was computed. FIG. 44 compares the structure of the resulting Cholesky factor and its inverse.

To visualize the near Toeplitz structure of $U^{-1}$ we overlay plots of columns slices (FIG. 45):

$s_n(m) = U^{-1}(n-m, n)$ for m=0, 1, . . . , 40 and n=40, . . . , ($N_f$−40). We note that if a matrix is Toeplitz then the slices will be identical.

Figure 45:
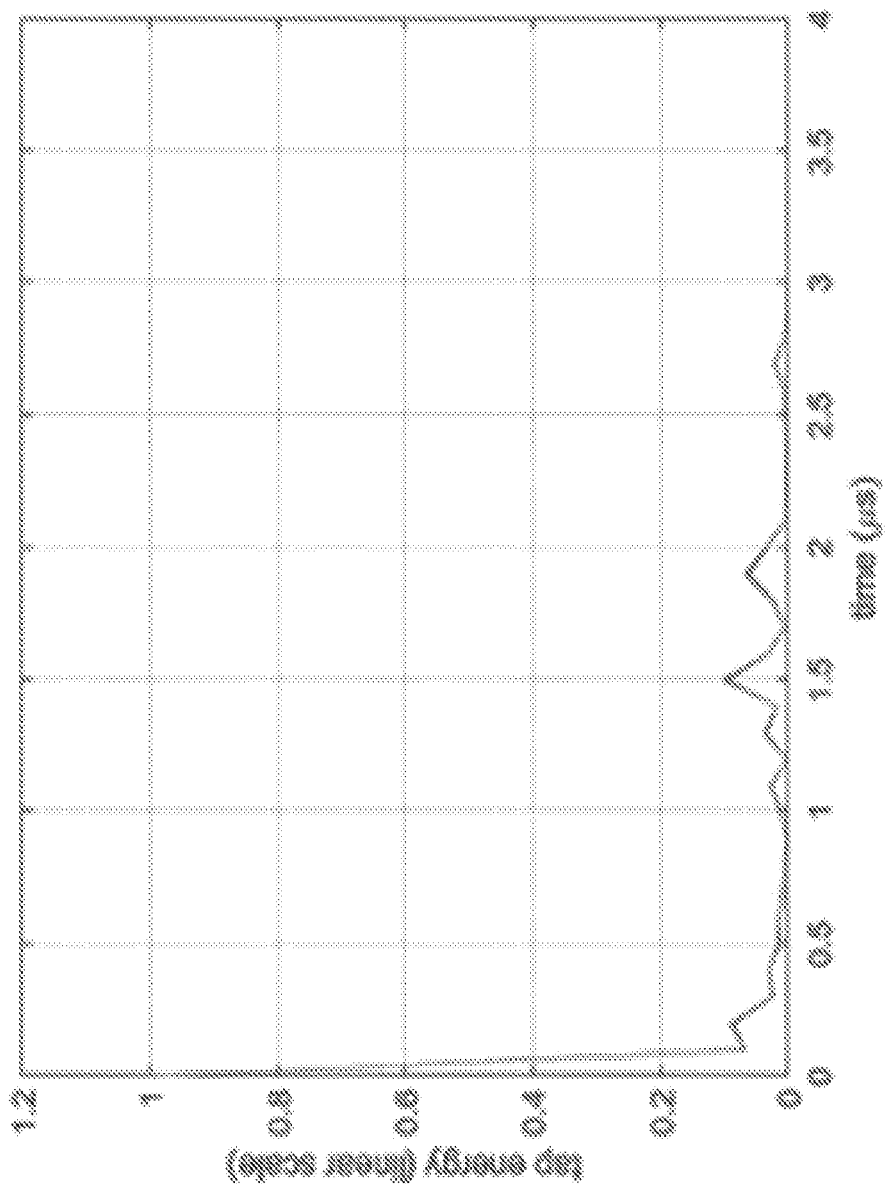
FIG. 45 shows an example of an overlay of $U^{-1}$ column slices.

FIG. 45 shows the bandwidth of $U^{-1}$ is approximately equal to the channel span, and that outside of edges the matrix is very near Toeplitz.

Computing Good Perturbations with $U^{-1}$

In this subsection, we disclose how to compute good perturbations using $U^{-1}$. Towards this end we express the expected error energy in terms of the Cholesky factors:

$$\text{expected error energy} = (x+p)^* m_{error}(x+p)$$
$$= (U(x+p))^* D(U(x+p))$$
$$= z^* Dz$$
$$= \sum_{\tau=0}^{N_\tau-1} D(\tau) |z(\tau)|^2$$

where z=U (x+p) and D ($\tau$)=$D_{(\tau,\tau)}$. Therefore, minimizing the expected error energy is equivalent to minimizing the energy of the entries of z, which can be expressed recursively:

$$z(\tau) = x(\tau) + p(\tau) - \sum_{\tau'=\tau+1}^{N_\tau-1} U^{-1}(\tau, \tau') z(\tau')$$

for $\tau$=0,1, . . . , $N_\tau$−1. Using this expression, a good perturbation vector can be computed iteratively in the following way:

1. Initialization set $p(N_\tau-1)=0$ and $z(N_\tau-1)=x(N_\tau-1)$.
2. Update suppose we have selected $p(\tau')$ and $z(\tau')$ for $\tau'=(\tau+1), \ldots, N_T-1$, then:

$$r(\tau) = x(\tau) - \sum_{\tau'=\tau+1}^{N_\tau-1} U^{-1}(\tau, \tau') z(\tau')$$

$$p(\tau) = -\mathcal{P}_{(2\mathbb{Z}+2j\mathbb{Z})}(r(\tau))$$

$$z(\tau) = x(\tau) + r(\tau)$$

Figure 46:
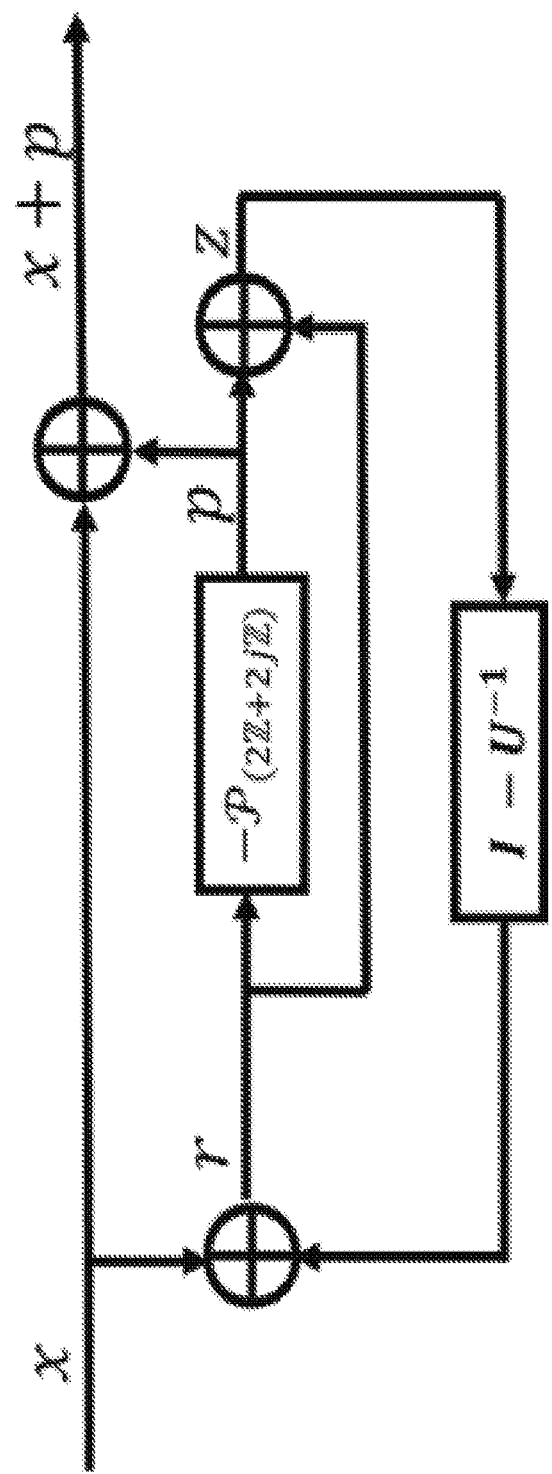
FIG. 46 is a block diagram illustrating an example of the computation of coarse perturbation using $U^{-1}$ for the SISO single carrier case.

Herein, $\mathcal{P}_{(2\mathbb{Z}+2j\mathbb{Z})}$ denotes projection onto the coarse lattice. We note that the algorithm bounds the energy of the z entries by two. FIG. 46 displays a block diagram of the algorithm.

Computing Perturbations with $W_{THP}$

In this subsection, we disclose how to efficiently compute a good perturbation using a SISO single carrier THP filter. Towards this end we note that due to the banded near Toeplitz structure of $U^{-1}$, the application of I-$U^{-1}$ can be well approximated by the application of a filter (outside of edge effects):

$$\sum_{\tau'=\tau+1}^{N_\tau-1} U^{-1}(\tau, \tau') z(\tau') \approx \sum_{n=1}^{N_{chan}} W_{THP}(n) z(\tau+n),$$

for $\tau$=0, 1, . . . , $N_\tau-N_{chan}-1$, where $N_{chan}$ denotes channel width. We call $W_{THP}$ the SISO single carrier THP filter with:

$W_{THP}(n)=U^{-1}(N_{chan}-n, N_{chan})$, for n=1, . . . , $N_{chan}$ To use the approximation, we need to avoid the non-Toeplitz edge effects of $U^{-1}$, this is done by enforcing the QAM signal x to take the value zero for an initialization region. Putting everything together gives an efficient method for computing good perturbation signals:

Setup compute the filter coefficients: $W_{THP}(n)$ for n=1, . . . , $N_{chan}$.

Initialization set function values on the top delay bins equal to zero:

$p(\tau)=0, x(\tau)=0$, and $z(\tau)=0$ for T=$N_T N_{chan}$, . . . , $N_\tau-1$ Update suppose we have selected $p(\tau')$ and $z(\tau')$ for $\tau'=(\tau+1), \ldots, N_\tau-1$, then:

$$r(\tau) = x(\tau) - \sum_{n=1}^{N_{chan}} W_{THP}(n) z(\tau+n)$$

-continued $$p(\tau) = -\mathcal{P}_{(2\mathbb{Z}+2j\mathbb{Z})}(r(\tau))$$

$$z(\tau) = x(\tau) + r(\tau)$$

Finalize suppose we have selected $p(\tau)$ and $z(\tau)$ for $\tau'=0, 1, \ldots, N_\tau-1$. Then we take:

$$x(\tau) = z(\tau) + \sum_{n=1}^{N_{chan}} W_{THP}(n) z(\tau + n)$$

for $\tau = N_\tau - N_{chan}, \ldots, N_\tau - 1$.

Figure 47:
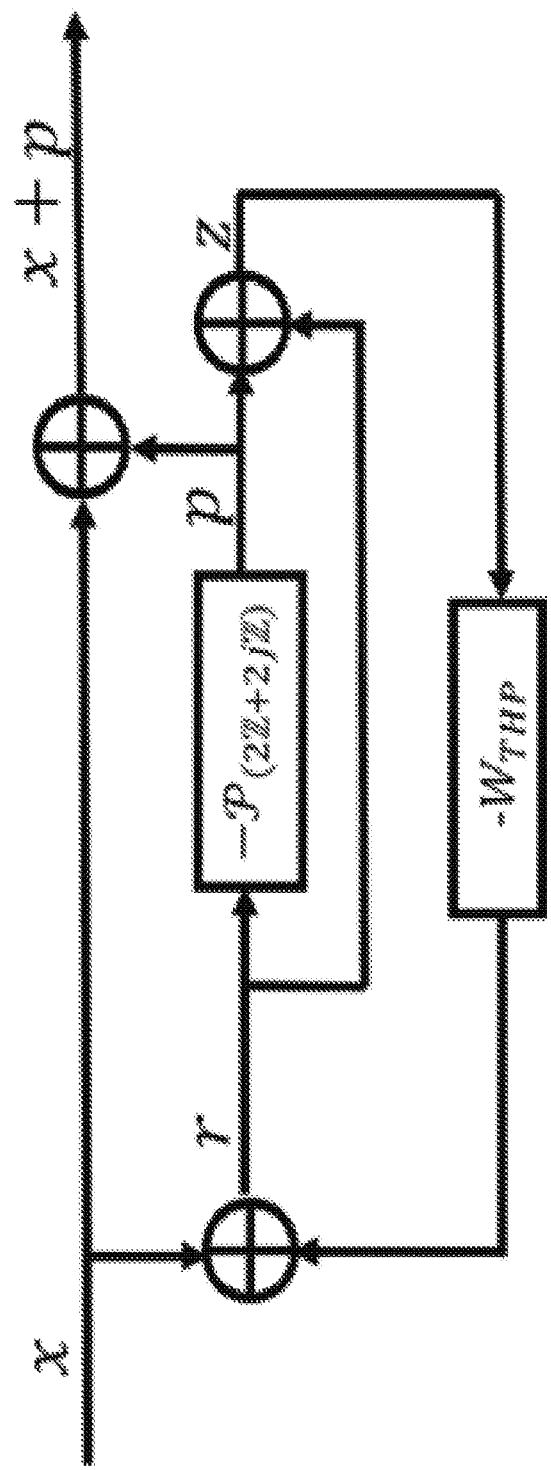
FIG. 47 is a block diagram illustrating an example of the computation of coarse perturbations using $W_{THP}$ for the SISO single carrier case.

The finalize step is done to ensure that x+p is equal to the correlation of $\overline{I+W_{THP}}$ and z. Because there is no QAM information transmitted in the initialization region, the finalize step does not overwrite user data. We note that by using unique word single carrier, the initialization region can also do the work of the cyclic prefix thus limiting overhead. A block diagram for the update step is shown in FIG. 47.

Simulation Results

Application of the SISO single carrier THP filter was simulated using the parameters given in Table 7.

TABLE 7

| | |
|---|---|
| Sample rate | 10 MHz |
| Number of samples | 512 |
| Delay span | 3 us |
| Shaping filter | Root raised cosine, roll-off 12% |
| Data noise variance | −35 dB |
| Channel noise variance | −35 dB |
| QAM order | Infinity (uniform in unit box) |

Figure 48:
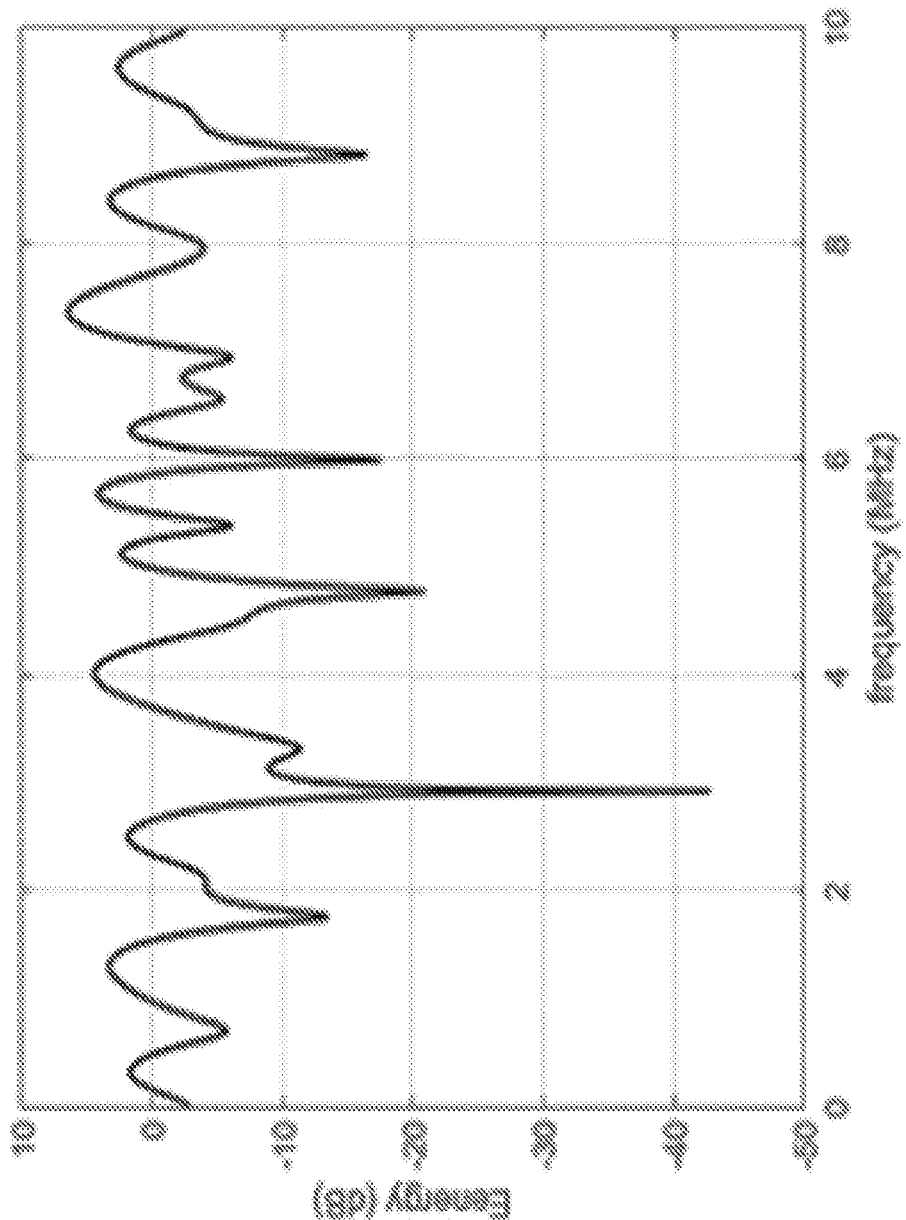
FIG. 48 shows an exemplary plot of a channel frequency response for the SISO single carrier case.
Figure 49:
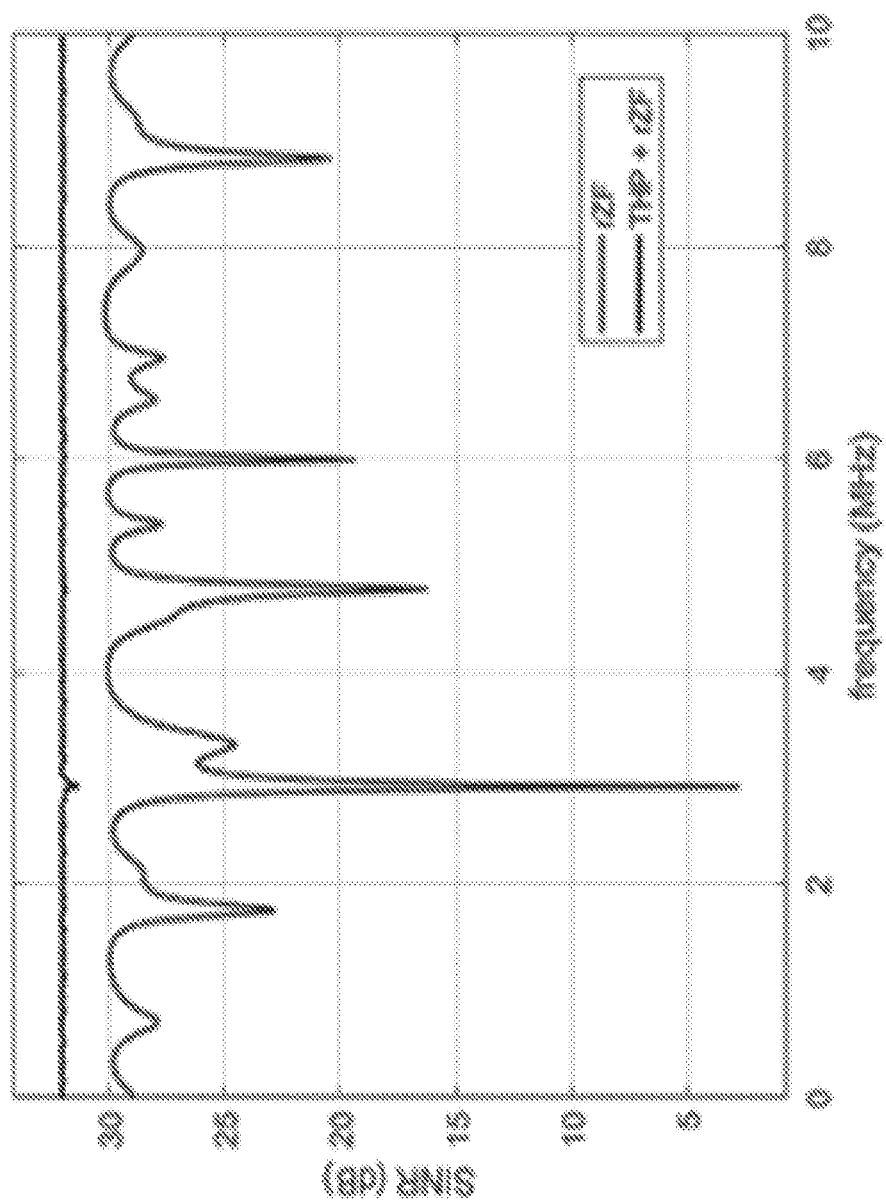
FIG. 49 shows an exemplary plot comparing linear and non-linear precoders for the SISO single carrier case.

Ten thousand random QAM signals were generated and two different precoders schemes were applied to the QAM signal:

1) Regularized zero forcing (rZF)
2) THP perturbation of the QAM signal followed by rZF FIG. 48 displays the channel frequency response. FIG. 49 compares the SINR experienced by the UE for the two precoding schemes. We note that the THP perturbed signal has both a high average SINR and an extremely stable SINR. In contract, just using the linear precoder results in large SINR fluctuations (20+ dBs).

SISO OTFS

In this section, we disclose SISO OTFS THP filters. The filters will be intimately related to the previously disclosed SISO single carrier THP filters. To make the connection clear we represent the expected error energy in the hybrid delay-time domain.

expected error energy =

$$\sum_{f=0}^{N_f-1} \sum_{t=0}^{N_t-1} (X(f,t) + P(f,t))^* M_{error}(f,t)(X(f,t) + P(f,t)) =$$

$$\sum_{t=0}^{N_t-1} \sum_{\tau=0}^{N_\tau-1} (\tilde{X}(\tau,t) + \tilde{P}(\tau,t))^* \sum_{\tau'=0}^{N_\tau-1} \tilde{M}_{error}(\tau-\tau',t)(\tilde{X}(\tau',t) + \tilde{P}(\tau',t)),$$

Where the function $\tilde{X}(\tau,t)$ is defined as:

$$\tilde{X}(\tau,t) = (\mathcal{F}_F^{-1} \tilde{X})(\tau,t) \sum_{f=0}^{N_f-1} e^{\frac{2\pi j f \tau}{N_f}} X(f,t)$$

and $\mathcal{F}_F^{-1}$ denotes the Fourier transform converting frequency-time to delay-time. The functions $\tilde{P}(\tau,t)$ and $\tilde{M}_{error}(\tau,t)$ are defined in the same way. Next, we vectorize the functions $\tilde{P}(\bullet,t)$ and $\tilde{X}(\bullet,t)$ to express the expected error energy using linear algebra:

$$\text{expected error energy} = \sum_{t=0}^{N_t-1} (\tilde{X}_t + \tilde{P}_t)^* \tilde{M}_{error,t} (\tilde{X}_t + \tilde{P}_t)$$

where $\tilde{X}_t, \tilde{P}_t \in \mathbb{C}^{N_\tau}$ and the matrices $\tilde{M}_{error,t} \in \mathbb{C}^{N_\tau \times N_\tau}$ are circulant and positive definite.

Computing Perturbations with $U^{-1}$

In this subsection, we disclose how to compute good perturbations using the Cholesky decompositions:

$$\tilde{M}_{error,t} = \tilde{U}_t^* \tilde{D}_t \tilde{U}_t,$$

for $t=0,1,\ldots,N_t-1$. Where the $\tilde{U}_t$ are unit upper triangular and the $\tilde{D}_t$ are positive diagonal. Expressing the expected error energy in terms of these decompositions gives:

$$\text{expected error energy} = \sum_{t=0}^{N_t-1} (\tilde{X}_t + \tilde{P}_t)^* \tilde{U}_t^* \tilde{D}_t \tilde{U}_t (\tilde{X}_t + \tilde{P}_t)$$

$$= \sum_{t=0}^{N_t-1} \tilde{Z}_t^* \tilde{D}_t \tilde{Z}_t$$

$$= \sum_{\tau=0}^{N_\tau-1} \sum_{t=0}^{N_t-1} \tilde{Z}(\tau,t)^* \tilde{D}(\tau,t) \tilde{Z}(\tau,t)$$

where $\tilde{Z}_t = \tilde{U}_t(\tilde{X}_t + \tilde{P}_t)$, $\tilde{Z}(\tau,t) = \tilde{Z}_t(\tau)$, and $\tilde{D}(\tau,t) = \tilde{D}_t(\tau,\tau)$. Next, we express the expected error energy in the delay-Doppler domain (the domain where the QAMs and perturbations are defined):

$$\text{expected error energy} = \sum_{\tau=0}^{N_\tau-1} \sum_{v=0}^{N_v-1} z(\tau,v)^* \sum_{v'=0}^{N_v-1} d(\tau, v-v') z(\tau, v')$$

where the function $z(\tau,v)$ is defined as:

$$z(\tau, v) = (\mathcal{F}_T^{-1} \tilde{Z})(\tau, v) = \sum_{t=0}^{N_t-1} e^{\frac{2\pi j t v}{N_t}} \tilde{Z}(\tau, t)$$

and $\mathcal{F}_T^{-1}$ denotes the Fourier transform converting delay-time to delay-Doppler. The function $d(\tau,v)$ is defined the same way. For Doppler shifts encountered in typical wireless channels ($\leq 500$ Hz) the term $\tilde{D}(\tau,t)$ is nearly constant with respect to time. Therefore, the energy of its Fourier transform, $d(\tau,v)$, will be concentrated in the DC term, $d(\tau,0)$. Using this fact, the expected error energy can be well approximated as:

$$\text{expected error energy} \approx \sum_{\tau=0}^{N_\tau-1} \sum_{v=0}^{N_v-1} z(\tau, v)^* d(\tau, 0) z(\tau, v)$$

$$= \sum_{\tau=0}^{N_\tau-1} \sum_{v=0}^{N_v-1} d(\tau, 0) |z(\tau, v)|^2$$

Because the terms $d(\tau,0)$ are positive, minimizing the expected error energy is equivalent to minimizing the energy of the entries of z, which can be expressed recursively:

$$\tilde{Z}(\tau, t) = \tilde{X}(\tau, t) + \tilde{P}(\tau, t) - \sum_{\tau'=\tau+1}^{N_\tau-1} \tilde{U}_t^{-1}(\tau, \tau') \tilde{Z}(\tau', t)$$

$$z(\tau, v) = x(\tau, v) + p(\tau, v) - \mathcal{F}_T^{-1}\left(\sum_{\tau'=\tau+1}^{N_\tau-1} \tilde{U}_t^{-1}(\tau, \tau') \tilde{Z}(\tau', t)\right)(\tau, v)$$

Figure 50:
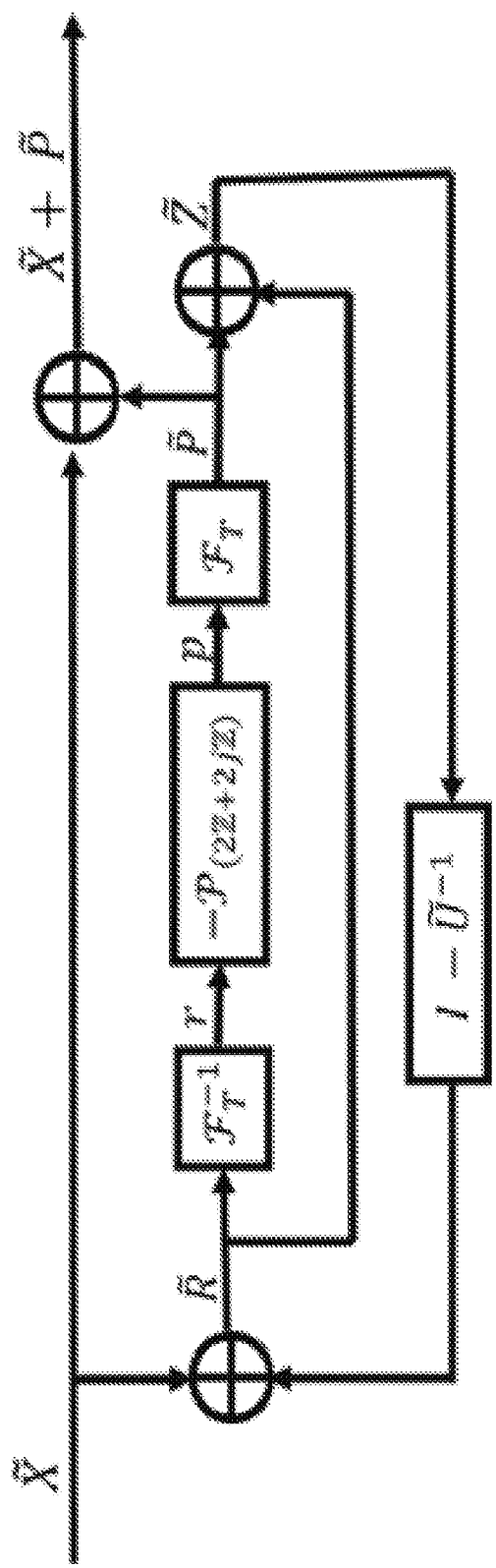
FIG. 50 is a block diagram illustrating an example of the algorithm for the computation of perturbation using $U^{-1}$ for the SISO OTFS case.

Using these expressions, a good perturbation signal can be computed iteratively:

Initialization set $\tilde{P}(N_\tau,t)=0$ and $\tilde{Z}(N_\tau,t)=\tilde{X}(N_\tau,t)$ for $t=0, 1, \ldots, N_\tau-1$ Update suppose we have selected $\tilde{P}(\tau',t)$ and $\tilde{Z}(\tau',t)$ for $\tau'=(\tau+1), \ldots, N_\tau-1$, then:

$$\tilde{R}(\tau, t) = \tilde{X}(\tau, t) - \sum_{\tau'=\tau+1}^{N_\tau-1} \tilde{U}_t^{-1}(\tau, \tau') \tilde{Z}(\tau', t)$$

$$p(\tau, v) = -\mathcal{P}_{(2\mathbb{Z}+2j\mathbb{Z})}\left((\mathcal{F}_T^{-1}\tilde{R})(\tau, v)\right)$$

$$\tilde{P}(\tau, t) = (\mathcal{F}_t p)(\tau, t)$$

$$\tilde{Z}(\tau, t) = \tilde{P}(\tau, t) + \tilde{R}(\tau, t)$$

for $t=0, 1, \ldots, N_t-1$, where $\mathcal{P}_{(2\mathbb{Z}+2j\mathbb{Z})}$ denotes projection onto the coarse lattice. We note that the algorithm bounds the energy of the entries of z by two. FIG. 50 displays a block diagram of the algorithm.

Computing Perturbations with $W_{THP}$

In this subsection we disclose how to compute good perturbations using SISO OTFS THP filters. Exactly like the single carrier case, the application of $I-\tilde{U}^{-1}$ can be well approximated by the application of a filter (outside of edge effects):

$$\sum_{\tau'=\tau+1}^{N_\tau-1} \tilde{U}_t^{-1}(\tau, \tau') z(\tau', t) \approx \sum_{n=1}^{N_{chan}} W_{THP}(n, t) z(\tau+n, t),$$

for $\tau=0, 1, \ldots, N_\tau - N_{chan}$ and $t=0, 1, \ldots, N_t-1$, where $N_{chan}$ denotes the channel delay width. We call the filters $W_{THP}(\cdot, t)$ the SISO OTFS THP filters with:

$$W_{THP}(n,t) = \tilde{U}^{-1}(N_{chan}-n, N_{chan}),$$

for $t=0, 1, \ldots, N_t-1$ and $n=1, N_{chan}$. Like the single carrier case, to avoid edge effects, we enforce the QAM signal x to take the value zero in an initialization region. Putting everything together gives an efficient method to compute good perturbations:

1. Setup compute the filter coefficients: $W_{THP}(n,t)$ for $t=0, 1, \ldots, N_t-1$ and $n=1, \ldots, N_{chan}$.
2. Initialization set function values on the top delay bins equal to zero:

$$\tilde{P}(\tau,t)=0, \tilde{X}(\tau,t)=0, \text{ and } \tilde{Z}(\tau,t)=0,$$

for $\tau=N_{chan}, \ldots, N_\tau-1$ and $t=0, 1, \ldots, N_t-1$.
3. Update Suppose we have selected $\tilde{P}(\tau',t)$ and $\tilde{Z}(\tau',t)$ for $\tau'=(\tau+1), \ldots, N_\tau-1$ and $t=0, 1, \ldots, N_t-1$, then:

$$\tilde{R}(\tau, t) = \tilde{X}(\tau, t) - 1\sum_{n=1}^{N_{chan}} W_{THP}(n, t) \tilde{Z}(\tau+n, t)$$

$$p(\tau, v) = -\mathcal{P}_{(2\mathbb{Z}+2j\mathbb{Z})}\left((\mathcal{F}_T^{-1}\tilde{R})(\tau, v)\right)$$

$$\tilde{P}(\tau, t) = (\mathcal{F}_t p)(\tau, t)$$

$$\tilde{Z}(\tau, t) = \tilde{X}(\tau, t) + \tilde{R}(\tau, t)$$

for $t=0, 1, \ldots, N_t-1$ and $v=0, 1, \ldots, N_v-1$.
4. Finalize suppose we have selected $\tilde{Z}(\tau',t)$ and $\tilde{P}(\tau',t)$ for $\tau'=0, 1, \ldots, N_\tau-1$ and $t=0, 1, \ldots, N_t-1$. Then we take:

$$\tilde{X}(\tau, t) = \tilde{Z}(\tau, t) + \sum_{n=1}^{N_{chan}} W_{THP,t}(n) \tilde{Z}(\tau, t)$$

for $\tau=N_\tau-N_{chan}, \ldots, N_\tau-1$ and $t=0, 1, \ldots, N_t-1$.

Figure 51:
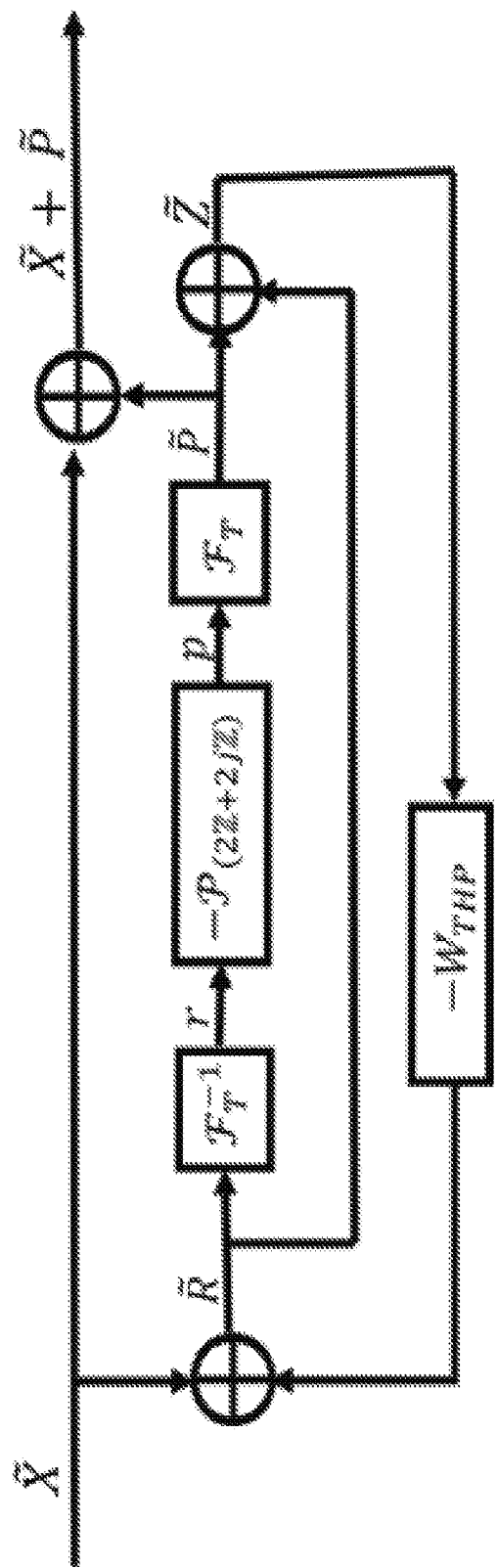
FIG. 51 is a block diagram illustrating an example of the update step of the algorithm for the computation of perturbation using $U^{-1}$ for the SISO OTFS case.

Because there is no QAM information transmitted in the initialization region the finalize step does not overwrite user data. We note that by using unique word OTFS, the initialization region can also do the work of the cyclic prefix thus limiting overhead. A block diagram for the update step is shown in FIG. 51.

Simulation Results

Application of the SISO OTFS THP filters was simulated using the parameters given in Table 8.

TABLE 8

| | |
|---|---|
| Sample rate | 10 MHz |
| $N_f$, $N_\tau$ | 128 |
| $N_t$, $N_v$ | 64 |
| Delay span | 1 us |
| Doppler span | 1 kHz |
| Shaping filter | Root raised cosine, roll-off 12% |
| Data noise variance | −35 dB |
| Channel noise variance | −35 dB |
| QAM order | Infinity (uniform in unit box) |

Figure 52:
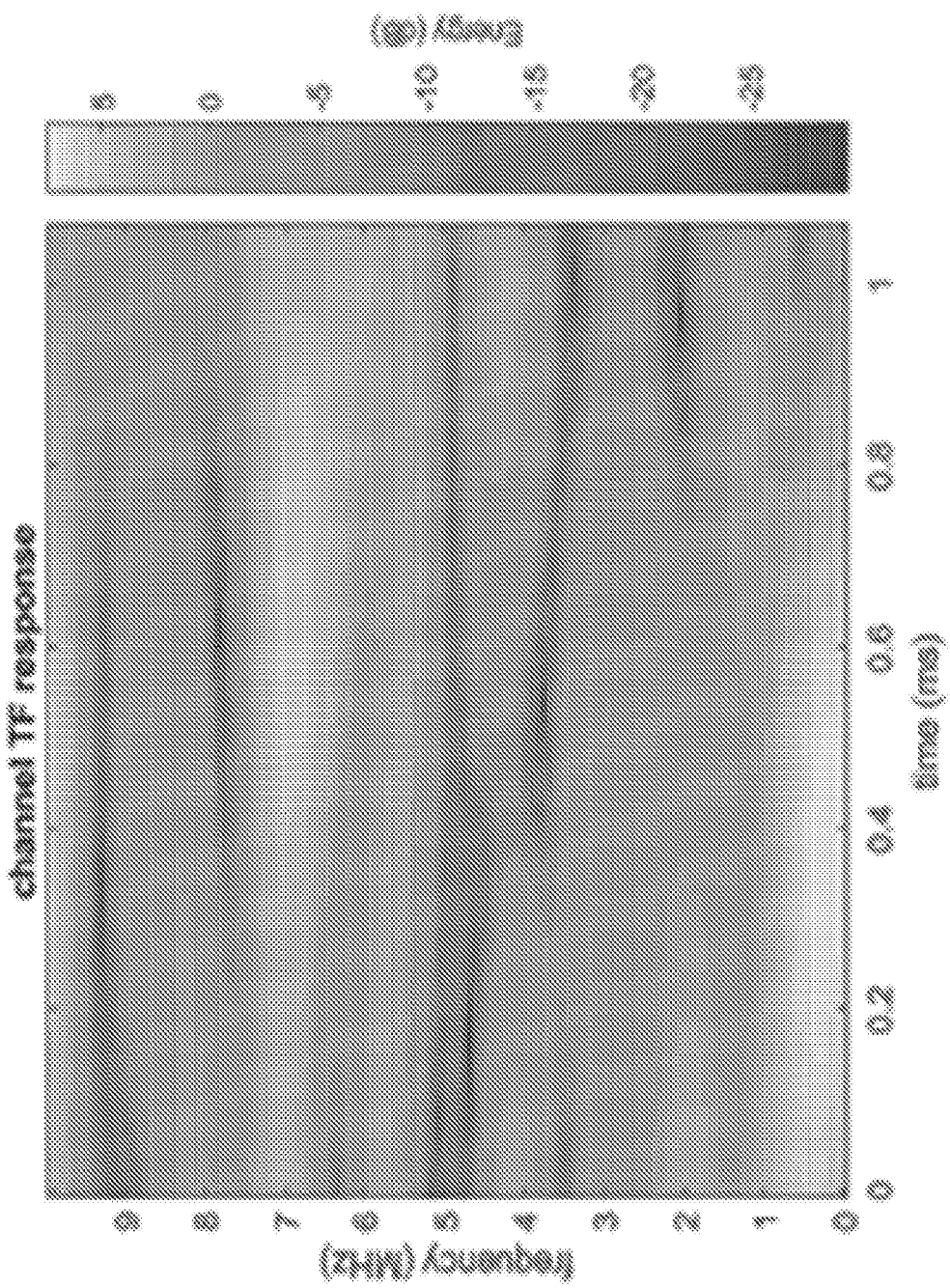
FIG. 52 shows an exemplary spectral plot of a channel frequency response for the SISO OTFS case.
Figure 53:
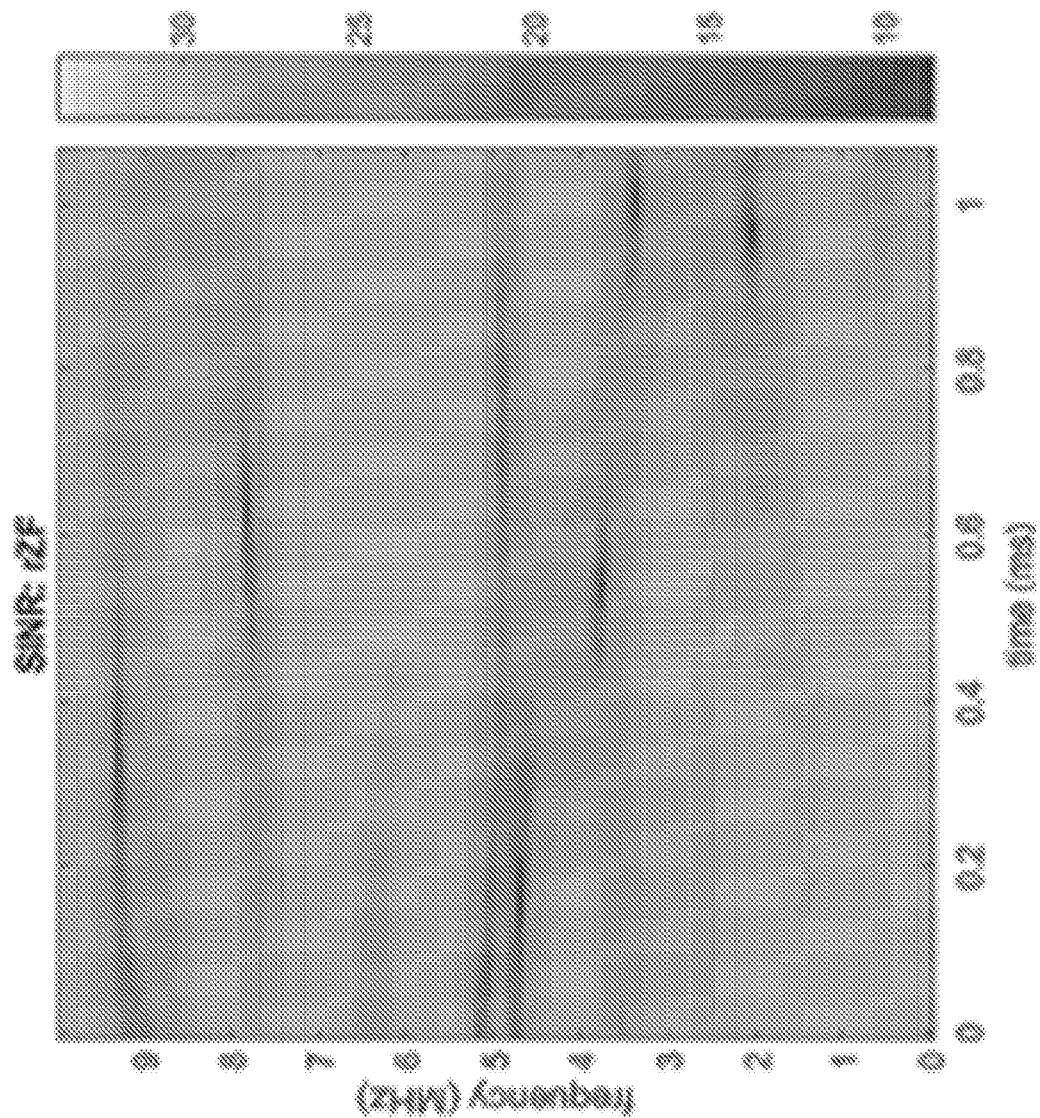
FIG. 53 shows exemplary spectral plots comparing the SINR experienced by the UE for two precoding schemes for the SISO OTFS case.
Figure 53:
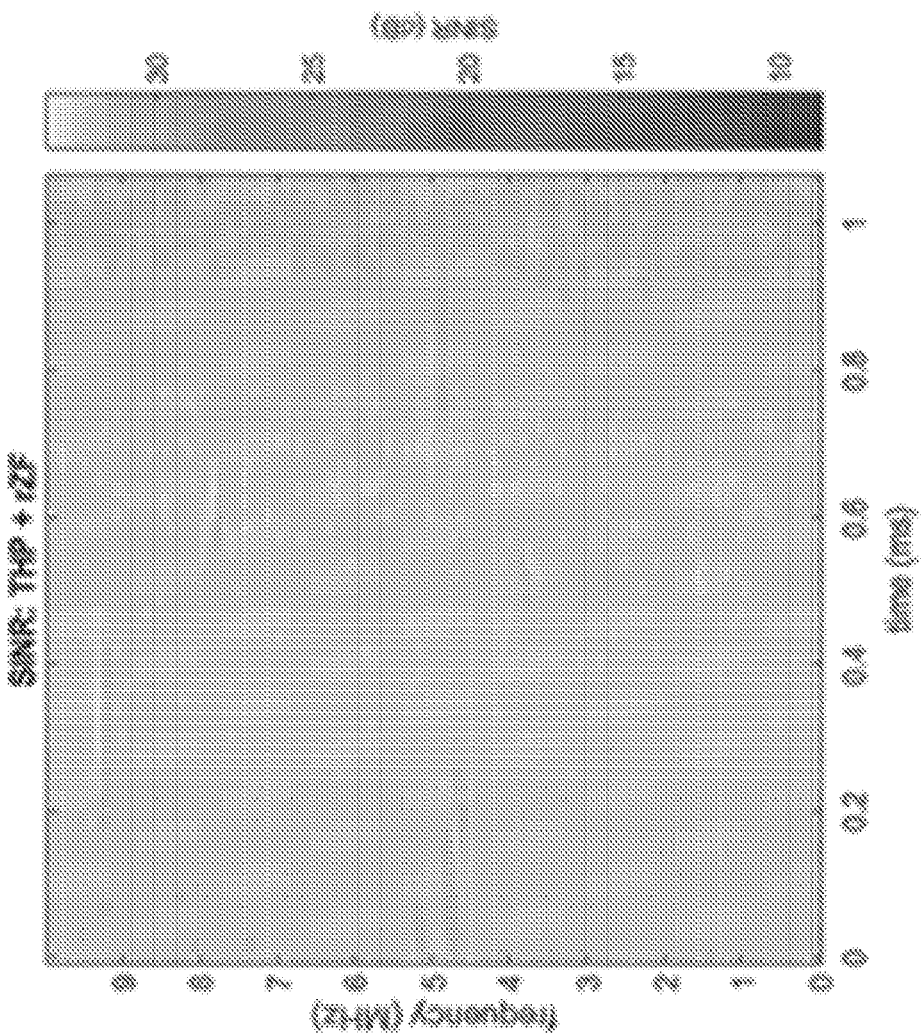

FIG. 52 displays the channel time frequency response. FIG. 53 compares the SINR experienced by the UE for the two precoding schemes. We note that the THP perturbed signal has both a high average SINR and an extremely stable SINR. In contract, just using the linear precoder results in large SINR fluctuations (20+ dBs).

MIMO Single Carrier

In this section, we disclose a MIMO single carrier THP filter. The filter will be like the SISO single carrier THP filter, however, with the filter taps now being matrix valued instead of scaler valued. Towards this end we express the expected error energy in the delay domain (the domain where QAMs and perturbations are defined):

$$\text{expected error energy} = \sum_{f=0}^{N_f-1} (X(f) + P(f))^* M_{error}(f)(X(f) + P(f))$$

$$= \sum_{\tau=0}^{N_\tau-1} (x(\tau) + p(\tau))^* \sum_{\tau'=0}^{N_\tau-1} m_{error}(\tau - \tau')(x(\tau') + p(\tau'))$$

where $x(\tau)$, $p(\tau) \in \mathbb{C}^{L_u}$ and $m_{error}(\tau) \in \mathbb{C}^{L_u \times L_u}$. The QAM signal x and the perturbation signal p can be represented as vectors in $\mathbb{C}^{L_u N_\tau}$, which we denote by x, p respectively. Likewise, convolution by $m_{error}$ can be represented as multiplication by a positive definite block circulant matrix in $\mathbb{C}^{L_u N_\tau \times L_u N_\tau}$ (blocks are of size $L_u \times L_u$) which we denote by $m_{error}$. Using these representations, we can write the expected error energy as:

$$\text{expected error energy} = (x+p)^* m_{error}(x+p)$$

Computing Perturbations with Block Cholesky Factors

In this subsection, we disclose how to compute good perturbations using the block Cholesky decomposition:

$$m_{error} = U^* D U,$$

where D is positive definite block diagonal and U is block unit upper triangular (i.e. upper triangular with block diagonal matrices equal to the identity matrix). Expressing the expected error energy in terms of the Cholesky factors gives:

$$\text{expected error energy} = (U(x+p))^* D(U(x+p))$$
$$= z^* D z$$
$$= \sum_{\tau=0}^{N_\tau-1} z(\tau)^* D(\tau) z(\tau)$$

with:

z=U(x+p)

$z(t) \in \mathbb{C}^{L_u}$ equal to the spatial values of z at delay bin $\tau$:

$$z(\tau) = z(\tau L_u : (\tau+1) L_u - 1)$$

$D(\tau) \in \mathbb{C}^{L_u \times L_u}$ equal to the $\tau$'th block diagonal entry of D:

$$D(\tau) = D(\tau L_u : (\tau+1) L_u - 1, \tau L_u : (\tau+1) L_u - 1)$$

Therefore, minimizing the expected error energy is equivalent to minimizing the quadratic forms $z(\tau)^* D(\tau) z(\tau)$, where the value of $z(\tau)$ can be expressed recursively:

$$z(\tau) = x(\tau) + p(\tau) - \sum_{\tau'=\tau+1}^{N_\tau-1} U^{-1}(\tau, \tau') z(\tau')$$

with:

$x(\tau) \in \mathbb{C}^{L_u}$ equal to the spatial values of x at delay bin $\tau$:

$$x(\tau) = x(\tau L_u : (\tau+1) L_u - 1)$$

$p(\tau) \in \mathbb{C}^{L_u}$ equal to the spatial values of p at delay bin $\tau$:

$$p(\tau) = p(\tau L_u : (\tau+1) L_u - 1)$$

$U^{-1}(\tau, \tau') \in \mathbb{C}^{L_u \times L_u}$ equal to the $(\tau, \tau')$ block entry of $U^{-1}$:

$$U^{-1}(\tau, \tau') = U^{-1}(\tau L_u : (\tau+1) L_u - 1, \tau' L_u : (\tau'+1) L_u - 1)$$

Suppose the value of $z(\tau')$ has been selected for $\tau' = (\tau+1), \ldots, N_\tau - 1$, then the problem of minimizing the quadratic form $z(\tau)^* D(\tau) z(\tau)$ can be cast as a closest lattice point problem (CLP) by noting that:

$$z(\tau)^* D(\tau) z(\tau) = (r(\tau) + p(\tau))^* D(\tau)(r(\tau) + p(\tau))$$

$$r(\tau) = x(\tau) - \sum_{\tau'=\tau+1}^{N_\tau-1} U^{-1}(\tau, \tau') z(\tau')$$

Therefore, minimizing the quadratic form is equivalent to solving the CLP:

$$\underset{p \in (2\mathbb{Z}+2j\mathbb{Z})^{L_u}}{\text{argmin}} \; (r(\tau) + p)^* D(\tau)(r(\tau) + p) \quad (1)$$

Figure 54:
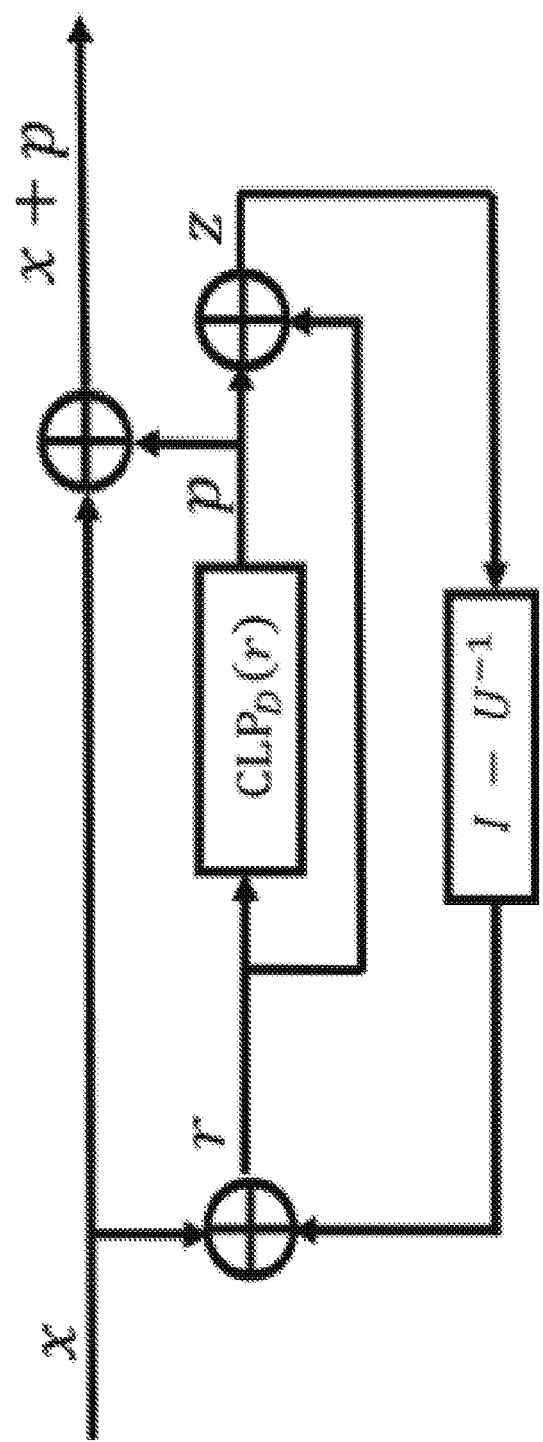
FIG. 54 is a block diagram illustrating an example of the update step of the algorithm for the computation of perturbation using $U^{-1}$ for the MIMO single carrier case.

In general, the CLP problem is NP hard. A quick but suboptimal solution can be computed by projecting each coordinate of $-r(\tau)$ onto the lattice $2\mathbb{Z} + 2j\mathbb{Z}$:

$$p(i) = -\mathcal{P}_{(2\mathbb{Z}+2j\mathbb{Z})}(r(\tau))(i)$$

for $i = 0, \ldots, L_u - 1$. To compute a better solution a form of spatial THP should be used; this includes the methods of V-Blast, sphere-encoding, k-best, lattice reduction, and their variants. Putting everything together gives a method to iteratively compute good perturbation signals:
1. Initialization set $p(N_\tau) = 0$ and $z(N_\tau) = x(N_\tau)$.
2. Update Suppose we have selected $p(\tau')$ and $z(\tau')$ for $\tau' = (\tau+1), \ldots, N_\tau - 1$, then:

$$r(\tau) = x(\tau) - \sum_{\tau'=\tau+1}^{N_\tau-1} U^{-1}(\tau, \tau') z(\tau')$$

$$p(\tau) = CLP_{D(\tau)}(r(\tau))$$

$$z(\tau) = p(\tau) + r(\tau)$$

where $CLP_{D(\tau)}(r(\tau))$ denotes some (usually suboptimal) solution to the CLP problem of equation 1. A block diagram for the update step is shown in FIG. 54.

Computing Perturbations with $W_{THP}$

In this subsection we disclose how to compute good perturbations using a MIMO single carrier THP filter. Like the SISO case, the application of $1 - U^{-1}$ can be well approximated by the application of a filter (outside of edge effects):

$$\sum_{\tau'=\tau+1}^{N_\tau-1} U^{-1}(\tau, \tau') z(v) \approx \sum_{n=1}^{N_{chan}} W_{THP}(n) z(\tau+n),$$

for $\tau = 0, 1, \ldots, N_\tau - N_{chan} - 1$, where $N_{chan}$ denotes the width of the channel. We call the filter $W_{THP}$ the MIMO single carrier THP filter with:

$$W_{THP}(n) \in \mathbb{C}^{L_u \times L_u} \text{ and } W_{THP}(n) = U^{-1}(N_{chan} - n, N_{chan}),$$

for $n = 1, \ldots, N_\tau - N_{chan}$. Also, outside of edge effects the positive definite matrix $D(\tau)$ is nearly constant:

$$D(\tau) \approx D(N_{chan}),$$

for $\tau = N_{chan}, N_\tau - N_{chan} - 1$. To avoid edge effects we enforce the QAM signal, x, to be zero for an initialization region.

Putting everything together gives an efficient method to compute coarse perturbations:

1. Setup compute the filter coefficients $W_{THP}(n)$ for $n=1, \ldots, N_{chan}$. Compute the positive definite matrix $D(N_{chan})$.
2. Initialization set the function values on the top delay bins equal to zero:
   $p(\tau)=0, x(\tau)=0$, and $z(\tau)=0$,
   for $\tau = N_\tau - N_{chan}, \ldots, N_\tau - 1$.
3. Update Suppose we have selected $p(\tau')$ and $z(\tau')$ for $\tau' = (\tau+1), \ldots, N_T - 1$, then:

$$r(\tau) = x(\tau) - \sum_{n=1}^{N_{chan}} W_{THP}(n) z(\tau + n)$$

$$p(\tau) = CLP_{D(N_{chan})}(r(\tau))$$

$$z(\tau) = p(\tau) + r(\tau)$$

4. Update suppose we have selected $p(\tau')$ and $z(\tau')$ for $\tau' = 0, 1, \ldots, N_\tau - 1$. Then we take:

$$x(\tau) = z(\tau) + \sum_{n=1}^{N_{chan}} W_{THP}(n) z(\tau + n),$$

for $\tau = N_\tau - N_{chan}, \ldots, N_\tau - 1$.

Figure 55:
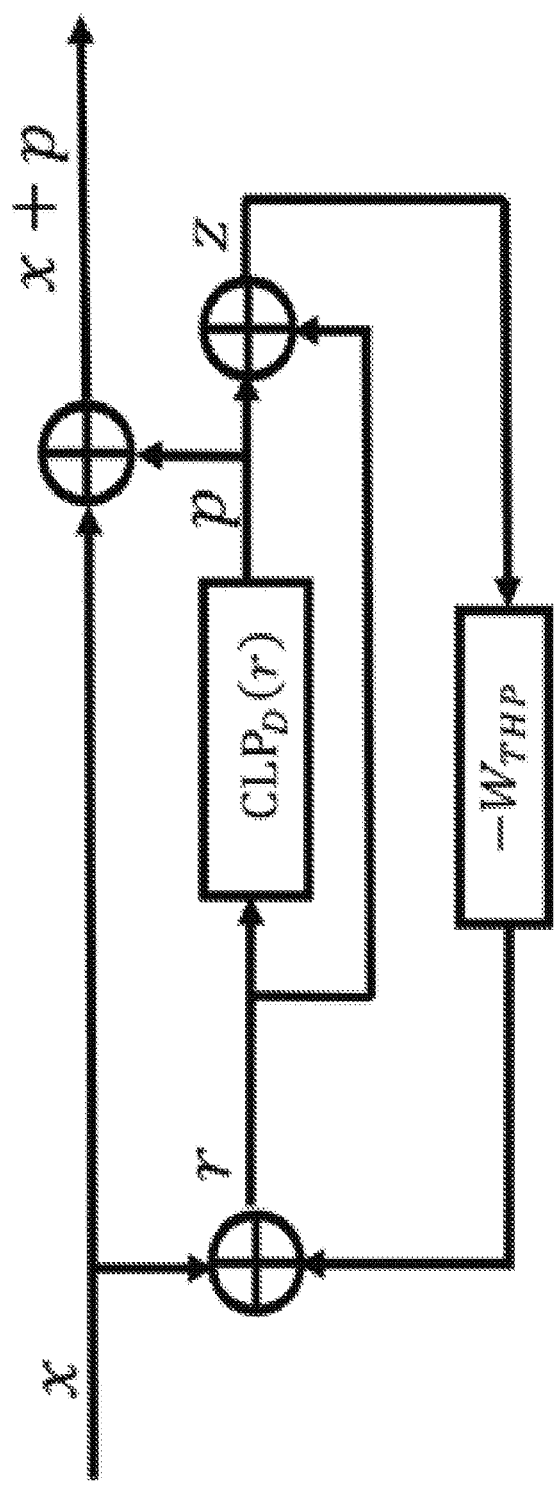
FIG. 55 is a block diagram illustrating an example of the update step of the algorithm for the computation of perturbation using $W_{THP}$ for the MIMO single carrier case.

Because there is no QAM information transmitted in the initialization region the finalize step does not overwrite user data. We note that by using unique word single carrier, the initialization region can also do the work of the cyclic prefix thus limiting overhead. A block diagram for the update step is shown in FIG. 55.

Simulation Results

Application of the MIMO single carrier THP filter was simulated with the parameters given in Table 9.

TABLE 9

| Subcarrier spacing | 15 kHz |
| --- | --- |
| $N_f, N_\tau$ | 600 |
| Delay span | 2 us |
| Doppler span | 0 kHz |
| Data noise variance | −35 dB |
| Channel noise variance | −35 dB |
| $L_u$ | 8 |
| $L_h$ | 8 |
| QAM order | Infinity (uniform in unit box) |

Figure 56:
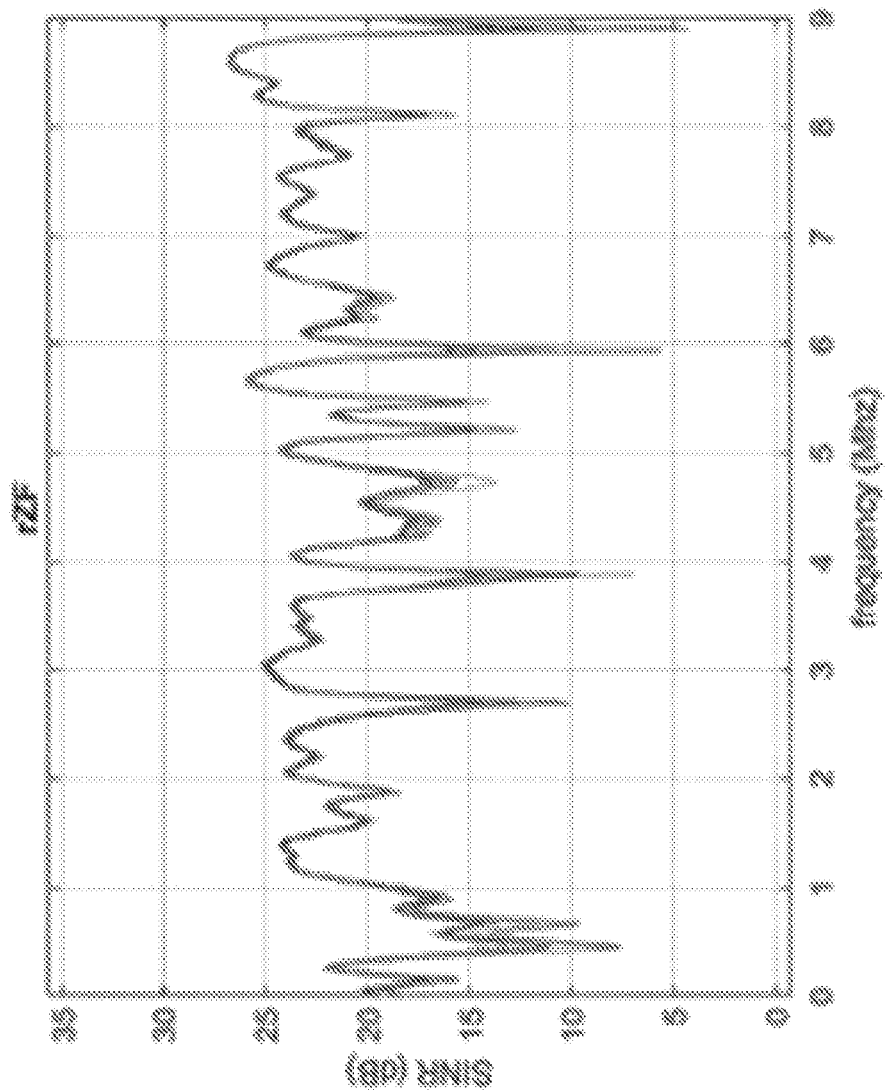
FIG. 56 shows plots comparing the SINR experienced by the 8 UEs for two precoding schemes in the MIMO single carrier case.
Figure 56:
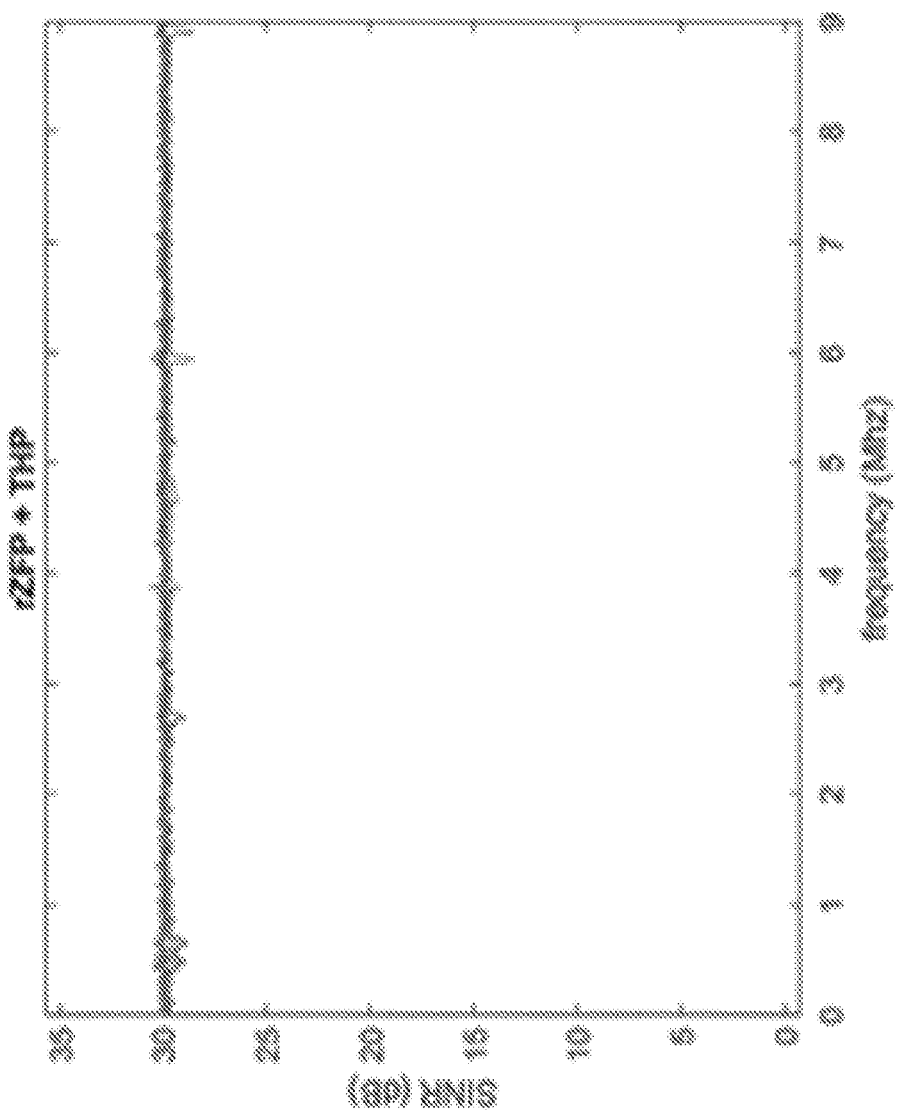

FIG. 56 compares the SINR experienced by the 8 UEs for the two precoding schemes. We note that the THP perturbed signal has both a high average SINR and an extremely stable SINR. In contrast, just using the linear precoder results in large SINR fluctuations (20+ dBs).

MIMO OTFS

In this section, we disclose MIMO OTFS THP filters. The filters will be like the SISO OTFS THP filters, however, with the filter taps now being matrix valued instead of scaler valued. Towards this end we express the expected error energy in the hybrid delay-time domain:

expected error energy =

$$\sum_{f=0}^{N_f-1} \sum_{t=0}^{N_t-1} (X(f,t) + P(f,t))^* M_{error}(f,t)(X(f,t) + P(f,t)) =$$

$$\sum_{t=0}^{N_t-1} \sum_{\tau=0}^{N_\tau-1} (\tilde{X}(\tau,t) + \tilde{P}(\tau,t))^* \sum_{\tau'=0}^{N_\tau-1} \tilde{M}_{error}(\tau - \tau', t)(\tilde{X}(\tau',t) + \tilde{P}(\tau',t)),$$

Where the function $\tilde{X}(\tau,t)$ is defined as:

$$\tilde{X}(\tau,t) = (\mathcal{F}_F^{-1} X)(\tau,t) = \sum_{f=0}^{N_f-1} e^{\frac{2\pi j f \tau}{N_f}} X(f,t)$$

The functions $\tilde{P}(\tau,t)$ and $\tilde{M}_{error}(\tau,t)$ are defined in the same way. Next, we vectorize the functions $\tilde{P}(\bullet,t)$ and $\tilde{X}(\bullet,t)$ to express the expected error energy using linear algebra:

$$\text{expected error energy} = \sum_{t=0}^{N_t-1} (\tilde{X}_t + \tilde{P}_t)^* \tilde{M}_{error,t} (\tilde{X}_t + \tilde{P}_t)$$

where $\tilde{X}_t, \tilde{P}_t \in \mathbb{C}^{L_u N_\tau}$ and the matrices $\tilde{M}_{error,t} \in \mathbb{C}^{L_u N_\tau \times L_u N_\tau}$ are positive definite and block circulant (with blocks of size $L_u \times L_u$).

Computing Perturbations with Block Cholesky Factors

In this subsection, we disclose how to compute good perturbations using the block Cholesky decompositions:

$$\tilde{M}_{error,t} = \tilde{U}_t^* \tilde{D}_t \tilde{U}_t,$$

for $t = 0, 1, \ldots, N_t - 1$, where the $\tilde{D}_t$ are positive definite block diagonal and the $\tilde{U}_t$ are block unit upper triangular (i.e. upper triangular with block diagonal matrices equal to the identity matrix). Expressing the expected error energy in terms of these Cholesky factors gives:

$$\text{expected error energy} = \sum_{t=0}^{N_t-1} (\tilde{X}_t + \tilde{P}_t)^* \tilde{U}_t^* \tilde{D}_t \tilde{U}_t (\tilde{X}_t + \tilde{P}_t)$$

$$= \sum_{t=0}^{N_t-1} \tilde{Z}_t^* \tilde{D}_t \tilde{Z}_t$$

$$= \sum_{t=0}^{N_t-1} \sum_{\tau=0}^{N_\tau-1} \tilde{Z}(\tau,t)^* \tilde{D}(\tau,t) \tilde{Z}(\tau,t),$$

with:

$\tilde{Z}_t = \tilde{U}_t (\tilde{X}_t + \tilde{P}_t)$ $\tilde{Z}(\tau,t) \in \mathbb{C}^{L_u}$ equal to the spatial values of $\tilde{Z}_t$ at delay bin $\tau$:

$\tilde{Z}(\tau,t) = \tilde{Z}_t(\tau L_u:(\tau+1)L_u - 1)$ $\tilde{D}(\tau,t) \in \mathbb{C}^{L_u \times L_u}$ equal to the $\tau$'th block diagonal entry of $\tilde{D}_t$:

$\tilde{D}(\tau,t) = \tilde{D}_t(\tau L_u:(\tau+1)L_u - 1, \tau L_u:(\tau+1)L_u - 1)$ Next, we express the expected error energy in the delay-Doppler domain (the domain where QAMs and perturbations are defined):

$$\text{expected error energy} = \sum_{\tau=0}^{N_\tau-1} \sum_{v=0}^{N_v-1} z(\tau, v)^* \sum_{v'=0}^{N_v-1} d(\tau, v-v') z(\tau, v')$$

where the function $z(\tau,v)$ is defined as:

$$z(\tau, v) = (\mathcal{F}_T^{-1} \tilde{Z})(\tau, v) = \sum_{t=0}^{N_t-1} e^{\frac{2\pi j t v}{N_t}} \tilde{Z}(\tau, t)$$

The function $d(\tau,v)$ is defined in the same way. For Doppler shifts encountered in typical wireless channels ($\leq 500$ Hz) the term $\tilde{D}(\tau,t)$ is nearly constant with respect to time, therefore, the energy of its inverse Fourier transform, $d(\tau,v)$, is concentrated in the DC term, $d(\tau,0)$. Using this fact, the expected error energy can be well approximated as:

$$\text{expected error energy} \approx \sum_{\tau=0}^{N_\tau-1} \sum_{v=0}^{N_v-1} z(\tau,v)^* d(\tau,0) z(\tau,v)$$

In conclusion, minimizing the expected error energy is equivalent to minimizing the quadratic forms $z(\tau,v)^* d(\tau,0) z(\tau,v)$, where the value of $z(\tau,v)$ can be expressed recursively:

$$z(\tau, v) = x(\tau, v) + p(\tau, v) - \mathcal{F}_T^{-1}\left(\sum_{\tau'=\tau+1}^{N_\tau-1} \tilde{U}_t^{-1}(\tau, \tau') \tilde{Z}(\tau', t)\right)(\tau, v)$$

with:
- $x(\tau,v) \in \mathbb{C}^{L_u}$ equal to the spatial values of x at delay-Doppler bin $(\tau,v)$
- $p(\tau,v) \in \mathbb{C}^{L_u}$ equal to the spatial values of p at delay-Doppler bin $(\tau,v)$
- $\tilde{U}_t^{-1}(\tau,\tau') \in \mathbb{C}^{L_u \times L_u}$ equal to the $(\tau,\tau')$ block entry of $\tilde{U}_t^{-1}$:

$$\tilde{U}_t^{-1}(\tau,\tau') = \tilde{U}\tau^{-1}(\tau L_u : (\tau+1)L_u - 1, (\tau'+1)L_u - 1)$$

Suppose the value of $\tilde{Z}(\tau',t)$ has been selected for $\tau' = (\tau+1), \ldots, N_\tau - 1$ and $t = 0, 1, \ldots, N_t-1$, then the problem of minimizing the quadradic forms $z(\tau,v)^* d(\tau,0) z(\tau,v)$ can be cast as a closest lattice point problem (CLP) by noting that:

$$z(\tau,v)^* d(\tau,0) z(\tau) = (r(\tau,v) + p(\tau,v))^* d(\tau,0)(r(\tau,v) + p(\tau,v))$$

$$r(\tau,v) = x(\tau,v) - \mathcal{F}_T^{-1}\left(\sum_{\tau'=\tau+1}^{N_\tau-1} \tilde{U}_t^{-1}(\tau,\tau') \tilde{Z}(\tau',t)\right)(\tau,v)$$

Therefore, minimizing the quadratic form is equivalent to solving the CLP:

$$\underset{p \in (2\mathbb{Z}+2j\mathbb{Z})^{L_u}}{\text{argmin}} \; (r(\tau,v)+p)^* d(\tau,0)(r(\tau,v)+p) \quad (2)$$

Figure 57:
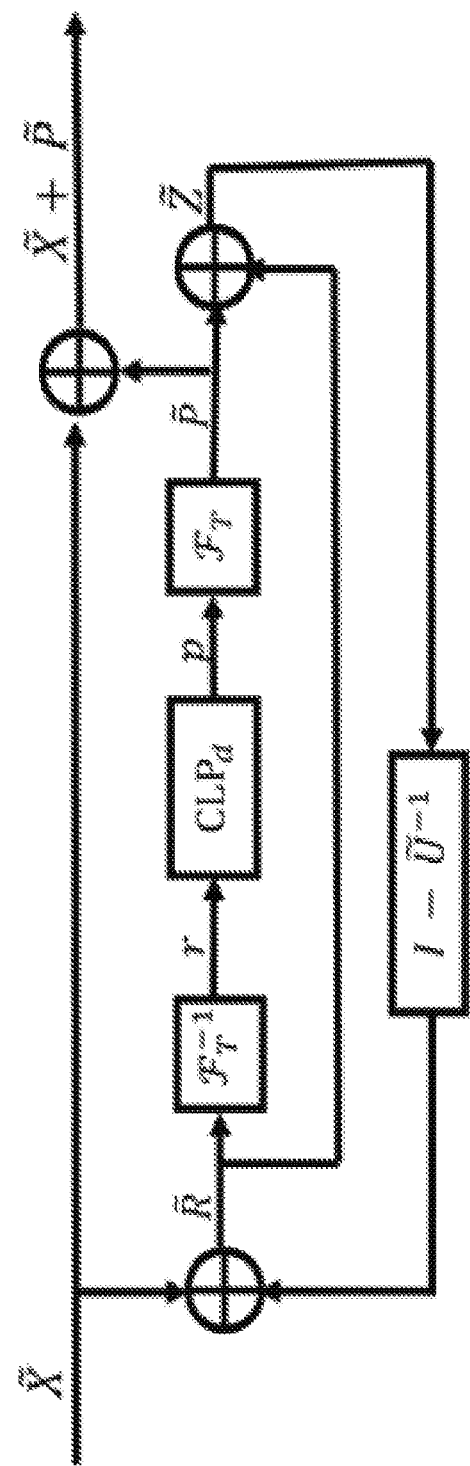
FIG. 57 is a block diagram illustrating an example of the update step of the algorithm for the computation of perturbation using $U^{-1}$ for the MIMO OTFS case.

In general, the CLP problem is NP hard. A quick but suboptimal solution can be computed by projecting each coordinate of $-r(\tau,v)$ onto the lattice $2\mathbb{Z}+2j\mathbb{Z}$:

$$p(i) = -\mathcal{P}_{(2\mathbb{Z}+2j\mathbb{Z})}(r(\tau,v))(i)$$

for $i=0,1,\ldots,L_u-1$. To compute a better solution, a form of spatial THP should be used; this includes the methods of V-Blast, sphere-encoding, k-best, lattice reduction, and their variants. Putting everything together gives a method to iteratively compute a good perturbation signal:

1. Initialization set $\tilde{P}(N_\tau,t)=0$ and $\tilde{Z}(N_\tau,t)=\tilde{X}(N_\tau,t)$ for $t=0, 1, \ldots, N_t-1$
2. Update Suppose we have selected $\tilde{P}(\tau',t)$ and $\tilde{Z}(\tau',t)$ for $\tau'=(\tau+1) \ldots N_\tau-1$, then:

$$\tilde{R}(\tau,t) = \tilde{X}(\tau,t) - \sum_{\tau'=\tau+1}^{N_\tau-1} \tilde{U}_t^{-1}(\tau,\tau') \tilde{Z}(\tau',t)$$

$$r(\tau,v) = (\mathcal{F}_T^{-1} \tilde{R})(\tau,v)$$

$$p(\tau,v) = CLP_{d(\tau,0)}(r(\tau,v))$$

$$\tilde{P}(\tau,t) = (\mathcal{F}_T p)(\tau,t)$$

$$\tilde{Z}(\tau,t) = \tilde{P}(\tau,t) + \tilde{R}(\tau,t)$$

here $CLP_{d(\tau,0)}(r(\tau,v))$ denotes some (usually suboptimal) solution to the CLP problem of equation 2. FIG. 57 shows a block diagram for the update step.

Computing Perturbations with $W_{THP}$

In this subsection we disclose how to compute good perturbations using MIMO OTFS THP filters Like the SISO case, the application of $I-\tilde{U}^{-1}$ can be well approximated by the application of filters (outside of edge effects):

$$\sum_{\tau'=\tau+1}^{N_\tau-1} \tilde{U}_t^{-1}(\tau,\tau') z(\tau') \approx \sum_{n=1}^{N_{chan}} W_{THP}(n,t) z(\tau+n,t),$$

for $\tau=0, 1, \ldots, N_\tau-N_{chan}-1$ and $t=0, 1, \ldots, N_t-1$, where $N_{chan}$ denotes the width of the channel. We call the filters $W_{THP}(\bullet,t)$ the MIMO OTFS THP filters with:

$$W_{THP}(n,t) \in \mathbb{C}^{L_u \times L_u} \text{ and } W_{THP}(n,t) = \tilde{U}_t^{-1}(N_{chan}-n, N_{chan}),$$

for $n=1, \ldots, N_{chan}$ and $t=0, 1, \ldots, N_t$. Also, outside of edge effects the positive definite matrix $d(\tau,0)$ is nearly constant:

$$d(\tau,0) \approx d(N_{chan},0),$$

for $\tau = N_{chan}, \ldots, N_\tau-N_{chan}-1$. To avoid edge effects we enforce the QAM signal, x, to be zero for an initialization region. Putting everything together gives an efficient method to compute good perturbations:

1. Setup compute the filter coefficients: $W_{THP}(n,t)$ for $t=0, 1, \ldots, N_t-1$ and $n=1, \ldots, N_{chan}$. Compute the positive definite matrix $d(N_{chan},0)$.
2. Initialization set function values on the top delay bins equal to zero:

$$\tilde{P}(\tau,t)=0, \tilde{X}(\tau,t)=0, \text{ and } \tilde{Z}(\tau,t)=0,$$

for $\tau=N_\tau-N_{chan}, \ldots, N_\tau-1$ and $t=0, 1, \ldots, N_t-1$.

3. Update suppose we have selected $\tilde{P}(\tau',t)$ and $\tilde{Z}(\tau',t)$ for $\tau'=(\tau+1), \ldots, N_\tau-1$ and $t=0, 1, \ldots, N_t-1$ then:

$$\tilde{R}(\tau,t) = \tilde{X}(\tau,t) - \sum_{n=1}^{N_{chan}} W_{THP,t}(n) \tilde{Z}(\tau+n,t)$$

$$r(\tau,v) = (\mathcal{F}_T^{-1} \tilde{R})(\tau,v)$$

-continued $$p(\tau, v) = CLP_{d(N_{chan}, 0)}(r(\tau, v))$$

$$\tilde{P}(\tau, t) = (\mathcal{F}_T p)(\tau, t)$$

$$\tilde{Z}(\tau, t) = \tilde{X}(\tau, t) + \tilde{R}(\tau, t)$$

for t=0, 1, . . . , $N_t$–1 and v=0, 1, . . . , $N_v$–1.

4. Finalize suppose we have selected $\tilde{Z}(\tau',t)$ and $\tilde{P}(\tau',t)$ for $\tau'$=0, 1, . . . , $N_t$–1 and t=0, 1, . . . , $N_t$–1. Then we take:

$$\tilde{X}(\tau, t) = \tilde{Z}(\tau, t) + \sum_{n=1}^{N_{chan}} W_{THP}(n, t)\tilde{Z}(\tau, t)$$

for $\tau$=$N_\tau$–$N_{chan}$, . . . , $N_\tau$–1 and t=0, 1, . . . ,$N_t$–1.

Figure 58:
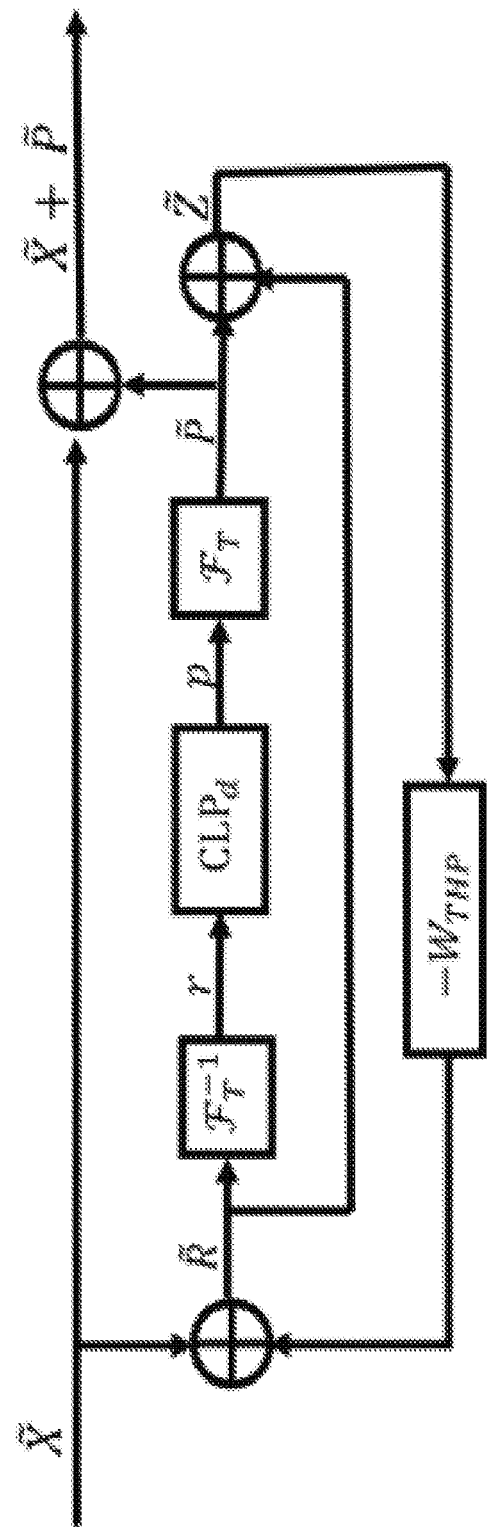
FIG. 58 is a block diagram illustrating an example of the update step of the algorithm for the computation of perturbation using $W_{THP}$ for the MIMO OTFS case.

Because there is no QAM information transmitted in the initialization region the finalize step does not overwrite user data. We note that by using unique word OTFS, the initialization region can also do the work of the cyclic prefix thus limiting overhead. A block diagram for the update step is shown in FIG. 58.

Simulation Results

Application of the OTFS MIMO THP filter was simulated with the parameters given in Table 10.

TABLE 10

| | |
|---|---|
| Subcarrier spacing | 15 kHz |
| $N_f$, $N_\tau$ | 128 |
| $N_\tau$, $N_v$ | 256 |
| Delay span | 1 us |
| Doppler span | 1 kHz |
| Data noise variance | −35 dB |
| Channel noise variance | −35 dB |
| $L_u$ | 8 |
| $L_h$ | 8 |
| QAM order | Infinity (uniform in unit box) |

Figure 59:
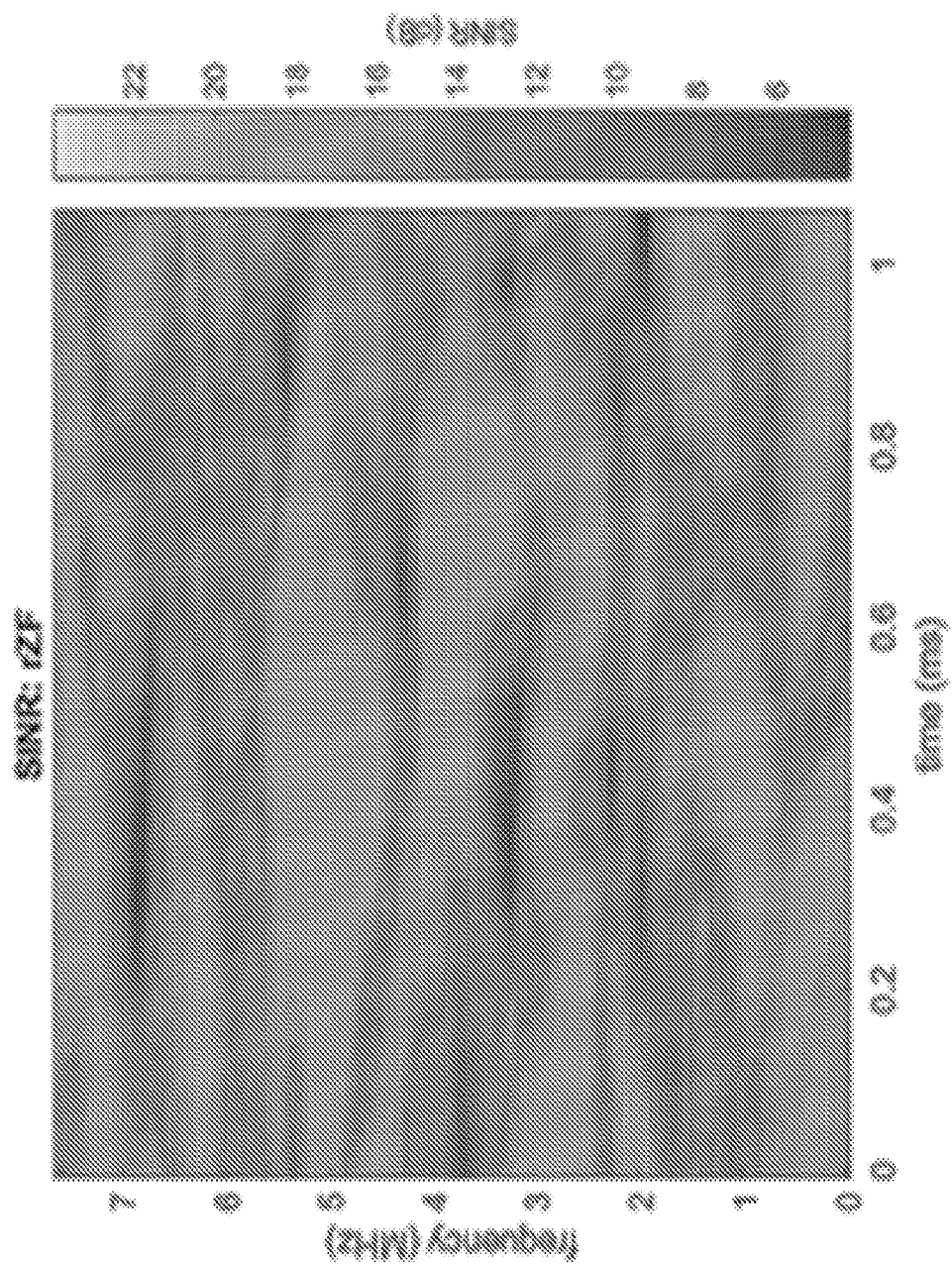
FIG. 59 shows plots comparing the SINR experienced by 1 UE for two precoding schemes in the MIMO OTFS case.
Figure 59:
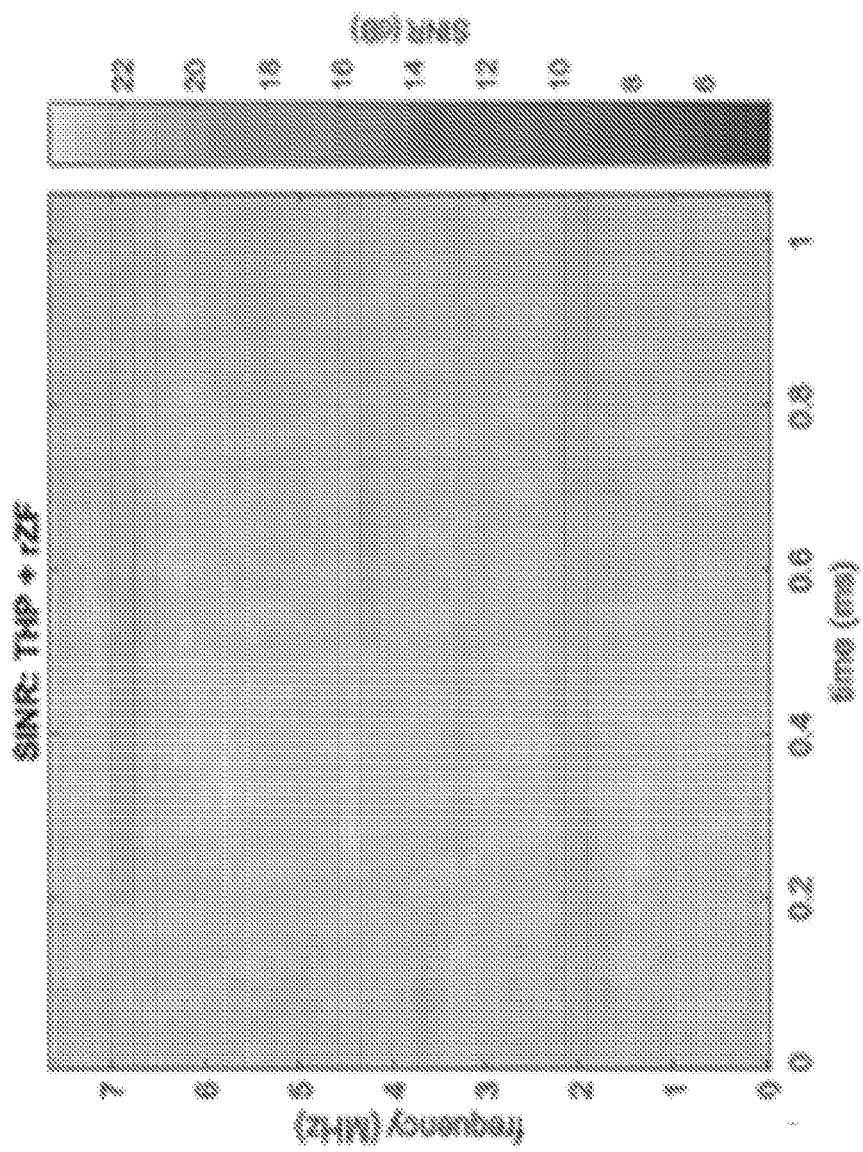

FIG. 59 shows the SINR experienced by UE 1 for the two precoding schemes. We note that the THP perturbed signal has both a high average SINR and an extremely stable SINR. In contrast, just using the linear precoder results in large SINR fluctuations (15+ dBs).

Exemplary Methods

Figure 60:
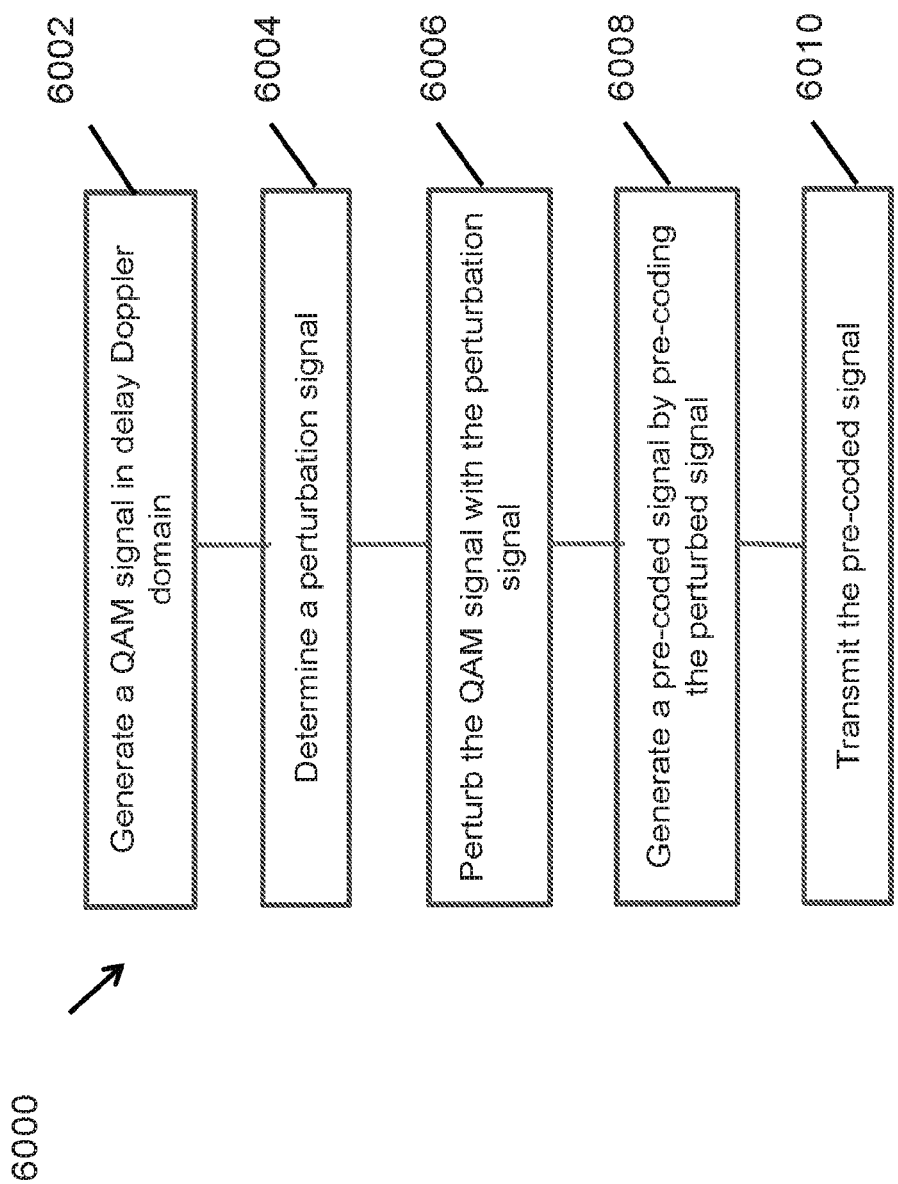
FIG. 60 is a flowchart of an example wireless communication method.

FIG. 60 is a flowchart illustrating an example method 6000 for transmitting wireless signals.

The method 6000 includes, at 6002, mapping data to generate a quadrature amplitude modulation (QAM) signal in a delay Doppler domain.

The method 6000 includes, at 6004, determining a perturbation signal to minimize expected interference and noise. The present document discloses techniques for determining the perturbation signal.

The method 6000 includes, at 6006, perturbing the QAM signal with the perturbation signal, thereby producing a perturbed signal.

The method 6000 includes, at 6008, generating a pre-coded signal by pre-coding, using a linear pre-coder, the perturbed signal.

The method 6000 includes, at 6010, transmitting the pre-coded signal using an orthogonal time frequency space modulation signal scheme. For example, the pre-coded signal may be spatially selective such that a greater energy is emitted in a first direction for which a first channel state information (CSI) estimate is available than a second direction for which a second CSI estimate is available and the second CSI estimate is less accurate than the first CSI estimate. For example, FIGS. 20 and 21 shows some example embodiments.

In some embodiments, the method 6000 may further include updating the linear pre-coder using an explicit feedback from a user device. Alternatively, the method 6000 may include updating the linear precoder using implicit feedback. As depicted with reference to FIGS. 25-28, in some embodiments, the perturbation signal may be selected using a coarse lattice structure. The lattice structure may represent possible constellation points.

Figure 61:
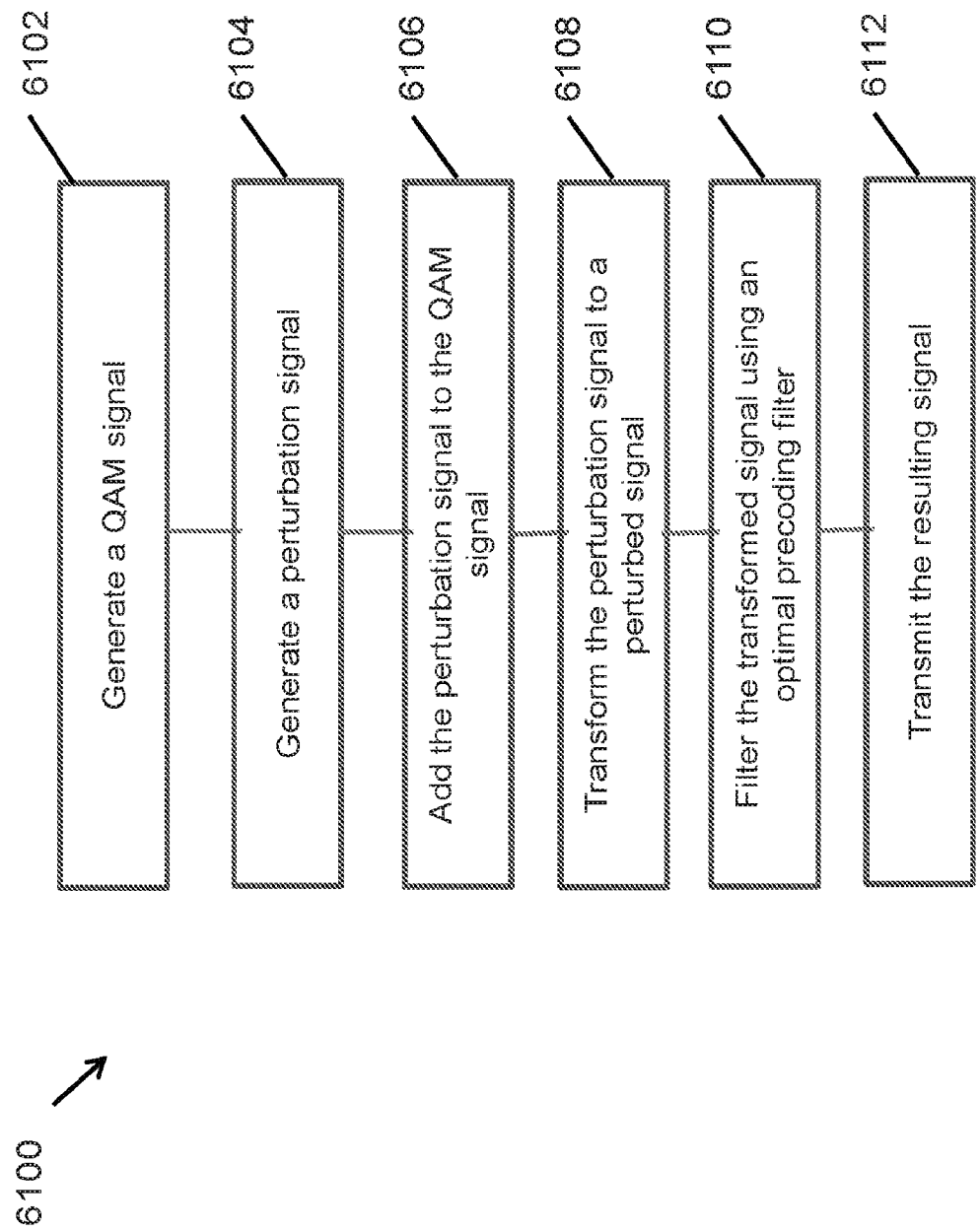
FIG. 61 is a flowchart of an example wireless communication method.

FIG. 61 is a flowchart illustrating an example of a wireless communication method 3900.

The method 6100 includes, at 6102, generating a quadrature amplitude modulation (QAM) signal in a two-dimensional (2D) delay-Doppler domain by modulating data bits.

The method 6100 includes, at 6104, using an error metric along with the QAM signal to generate a perturbation signal.

The method 6100 includes, at 6106, adding the perturbation signal to the QAM signal to generate a perturbed QAM signal.

The method 6100 includes, at 6108, transforming the perturbed QAM signal into a 2D transformed time frequency signal using a 2D Fourier transform from the 2D delay-Doppler domain to a 2D time-frequency domain.

The method 6100 includes, at 6110, filtering the 2D transformed signal using an optimal precoding filter to generate a precoded signal.

The method 6100 includes, at 6112, transmitting the precoded signal over a communication medium.

Figure 62:
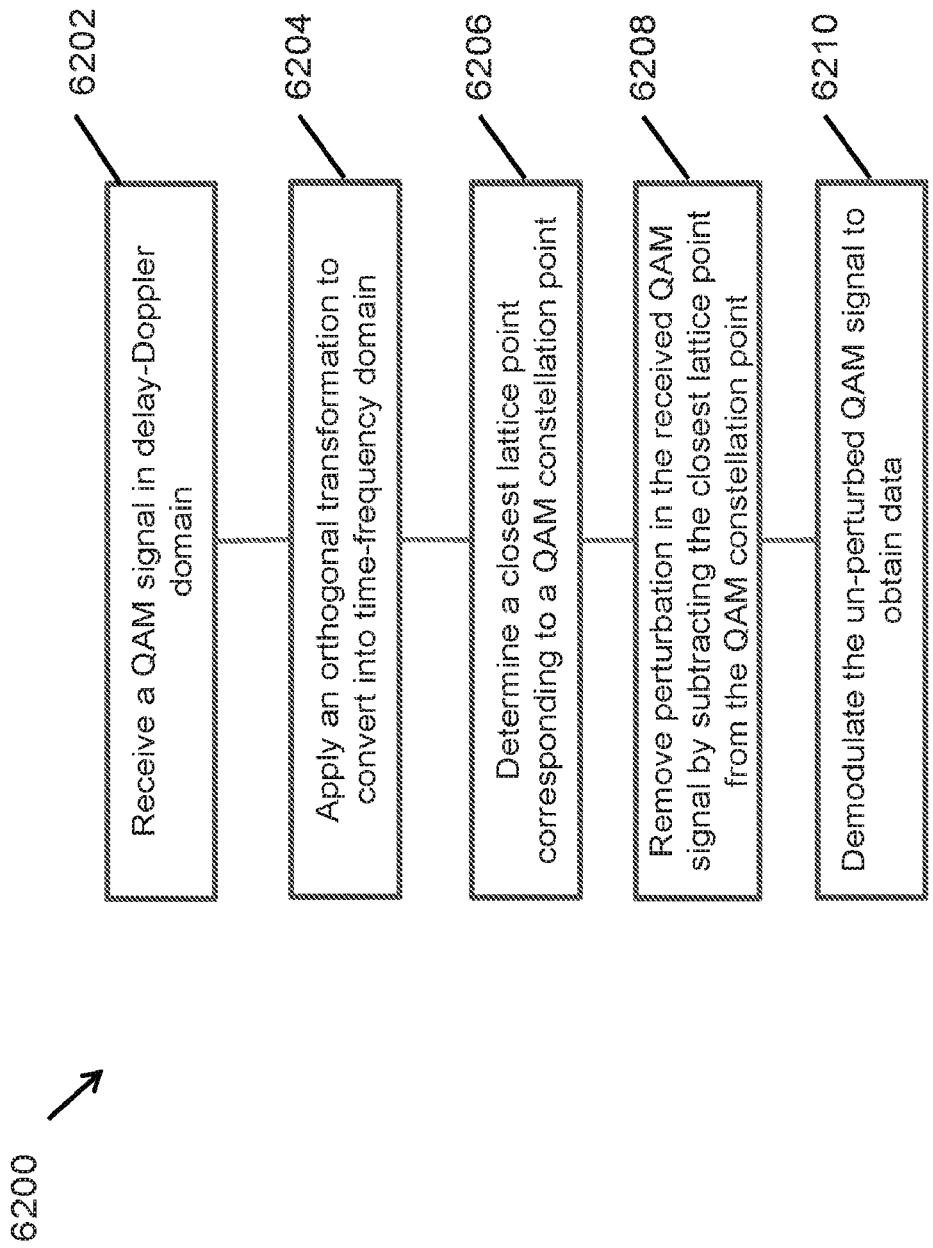
FIG. 62 is a flowchart of an example wireless communication method.

FIG. 62 is a flowchart representation of an example method 6200 of wireless communications.

The method 6200 includes, at 6202, receiving a quadrature amplitude modulation (QAM) signal in the time-frequency domain.

The method 6200 includes, at 6204, applying an orthogonal transformation to convert the received QAM signal into delay-Doppler domain.

The method 6200 includes, at 6206, determining a closest lattice point corresponding to the QAM constellation point of the QAM signal in the delay-Doppler domain.

The method 6200 includes, at 6208, removing perturbation in the received QAM signal by subtracting the closest lattice point from the QAM constellation point.

The method 6200 includes, at 6210, demodulating the un-perturbed QAM signal to obtain data. Additional receiver-side technique that may be used with the method 4000 have been described with reference to FIG. 37 and other figures.

In some embodiments, determining the closest lattice point comprises projecting the received QAM signal in the delay-Doppler domain onto a coarse lattice structure, and wherein the perturbation lies on the coarse lattice structure.

In some embodiments, determining the closest lattice point is based on using a non-linear filter to minimize an error associated with the received QAM signal. In an example, the non-linear filter comprises a spatial Tomlinson-Harashima filter (e.g., as shown in FIG. 38). In another example, the QAM signal is received through a channel, and wherein the non-linear filter is based on estimated second order statistics of the channel. The second order statistics of the channel may be estimated empirically based on, for example, channel impulse responses (in both the time and frequency domains), examples of which are shown in FIGS. 43, 48 and 52.

Figure 63:
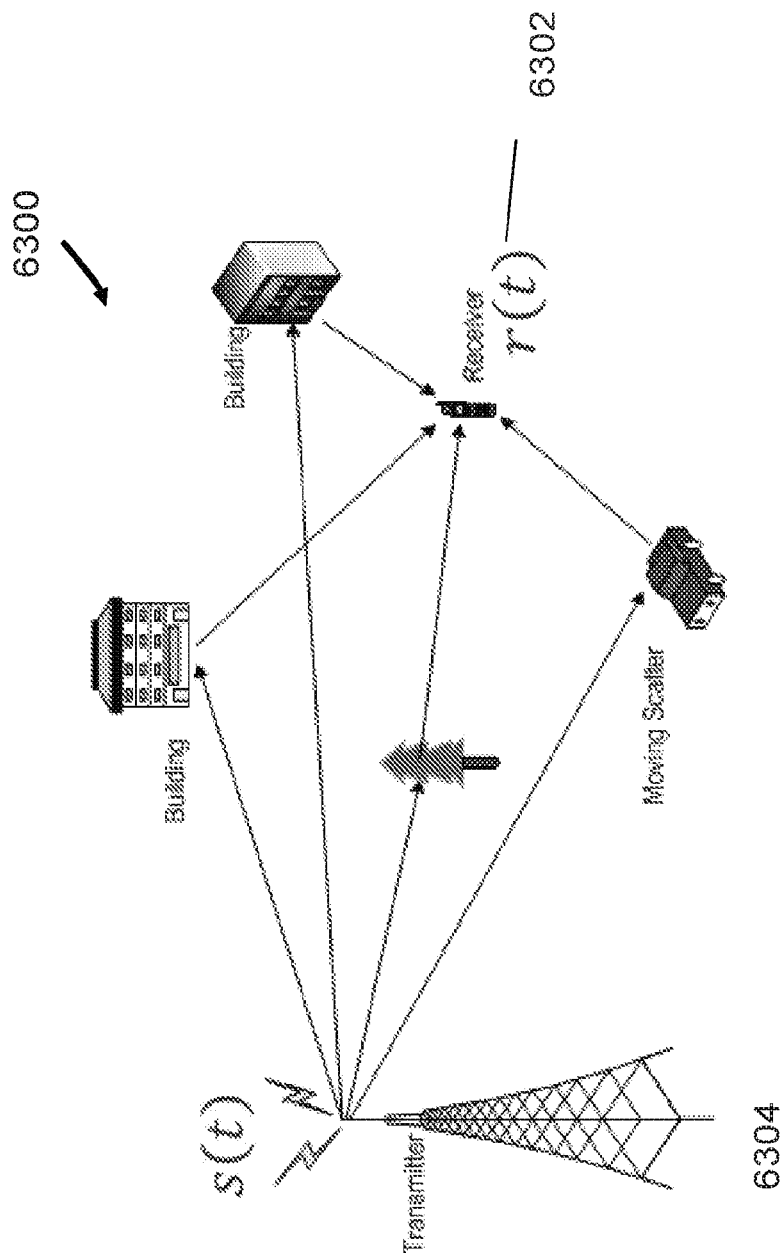
FIG. 63 is an example of a wireless communication system.

FIG. 63 is a block diagram illustration of an example of a wireless communication system 6300. The system 6300 may include one or more transmitters/receivers. For example, a transmitter located at a base station 6304 may transmit signals s(t) to a receiver device 6302, where the received signal r(t) may be affected by the wireless channel that includes air medium and may also include moving or stationary interferers or scatterers such as buildings, vegetation and vehicle. The receiver device 6302 may also transmit signals to the base station 6304, which are not explicitly shown in the drawing. The receiver device 6302 may be a user equipment such as a smartphone, a tablet computer, a laptop, or a non-mobile equipment such as a small cell base station or a wireless access receiver, and so on. The various transmitter-side techniques described in the present document may be implemented using the transmission circuitry of the base station 4104 and/or the receiver apparatus 6302. The various receiver-side techniques described in the present document may be implemented using receiver circuitry of the base station 6304 and/or the receiver apparatus 6302.

Figure 64:
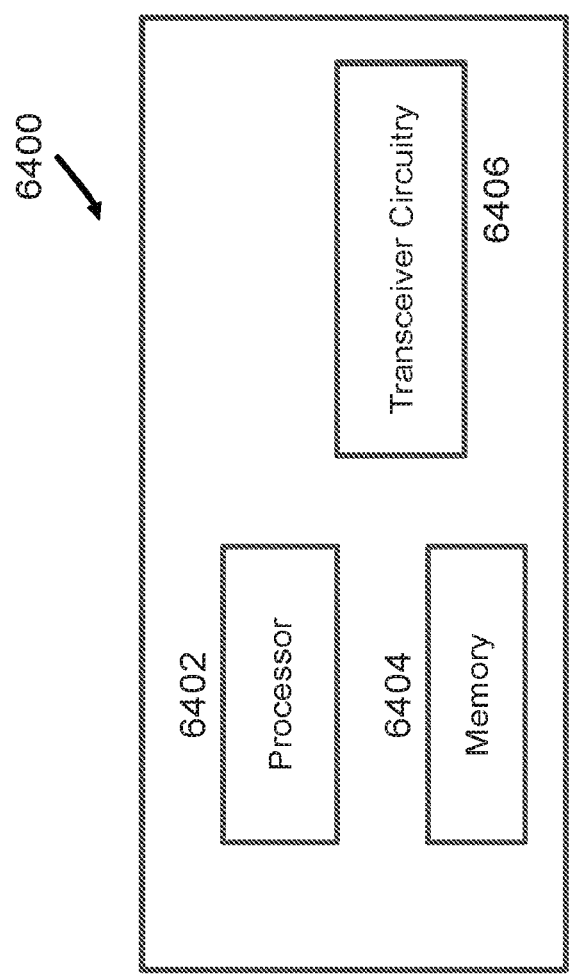
FIG. 64 is a block diagram of a wireless communication apparatus.

FIG. 64 is a block diagram representation of a communication apparatus 6400. The apparatus may include a processor 6402. The apparatus 6400 may include a memory 6404. The apparatus 6400 may include transmission and/or reception circuitry 6406. The processor 6402 may be configured to implement a method described in the present document. The memory 6404 may be configured to store data during the implementation of a method, or may store processor-executable code that, when executed by the processor 6402, causes the processor 6402 to implement a technique described in the present document. The transceiver circuitry 6406 may be configured to perform signal reception or signal transmission processing.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for transmitting a wireless signal, comprising:
   mapping a plurality of data bits to generate a quadrature amplitude modulation (QAM) signal in a delay-Doppler domain;
   determining a perturbation signal to minimize expected interference and noise;
   perturbing the QAM signal with the perturbation signal to produce a first perturbed signal;
   transforming, using a two-dimensional (2D) Fourier transform, the first perturbed signal into a second perturbed signal from the delay-Doppler domain to a time-frequency domain;
   generating a pre-coded signal by pre-coding, using a linear pre-coder, the second perturbed signal; and
   transmitting the pre-coded signal using an orthogonal time frequency space (OTFS) modulation signal scheme.

2. The method of claim 1, wherein the pre-coded signal is spatially selective such that a greater energy is emitted in a first direction for which a first channel state information (CSI) estimate is available than a second direction for which a second CSI estimate is available, and wherein the second CSI estimate is less accurate than the first CSI estimate.

3. The method of claim 1, further including:
   updating the linear pre-coder using an explicit feedback from a user device.

4. The method of claim 1, further including:
   updating the linear pre-coder using an implicit feedback.

5. The method of claim 1, wherein the determining the perturbation signal includes:
   selecting, as the perturbation signal, a set of lattice points of a coarse lattice structure.

6. The method of claim 5, wherein the selecting comprises using a non-linear filter to select the set of lattice points that minimizes the expected interference and noise, and wherein the non-linear filter comprises a Tomlinson-Harashima filter.

7. The method of claim 1, wherein the selecting the perturbation signal includes selecting $p_{opt}$, that minimizes:

$$\sum_{f=1}^{N_f} \sum_{t=1}^{N_t} (X(f, t) + P(f, t))^* M_{error}(f, t)(X(f, t) + P(f, t)),$$

wherein f and t are integer variables, $N_f$ and $N_t$ represent frequency bins and time bins, respectively, X(f,t) is a two-dimensional representation of an input signal in time and frequency domains, P(f,t) is a two-dimensional representation of the perturbation signal in time and frequency domains, * represents a conjugation operation, and $M_{error}$(f,t) represents an error metric.

8. The method of claim 1, wherein the linear pre-coder is based on an estimate of a wireless channel over which the pre-coded signal is transmitted.

9. A method for receiving a wireless communication, including:
   receiving a quadrature amplitude modulation (QAM) signal in a time-frequency domain;
   applying an orthogonal transformation to convert the received QAM signal from the time-frequency domain to a delay-Doppler domain;
   determining a closest lattice point corresponding to a QAM constellation point of the QAM signal in the delay-Doppler domain;
   removing a perturbation in the received QAM signal by subtracting the closest lattice point from the QAM constellation point to generate an un-perturbed QAM signal; and
   demodulating the un-perturbed QAM signal to obtain a plurality of data bits.

10. The method of claim 9, wherein the determining the closest lattice point comprises projecting the received QAM signal in the delay-Doppler domain onto a coarse lattice structure, and wherein the perturbation lies on the coarse lattice structure.

11. The method of claim 9, wherein the determining the closest lattice point is based on using a non-linear filter to minimize an error associated with the received QAM signal.

12. The method of claim 11, wherein the non-linear filter comprises a spatial Tomlinson-Harashima filter.

13. The method of claim 11, wherein the QAM signal is received through a wireless channel, and wherein the non-linear filter is based on estimated second order statistics of the wireless channel.

14. The method of 9, wherein the determining the closest lattice point comprises minimizing the quadratic form $$\underset{p \in (2\mathbb{Z}+2j\mathbb{Z})^{L_u}}{\mathrm{argmin}} \quad (r(\tau) + p)^* D(\tau)(r(\tau) + p)$$

wherein p is the perturbation, $r(\tau)$ is the received QAM signal in the delay-Doppler domain, $L_u$ is a length of a transmitted QAM signal corresponding to the plurality of data bits, $2\mathbb{Z}+2j\mathbb{Z}$ is a coarse lattice structure, and $D(\tau)$ is a $\tau$-th block diagonal entry of a positive definite block diagonal matrix corresponding to a Cholesky decomposition of the perturbation.

15. An apparatus for wireless communication, comprising:
   a processor; and
   a transceiver circuitry coupled to the processor,
   wherein the transceiver circuitry is configured to:
      receive a quadrature amplitude modulation (QAM) signal in a time-frequency domain, and
   wherein the processor is configured to:
      apply an orthogonal transformation to convert the received QAM signal from the time-frequency domain to a delay-Doppler domain,
      determine a closest lattice point corresponding to a QAM constellation point of the QAM signal in the delay-Doppler domain,
      remove a perturbation in the received QAM signal by subtracting the closest lattice point from the QAM constellation point to generate an un-perturbed QAM signal, and
      demodulate the un-perturbed QAM signal to obtain a plurality of data bits.

16. The apparatus of claim 15, wherein determining the closest lattice point comprises projecting the received QAM signal in the delay-Doppler domain onto a coarse lattice structure, and wherein the perturbation lies on the coarse lattice structure.

17. The apparatus of claim 15, wherein the determining the closest lattice point is based on using a non-linear filter to minimize an error associated with the received QAM signal.

18. The apparatus of claim 17, wherein the non-linear filter comprises a spatial Tomlinson-Harashima filter.

19. The apparatus of claim 17, wherein the QAM signal is received through a wireless channel, and wherein the non-linear filter is based on estimated second order statistics of the wireless channel.

20. The apparatus of 15, wherein the determining the closest lattice point comprises minimizing the quadratic form $$\underset{p \in (2\mathbb{Z}+2j\mathbb{Z})^{L_u}}{\mathrm{argmin}} \; (r(\tau)+p)^* D(\tau)(r(\tau)+p)$$

wherein p is the perturbation, $r(\tau)$ is the received QAM signal in the delay-Doppler domain, $L_u$ is a length of a transmitted QAM signal corresponding to the plurality of data bits, $2\mathbb{Z}+2j\mathbb{Z}$ is a coarse lattice structure, and $D(\tau)$ is a $\tau$-th block diagonal entry of a positive definite block diagonal matrix corresponding to a Cholesky decomposition of the perturbation.

* * * * *

UNITED STATES PATENT AND TRADEMARK OFFICE
CERTIFICATE OF CORRECTION

PATENT NO. : 10,951,454 B2  Page 1 of 1
APPLICATION NO. : 16/859135
DATED : March 16, 2021
INVENTOR(S) : James Delfeld It is certified that error appears in the above-identified patent and that said Letters Patent is hereby corrected as shown below:

On the Title Page

Item [57], Column 2, Line 1, delete "recoding" and insert -- precoding --, therefor.

In the Claims

Column 40, Line 24, Claim 14, delete "The method of 9," and insert -- The method of claim 9, --, therefor.

Column 41, Line 7, Claim 20, delete "The apparatus of 15," and insert -- The apparatus of claim 15, --, therefor.

Signed and Sealed this
Eleventh Day of May, 2021

Drew Hirshfeld
*Performing the Functions and Duties of the
Under Secretary of Commerce for Intellectual Property and
Director of the United States Patent and Trademark Office*